(12) United States Patent
Nakano et al.

(10) Patent No.: US 10,505,742 B2
(45) Date of Patent: Dec. 10, 2019

(54) VIRTUAL NETWORK SYSTEM, CONTROL APPARATUS, CONTROL METHOD, AND CONTROL PROGRAM

(71) Applicant: NEC CORPORATION, Tokyo (JP)

(72) Inventors: Shintaro Nakano, Tokyo (JP); Hideo Hasegawa, Tokyo (JP); Satoru Ishii, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 113 days.

(21) Appl. No.: 15/548,128

(22) PCT Filed: Jan. 14, 2016

(86) PCT No.: PCT/JP2016/050969
§ 371 (c)(1),
(2) Date: Aug. 2, 2017

(87) PCT Pub. No.: WO2016/125553
PCT Pub. Date: Aug. 11, 2016

(65) Prior Publication Data
US 2018/0026794 A1    Jan. 25, 2018

(30) Foreign Application Priority Data

Feb. 3, 2015   (JP) ................................ 2015-019797

(51) Int. Cl.
*H04L 9/32* (2006.01)
*G06F 21/33* (2013.01)
(Continued)

(52) U.S. Cl.
CPC ............ *H04L 9/3247* (2013.01); *G06F 21/33* (2013.01); *G06F 21/50* (2013.01); *H04L 9/14* (2013.01);
(Continued)

(58) Field of Classification Search
None
See application file for complete search history.

(56) References Cited

U.S. PATENT DOCUMENTS 6,471,068 B1   10/2002   Kido et al.
6,571,254 B1    5/2003   Kido et al.
(Continued)

FOREIGN PATENT DOCUMENTS

JP     11-282753 A    10/1999
JP    2003-273897 A    9/2003
(Continued)

OTHER PUBLICATIONS

Daisuke Saso, "Kasoka Tsushin Gijutsu no Hatten SDN/OpenFlow to NFV no Saishin Doko," Software Design, 278th Issue, Dec. 18, 2013, 8 pages.
(Continued)

*Primary Examiner* — Brandon S Hoffman
(74) *Attorney, Agent, or Firm* — Sughrue Mion, PLLC

(57) ABSTRACT

A system according to this invention is directed to a virtual network system that prevents unauthorized registration, alteration, or occurrence of erroneous registration even if an operator is to create a network system including a virtual network function produced by a third party. The virtual network system includes an instructor that instructs activation or change of a virtual network function preregistered of providing one of functions included in a virtual network service, an authenticator that authenticates, based on authentication information generated to authenticate a provider of the virtual network function at a time of registering the virtual network function, that the virtual network function instructed to be activated or changed has been validly registered or updated, and a setting unit that sets, when the authenticator authenticates that the virtual network function has been validly registered or updated, the instructed virtual (Continued)

network function as the one of the functions included in the virtual network service.

23 Claims, 44 Drawing Sheets

(51) Int. Cl.
*G06F 21/50* (2013.01)
*H04L 9/14* (2006.01)
*H04L 29/06* (2006.01)
*H04L 12/24* (2006.01)
*G06F 9/455* (2018.01)

(52) U.S. Cl.
CPC ............... *H04L 9/32* (2013.01); *H04L 41/28* (2013.01); *H04L 63/0272* (2013.01); *H04L 63/10* (2013.01); *H04L 63/12* (2013.01); *G06F 9/45558* (2013.01); *G06F 2009/45587* (2013.01); *G06F 2009/45595* (2013.01)

(56) References Cited

U.S. PATENT DOCUMENTS

| | | | |
|---|---|---|---|
| 9,288,155 B2 | 3/2016 | Uehara et al. | |
| 2005/0192099 A1* | 9/2005 | Nguyen | G06F 21/10 463/42 |
| 2014/0230024 A1 | 8/2014 | Uehara et al. | |

FOREIGN PATENT DOCUMENTS

| | | |
|---|---|---|
| JP | 2009-124520 A | 6/2009 |
| JP | 2011-34403 A | 2/2011 |
| JP | 2014-154050 A | 8/2014 |
| JP | 2014-182576 A | 9/2014 |
| JP | 2014-230213 A | 12/2014 |

OTHER PUBLICATIONS

International Search Report for PCT/JP2016/050969, dated Apr. 5, 2016 (PCT/ISA/220 and PCT/ISA/210).
Yoshida et al., "A Study of a Network-Aware Infrastructure Management Module for NFV", The Institute of Electronics, Information and Communication Engineers, 2014, Proceedings of the 2014 IEICE General Conference, B-7-13, p. 188 (total 4 pages).
Communication dated May 22, 2018 from the Japanese Patent Office in counterpart Application No. 2016-573254.
Huawei Technologies, "Software Validation; NFVSEC(14)022004_Software_Validation", ETSI Draft. NFVSEC(14)022004_Software_Validation, European Telecommucations Standards Institute (ETSI), France, vol. ISG-NFV, Feb. 12, 2014, pp. 1-2, XP014202277 (2 pages total).
Anonymous, "ETSI GS NFV-SEC 003 V1.1.1, Network functions Virtualisation (NFV), NFV Security; Security and Trust Guidance", Dec. 1, 2014, pp. 1-57, XP055328628, Retrieved from the Internet: URL:http://www.etsi.org/deliver/etsi_gs/NFV-SEC/001_099/003/01.01.01_60/gs_NFV-SEC003v010101p.pdf [retrieved on Dec. 13, 2016] (58 pages total).
Bob Briscoe et al., "ETSI GS NFV-SEC 001 V1.1.1 (Oct. 2014) Network Functions Virtualisation (NFV); NFV Security; Problem Statement", Oct. 31, 2014, XP055469431, Retrieved from the Internet: URL:http://www.esti.org/deliver/etsi_gs/NFV-SEC/001_099/001/01.01.01_60/gs_NFV-SEC001v010101p.pdf [retrieved on Apr. 23, 2018] (38 pages total).
Extended European Search Report dated Aug. 20, 2018 issued by the European Patent Office in counterpart application No. 16746384.3.
Dutta, Ashutosh, "NFV Security—Opportunities and Challenges (Slides for Discussion in IEEE SRPSDVE Study Group)", AT&T [online], Oct. 29, 2014 (3 pages total) [search date May 13, 2019], Internet <URL:http://grouper.ieee.org/groups/srpsdv/meetings/2014%20October/SRPSDVE_10292014_04_Ashutosh_NFV_Security_IEEE_Standards_ SRPSDVE_29Oct2014.pdf>.
Network Functions Virtualisation (NFV); Virtualisation Requirements, ETSI GS NFV 004, V1.1.1, ETSI [online], Oct. 2013 (4 pages total) [search date May 13, 2019], Internet <URL: https://www.etsi.org/deliver/etsi_gs/NFV/001_099/004/01.01.01_60/gs_nfv004v010101p.pdf>.
Office Action dated May 21, 2019 in corresponding Japanese Application No. 2018-152359.
Japanese Decision of Dismissal of Amendment dated Oct. 24, 2019 of Japanese Patent Application No. 2018-152359.
Nakashima, "Error message 50 Parts 2 System Operation" DB Magazine, vol. 19, No. 12, Apr. 1, 2010, pp. 55-63.
Shida et al., "A Vulnerability Remediation Support System using a Peer-to-Peer Network", Information Processing Society of Japan Technical Research Report, Heisei 22(2010) (5), Feb. 15, 2011, and pp. 1-5 (vol. 2010-CSEC-51 No. 4).

* cited by examiner

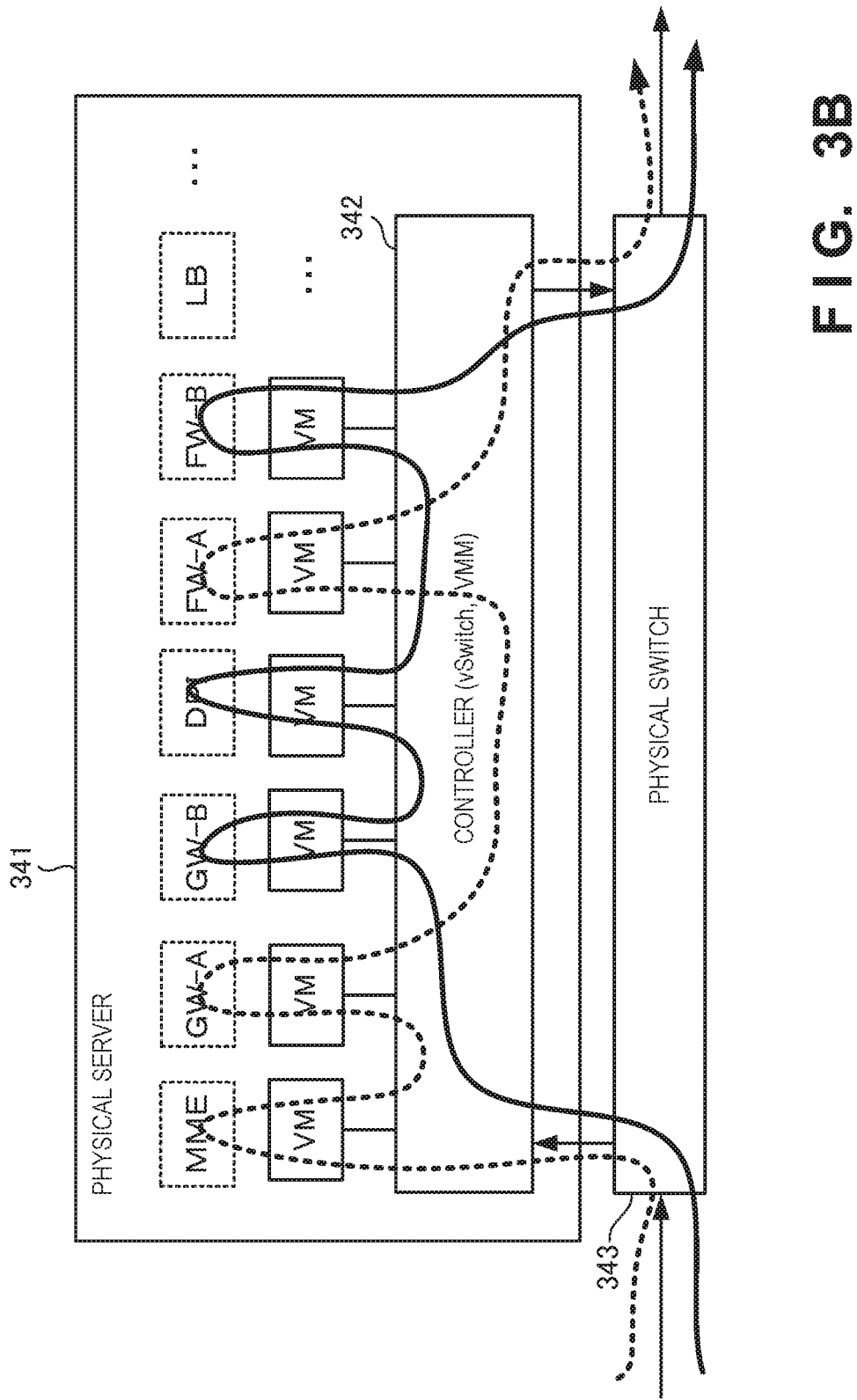

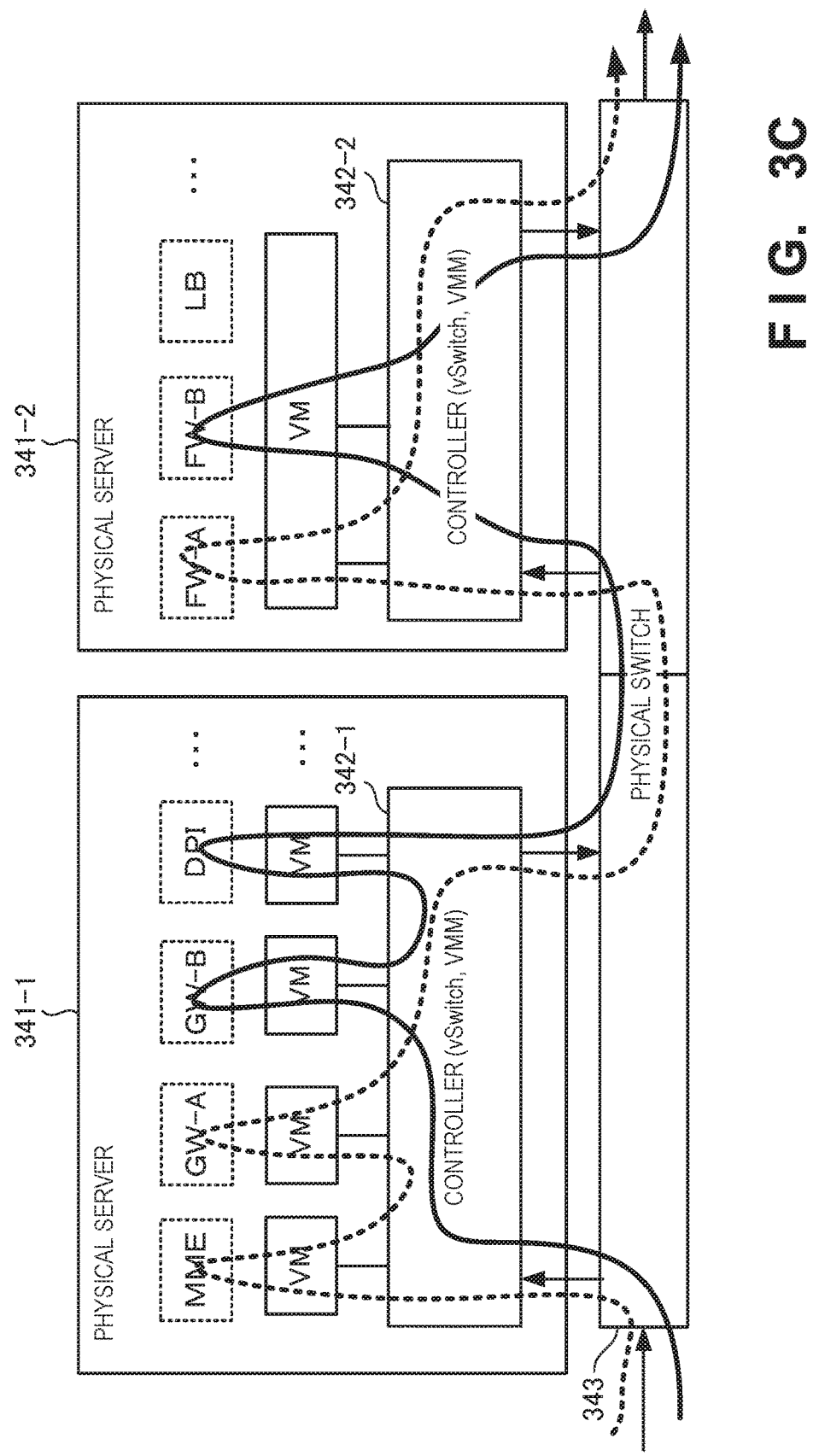

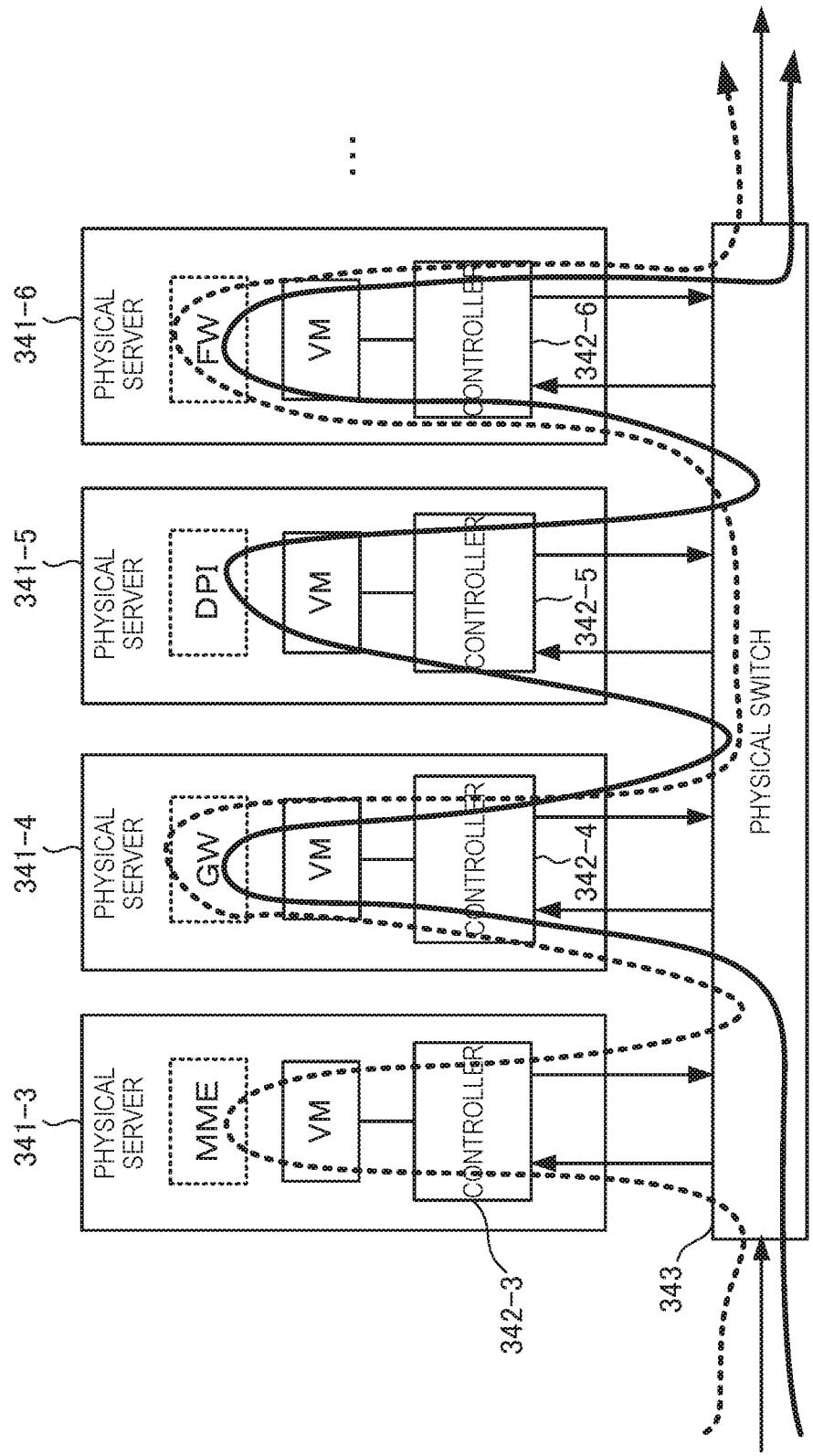

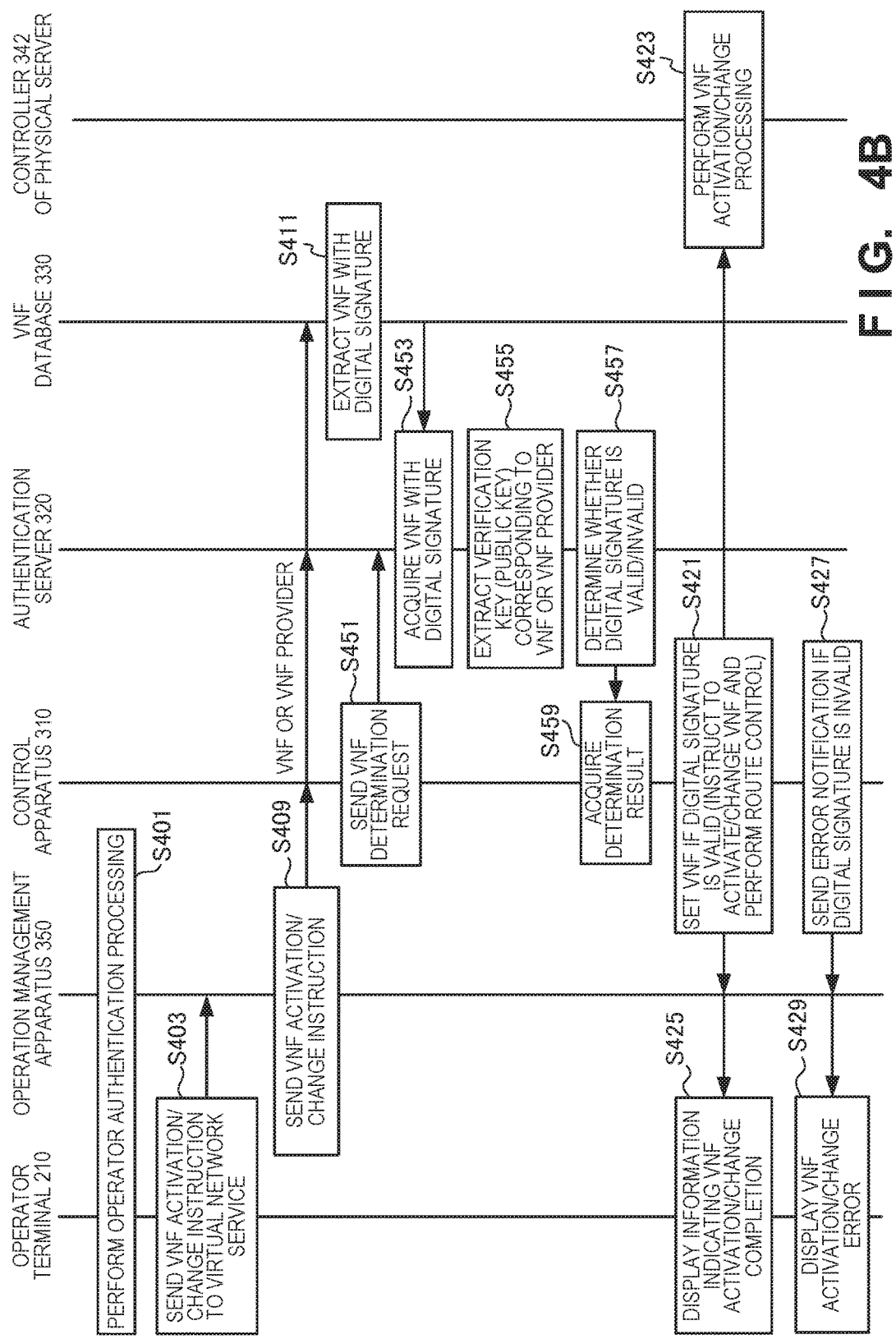

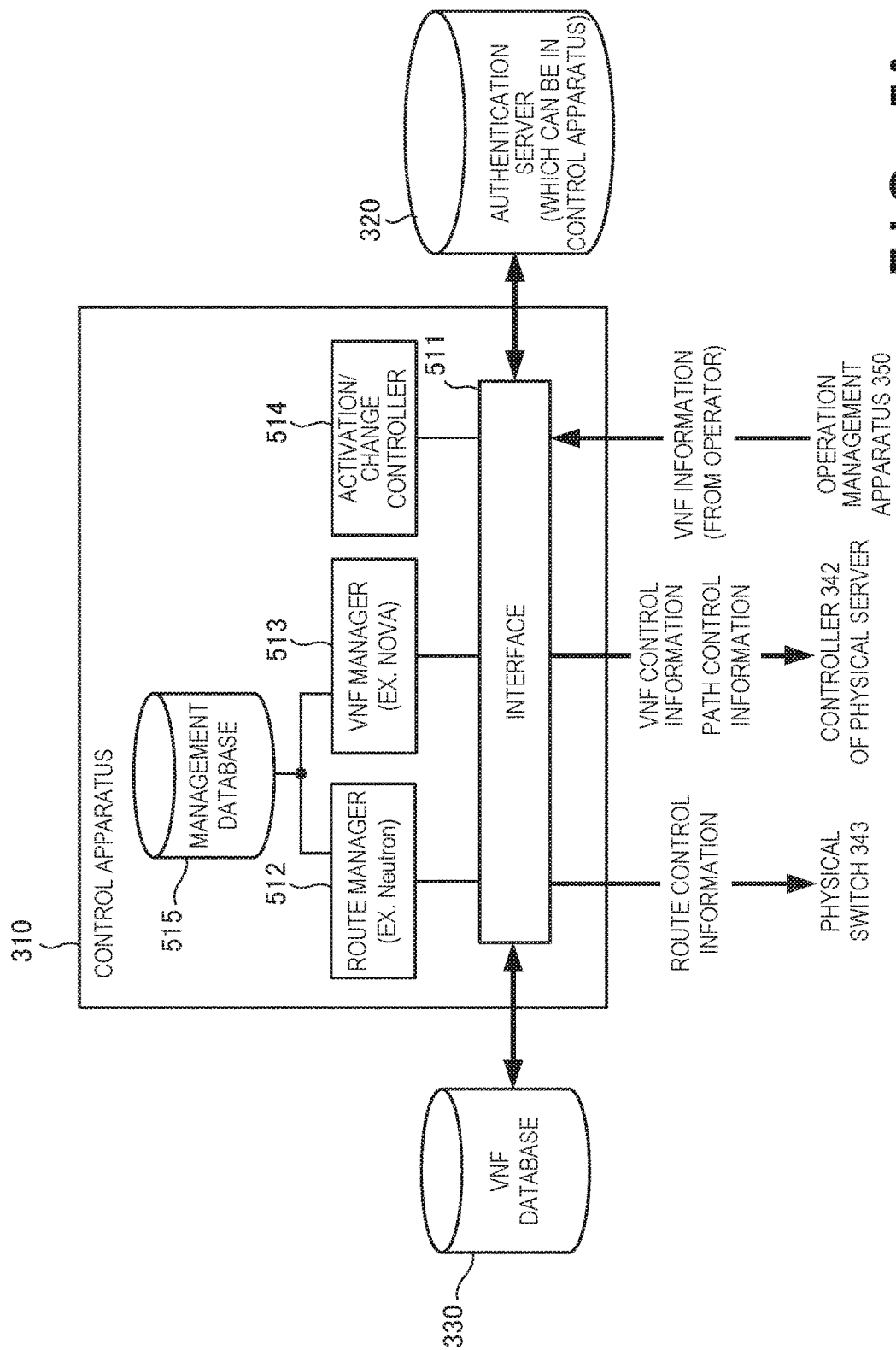
F I G. 5A

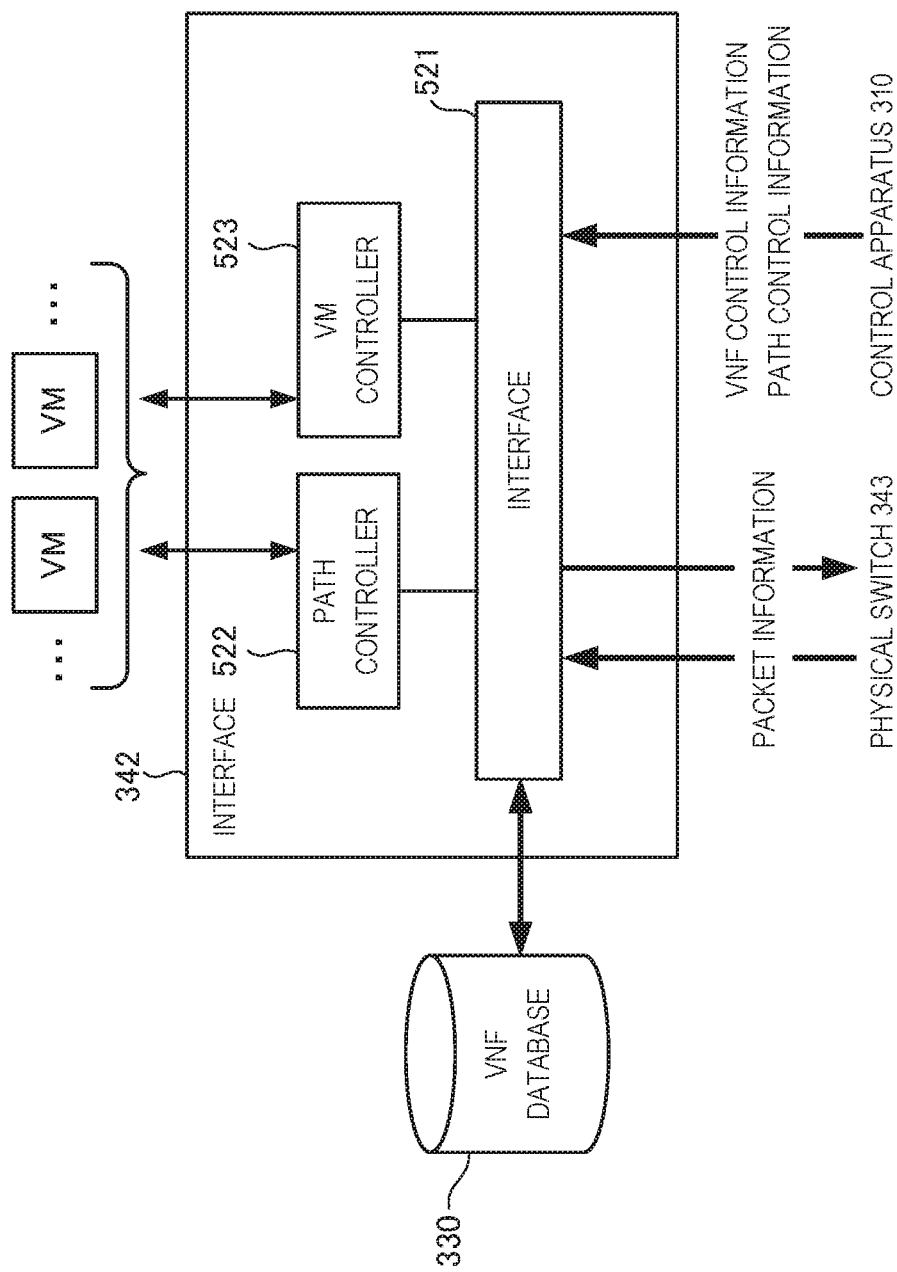

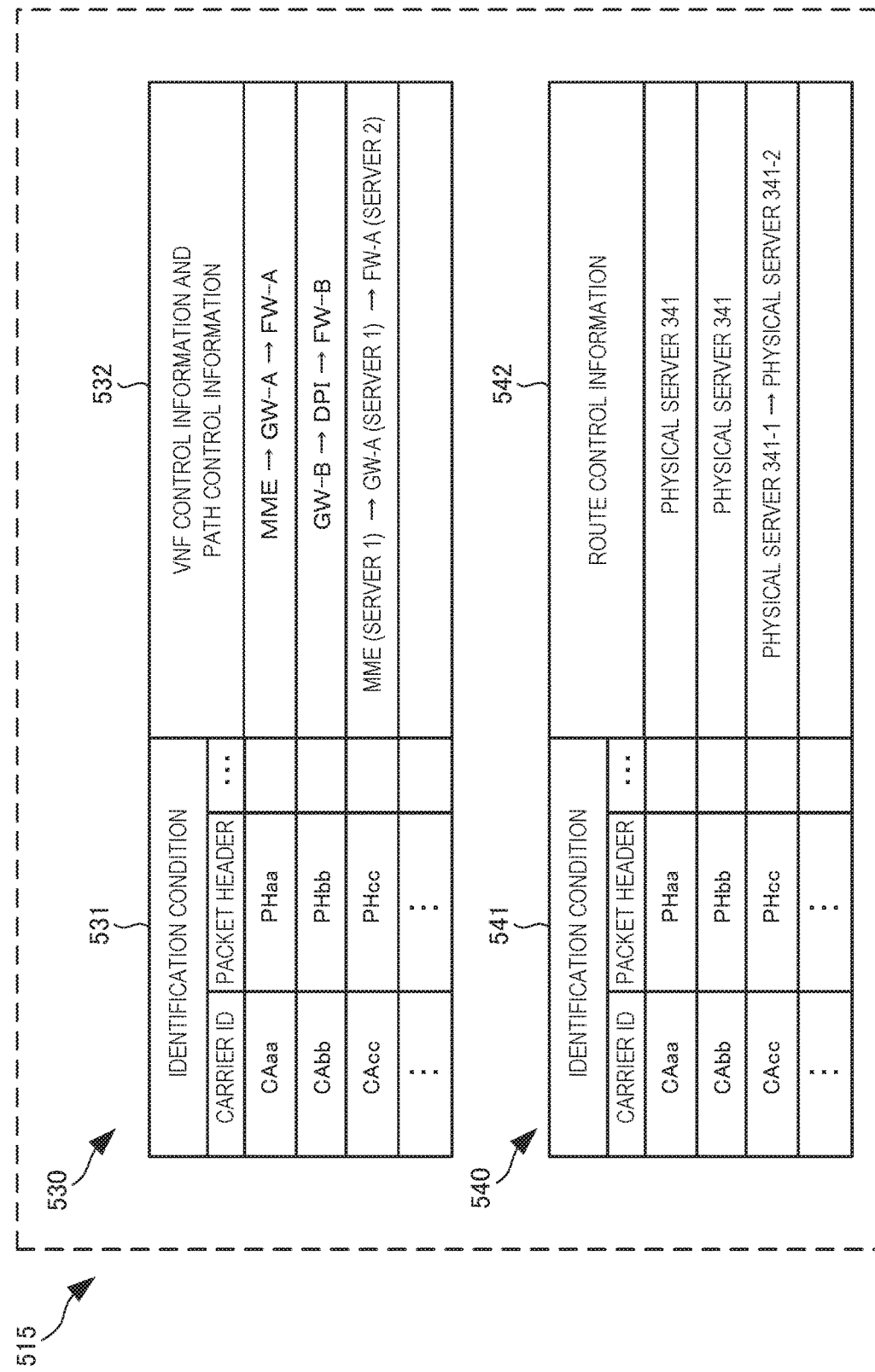

320

| VNF INFORMATION | | IDENTIFIER |
|---|---|---|
| FUNCTION A | MADE BY COMPANY X | 12345 |
| FUNCTION B | MADE BY COMPANY Y | 67891 |
| FUNCTION C | MADE BY COMPANY Y | 23456 |
| FUNCTION D | MADE BY COMPANY X | 78912 |
| ⋮ | ⋮ | |

751 752

| IDENTIFIER | VERIFICATION KEY (PUBLIC KEY) |
|---|---|
| 12345 | aax |
| 23456 | ccy |
| 67891 | bby |
| 78912 | ddx |
| ⋮ | |

761 762

F I G. 7F

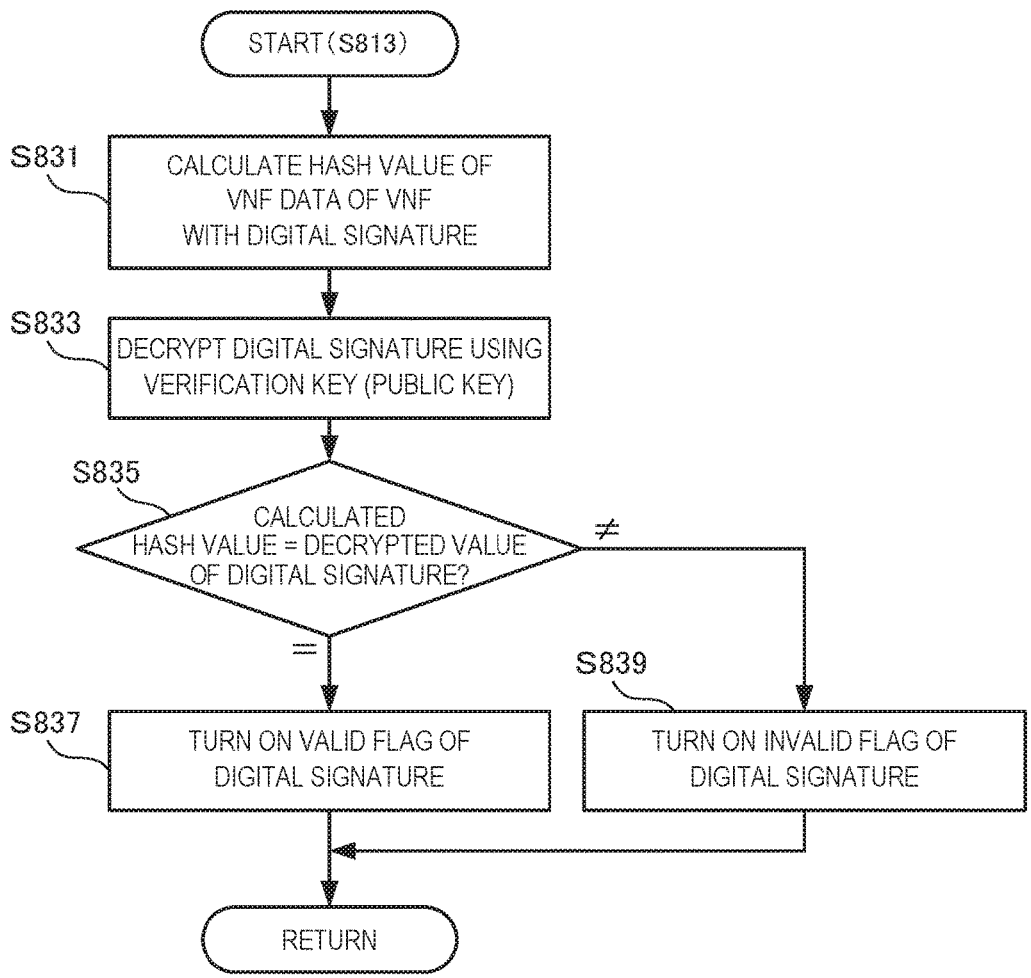
F I G. 8B

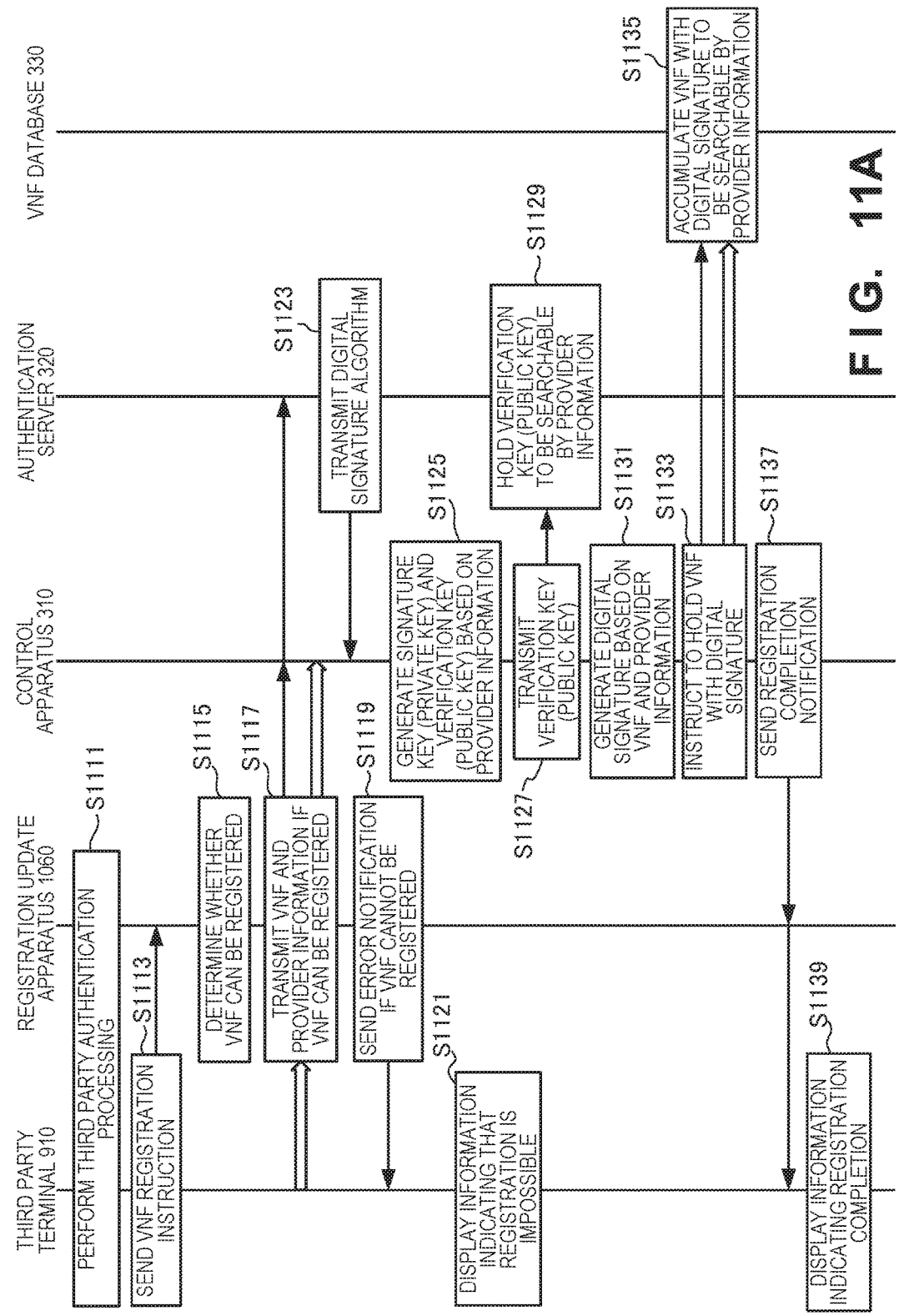
F I G. 11A

| PROVIDER INFORMATION (THIRD PARTY) | REGISTRABLE/UPDATABLE FUNCTION |
|---|---|
| COMPANY X | FUNCTION A |
| COMPANY Y | FUNCTION B |
| COMPANY Z | FUNCTION C |
|  | FUNCTION D |
|  | ⋮ |
| ⋮ |  |

F I G. 13B

| 1801 | 1802 | 1803 | 1804 | 1805 | 1806 | 1807 |
|---|---|---|---|---|---|---|
| VIRTUAL NETWORK SERVICE ID | CONTROL APPARATUS ID | CURRENTLY USED VNF | CONNECTABLE VNF | REPLACEABLE VNF | CONNECTABLE ROUTE POSITION | UNCONNECTABLE VNF |
|  |  |  |  |  |  |  |
|  |  |  |  |  |  |  |
| ... |  |  |  |  |  |  |

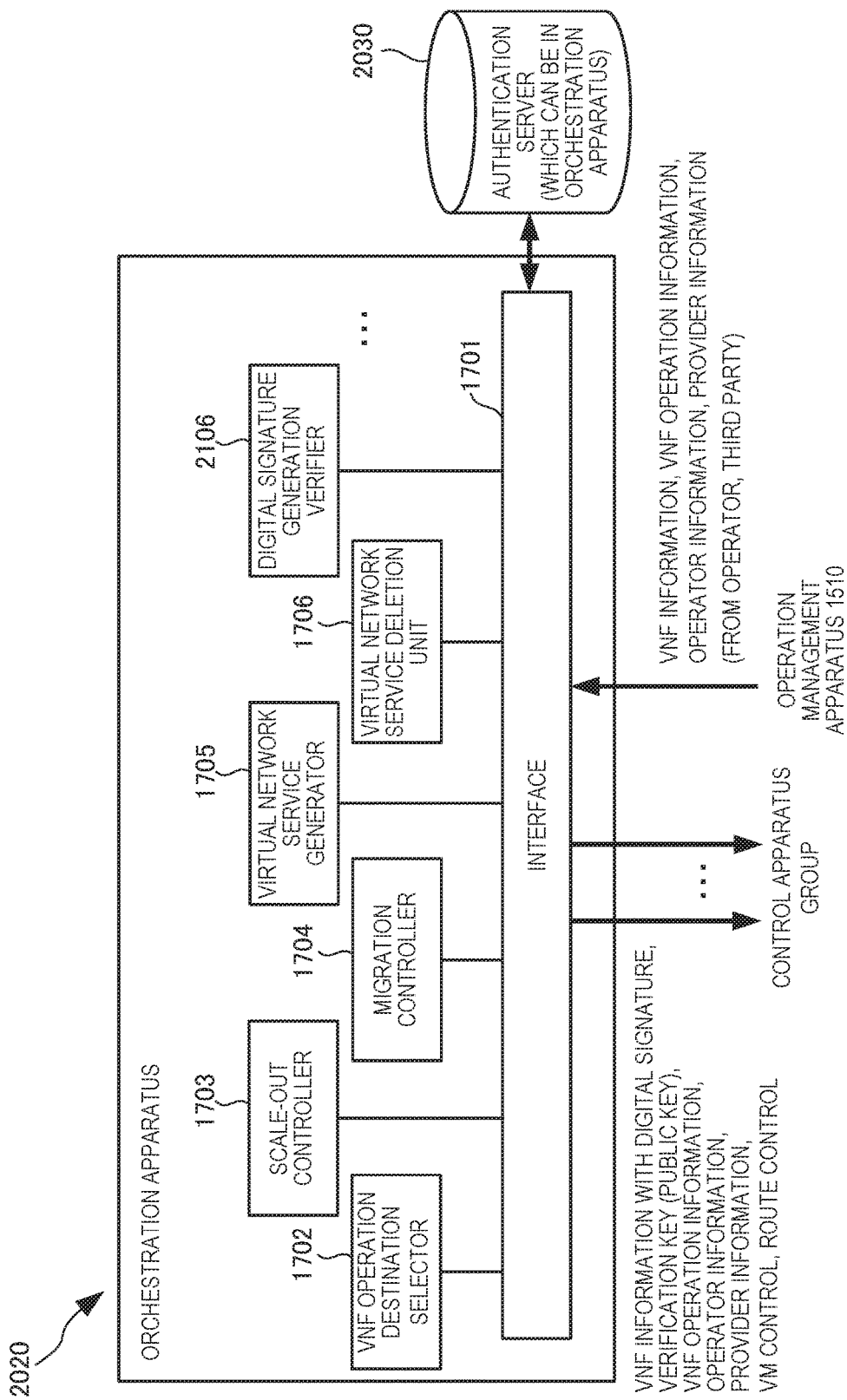
F I G. 21

VIRTUAL NETWORK SYSTEM, CONTROL APPARATUS, CONTROL METHOD, AND CONTROL PROGRAM

TECHNICAL FIELD

The present invention relates to a virtual network system, a virtual network control method, a virtual network function database, an orchestration apparatus, a control apparatus, and a control method and control program of the control apparatus.

BACKGROUND ART

Along with popularization of SDN (Software-Defined Network) and the like, a technique of virtualizing a network has attracted increasing attention. Especially, a technique of virtualizing the functions of the network appliances of a carrier network, which is called NFV (Network Functions Virtualization), has been considered.

In the above technical field, patent literature 1 discloses a technique in which a virtualization apparatus creates a virtual appliance on a virtual machine for each dedicated appliance.

CITATION LIST

Patent Literature

Patent literature 1: Japanese Patent Laid-Open No. 2011-034403

SUMMARY OF THE INVENTION

Technical Problem

In the above-described NFV environment, it is predicted that a specific vender performs, for a carrier, so-called system integration in which products for a carrier network such as a router, switch, and gateway are developed and produced, and delivered by implementing software virtual appliances (=VNFs: Virtual Network Functions) on a general-purpose server.

It is hardly considered that a specific vender develops all virtual appliances forming a carrier network, and software of a third party may be delivered with respect to a specific function. If a VNF produced by a third party is to be incorporated in a system, a carrier operating a network needs to consider the validity (correctness) of the VNF produced by the third party.

However, the technique described in patent literature 1 is merely a technique of creating a virtual appliance on the virtual machine, and virtually providing the same service as that of the dedicated appliance, and does not assume that a third party different from a vender which creates the overall system joins. Therefore, in the technique described in patent literature 1, if an operator is to create a virtual network system including a virtual network function produced by a third party, it is impossible to prevent unauthorized registration, alteration, or occurrence of erroneous registration.

The present invention enables to provide a technique of solving the above-described problem.

Solution to Problem

One aspect of the present invention provides a virtual network system comprising:

an instructor that instructs activation or change of a virtual network function preregistered and providing one of functions included in a virtual network service;

an authenticator that authenticates, based on authentication information generated to authenticate a provider of the virtual network function at a time of registering the virtual network function, that the virtual network function instructed to be activated or changed has been validly registered or updated; and a setting unit that sets, when said authenticator authenticates that the virtual network function has been validly registered or updated, the instructed virtual network function as the one of the functions included in the virtual network service.

Another aspect of the present invention provides a virtual network control method comprising:

instructing activation or change of a virtual network function preregistered and providing one of functions included in a virtual network service;

authenticating, based on authentication information generated to authenticate a provider of the virtual network function at a time of registering the virtual network function, that the virtual network function instructed to be activated or changed has been validly registered or updated; and setting, when it is authenticated in said authenticating step that the virtual network function has been validly registered or updated, the instructed virtual network function as the one of the functions included in the virtual network service.

Still other aspect of the present invention provides a control apparatus comprising:

a registration unit that registers a virtual network function and authentication information for authenticating a provider of the virtual network function in association with each other, at a time of registering the virtual network function;

an authenticator that authenticates, based on the authentication information, that the virtual network function instructed to be activated or changed has been validly registered or updated; and a setting unit that sets, when said authenticator authenticates that the virtual network function has been validly registered or updated, the instructed virtual network function as the one of functions included in a virtual network service.

Still other aspect of the present invention provides a control method of a control apparatus, comprising:

registering a virtual network function and authentication information for authenticating a provider of the virtual network function in association with each other in a registration unit, at a time of registering the virtual network function;

authenticating, based on the authentication information, that the virtual network function instructed to be activated or changed has been validly registered or updated; and setting, when it is authenticated in said authenticating step that the virtual network function has been validly registered or updated, the instructed virtual network function as the one of functions included in a virtual network service.

Still other aspect of the present invention provides a control program of a control apparatus for causing a computer to execute a method, comprising:

registering a virtual network function and authentication information for authenticating a provider of the virtual network function in association with each other in a registration unit, at a time of registering the virtual network function;

authenticating, based on the authentication information, that the virtual network function instructed to be activated or changed has been validly registered or updated; and setting, when it is authenticated in said authenticating step that the virtual network function has been validly registered or updated, the instructed virtual network function as the one of functions included in a virtual network service.

Still other aspect of the present invention provides a virtual network function database for registering a virtual network function and authentication information for authenticating at least a provider of the virtual network function in association with each other to be searchable by the virtual network function.

Still other aspect of the present invention provides an orchestration apparatus comprising:

an interface connected to a plurality of virtual network services, an operator terminal, and a third party terminal;

a transmitter that, in accordance with an instruction of registration or update of a virtual network function providing one of functions included in the plurality of virtual network services from the third party terminal, selects a target virtual network service from the plurality of virtual network services and transmits at least a virtual network function to be registered and an identifier of a provider of the virtual network function to be registered, as information for generating authentication information, and, in accordance with an instruction of activation or change of a virtual network function from the operator terminal, selects a target virtual network service from the plurality of virtual network services and transmits at least an identifier of the virtual network function to be activated or changed, as information for authenticating a provider of the virtual network function to be activated or changed; and a notifier that acquires an authentication result of the provider of the virtual network function from the target virtual network service, and notifies the operator terminal or the third party terminal of the authentication result.

Advantageous Effects of Invention

According to the present invention, even if an operator is to create a virtual network system including a virtual network function produced by a third party, it is possible to prevent unauthorized registration, alteration, or occurrence of erroneous registration.

BRIEF DESCRIPTION OF DRAWINGS

FIG. 3B is a view showing a service chain of a virtual network service according to the second example embodiment of the present invention;

FIG. 3C is a view showing another service chain of the virtual network service according to the second example embodiment of the present invention;

FIG. 3D is a view showing still other service chain of the virtual network service according to the second example embodiment of the present invention;

FIG. 4B is a sequence chart showing another operation procedure of the virtual network system according to the second example embodiment of the present invention;

FIG. 5A is a block diagram showing the functional arrangement of a control apparatus according to the second example embodiment of the present invention;

FIG. 5B is a block diagram showing the functional arrangement of a controller that controls a physical server according to the second example embodiment of the present invention;

FIG. 5C is a view showing the structure of a management database according to the second example embodiment of the present invention;

FIG. 7F is a view showing still other structure of the authentication data according to the second example embodiment of the present invention;

FIG. 8B is a flowchart illustrating the procedure of digital signature validity/invalidity determination processing according to the second example embodiment of the present invention;

FIG. 11A is a sequence chart showing a registration operation procedure of the virtual network system according to the third example embodiment of the present invention;

FIG. 13B is a table showing the structure of a registrability/updatability determination table according to the third example embodiment of the present invention;

FIG. 18 is a table showing the structure of an integration control table according to the fourth example embodiment of the present invention;

FIG. 21 is a block diagram showing the functional arrangement of an orchestration apparatus according to the fifth example embodiment of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A virtual network system 100 according to the first example embodiment of the present invention will be described with reference to FIG. 1. The virtual network system 100 is a system that manages a virtual network service.

Figure 1:
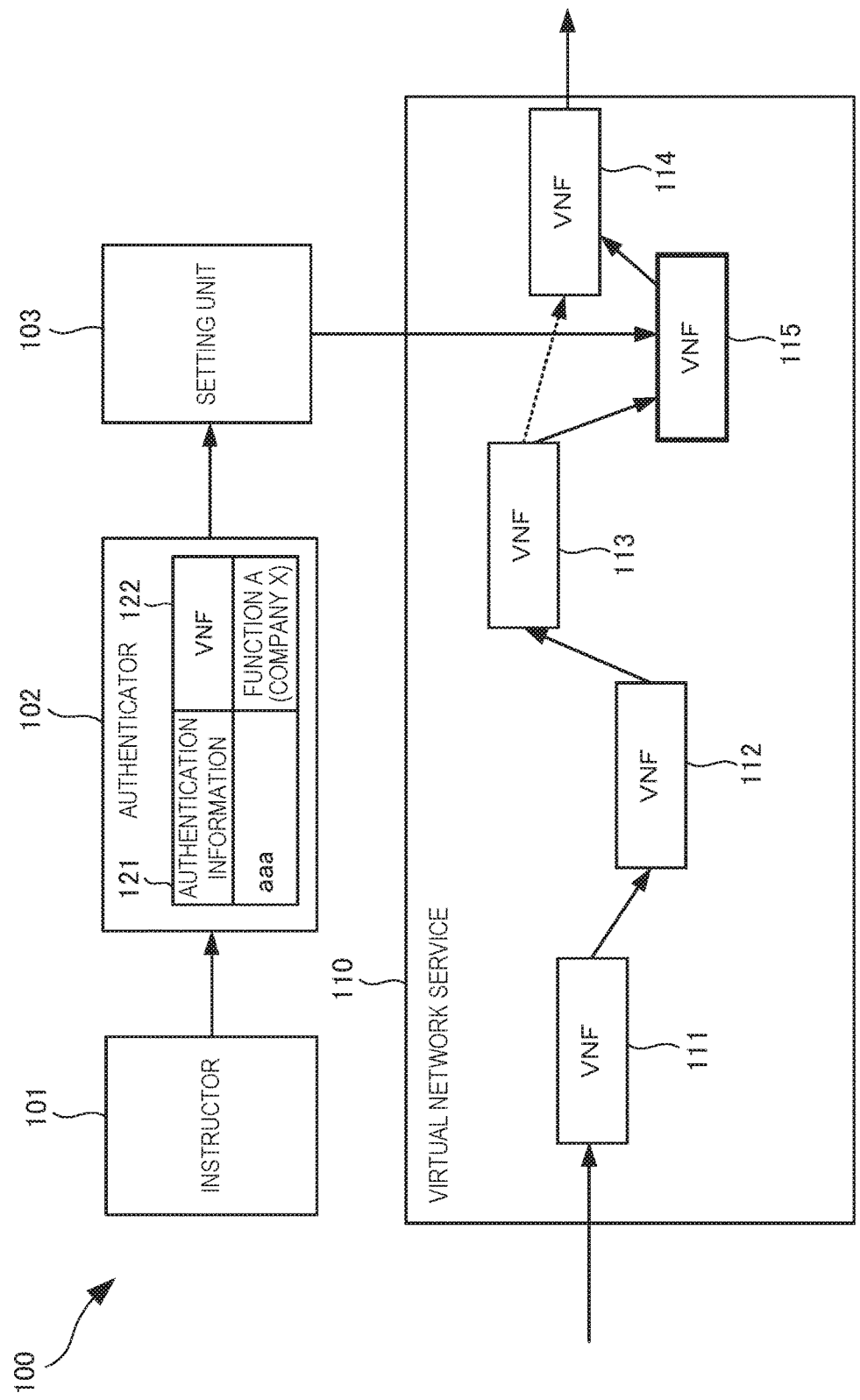
FIG. 1 is a block diagram showing the arrangement of a virtual network system according to the first example embodiment of the present invention.

As shown in FIG. 1, the virtual network system 100 includes an instructor 101, an authenticator 102, and a setting unit 103. The instructor 101 instructs to activate or change a virtual network function 122 (to be also referred to as a VNF in the drawings or specification) of providing a virtual network service 110. Based on authentication information 121 for authenticating the provider of the virtual network function 122 at the time of registration of the virtual network function 122, the authenticator 102 authenticates whether the virtual network function 122 instructed to be activated or changed has been validly registered or updated. If the authenticator 102 authenticates the virtual network function, the setting unit 103 sets the instructed virtual network function 122 (115) as the virtual network service 110.

According to this example embodiment, since a virtual network function instructed to be activated or changed is authenticated, even if an operator is to create a virtual network system including a virtual network function produced by a third party, it is possible to prevent unauthorized registration, alteration, or occurrence of erroneous registration.

Second Example Embodiment

A virtual network system according to the second example embodiment of the present invention will be described next. In the virtual network system according to this example embodiment, when an operator terminal instructs to activate or change an already registered virtual network function, authentication is performed to confirm that the target virtual network function has not been unauthorizedly registered, altered, or erroneously registered. Activation of the virtual network function is to newly activate the already registered virtual network function in a target virtual network. Change of the virtual network function is to replace the virtual network function used for a target virtual network service.

In this example embodiment, the virtual network service may be defined for, for example, each operator who uses the network system or each service provided by the operator to the user.

Note that in this example embodiment, authentication is performed based on the digital signature of a provider (to be also referred to as a third party hereinafter) who has supplied the virtual network function. An authentication method is not limited to a digital signature. An authentication method of preventing the virtual network function from being unauthorizedly registered, altered, or erroneously registered can be used. For example, a combination of encryption and decryption and the like may be used. As virtual network functions (VNFs), GW (gateway), FW (firewall), LB (Load Balancer), DPI (Deep Packet Inspection), and the like are known, and every function that creates a carrier network may be included. Furthermore, the VNF may be defined for each dedicated appliance such as GW or FW in a general network, or defined for each function of each dedicated appliance. In addition, each apparatus according to this example embodiment may be integrated into one hardware component, or implemented by software components for implementing respective functions. In this case, each apparatus need not indicate the boundary as hardware.

<<Virtual Network System>>

The virtual network system according to this example embodiment will be described in detail below with reference to FIGS. 2 to 4.

(Outline of Operation)

Figure 2:
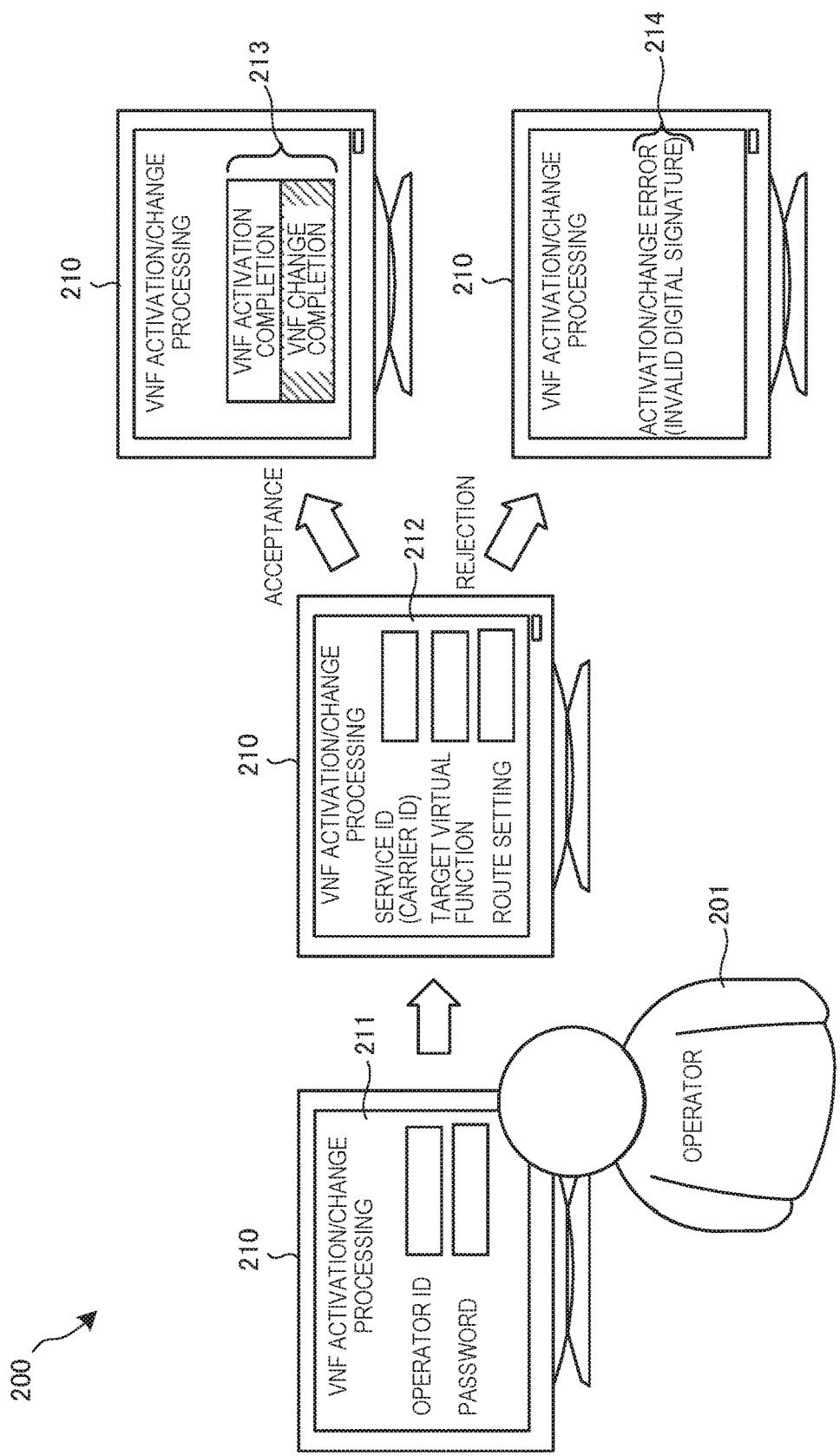
FIG. 2 is a view showing an outline of the operation of a virtual network system according to the second example embodiment of the present invention.

FIG. 2 is a view showing an outline of the operation of a virtual network system 200 according to this example embodiment. FIG. 2 shows display examples of an operator terminal 210 operated by an operator 201 who instructs to activate or change a virtual network function during the operation according to this example embodiment.

A display screen 211 is a screen for authenticating whether the operator 201 has authority to operate the virtual network system 200 of this example embodiment. The operator 201 is authenticated by inputting an operator ID and a password.

If the operator 201 is authenticated, he/she inputs, to a display screen 212, a service ID (or carrier ID) as a target of VNF activation or change, a function (VNF) to be activated or changed, and setting of a route that connects VNFs. Note that the route that connects the VNFs may be automatically set based on the relationship between the functions, instead of inputting the setting by the operator 201.

According to this example embodiment, whether the target VNF may be activated or changed in the target virtual network service, that is, the target VNF is not a VNF that has been unauthorizedly registered, altered, or erroneously registered is authenticated based on authentication information. In this example embodiment, as the authentication information, a digital signature that authenticates the VNF based on provider information is used. A pre-registered target VNF with a digital signature is read out from a virtual network function database (to be referred to as a VNF database hereinafter), and the digital signature is authenticated using a corresponding verification key (public key) saved in an authentication server.

If the identity of the operator is accepted in authentication of the digital signature, the VNF read out from the VNF database is set in the target virtual network, and information indicating the VNF activation completion or VNF change completion is displayed on a display screen 213 of the operator terminal 210. On the other hand, if the identity of the operator is rejected in authentication of the digital signature, it is determined that the VNF read out from the VNF database may have been unauthorizedly registered, altered, or erroneously registered. As a result, the VNF activation or change processing is terminated, and information indicating that an activation or change error has occurred and its factor is invalidity of the digital signature is displayed on a display screen 214 of the operator terminal 210.

(System Arrangement)

Figure 3A:
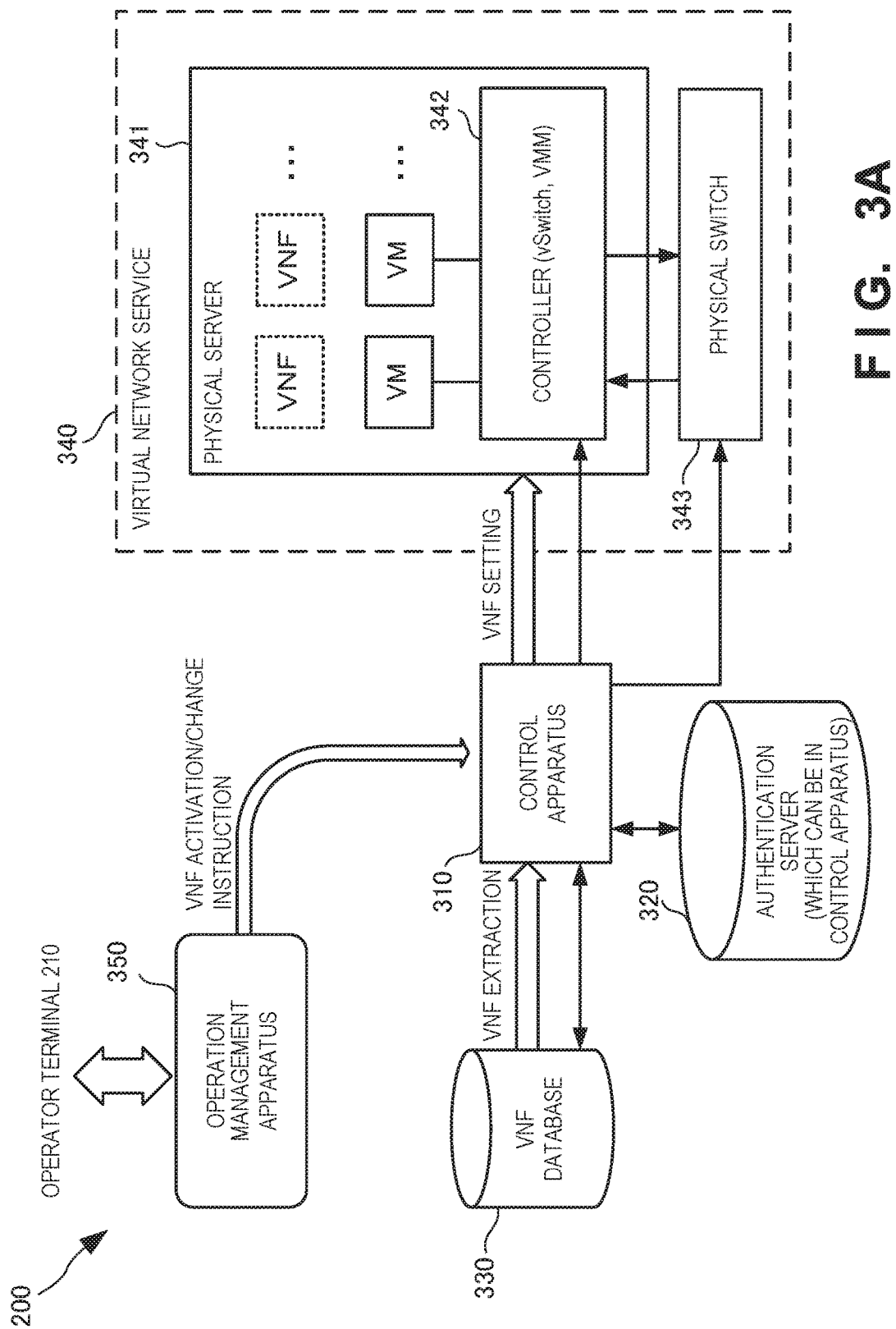
FIG. 3A is a block diagram showing the arrangement of the virtual network system according to the second example embodiment of the present invention.

FIG. 3A is a block diagram showing the arrangement of the virtual network system 200 according to this example embodiment. Note that in the virtual network system 200, an arrangement related to VNF activation or change processing is shown, and no arrangement related to VNF registration or update processing is shown by assuming that the VNF is already registered in the VNF database.

In the virtual network system 200, a control apparatus 310 controls authentication in the VNF activation or change processing according to this example embodiment, and VNF setting based on the result. An authentication server 320 holds authentication information for authentication in the VNF activation or change processing according to this example embodiment. Note that the authentication server 320 may be provided in the control apparatus 310. A VNF database 330 stores a pre-registered VNF with a digital signature to be searchable by provider information, a VNF identifier, or the like. A search key is not limited to the provider information or VNF identifier, and is variously selected to prevent the VNF from being unauthorizedly registered, altered, or erroneously registered. The control apparatus 310, the authentication server 320, and the VNF database 330 function as the authenticator 102 and the setting unit 103 in FIG. 1.

A virtual network service 340 is a service that is provided by connecting a plurality of VNFs to the virtual network system 200 according to this example embodiment. Note that the number of virtual network services 340 is not limited to one, and a plurality of different network services may be provided. The virtual network service 340 includes a physical server 341 that executes a VNF in a virtual machine (VM), and a physical switch 343 that switches packet transfer with the physical server 341. The physical server 341 includes a plurality of VMs that execute various processes, and a controller 342 that implements the virtual network service 340 by setting a plurality of VNFs in accordance with a route. As the controller 342, "Open vSwitch", "VMM (Virtual Machine Manager)", or the like is used, and a detailed description thereof will be omitted.

An operation management apparatus 350 is connected to the operator terminal 210, and transmits a VNF activation or change instruction to the control apparatus 310. The operation management apparatus 350 or the operation management apparatus 350 and operator terminal 210 function as the instructor 101 of FIG. 1.

In the arrangement of FIG. 3A, the VNF database 330 stores a VNF with a digital signature to be searchable, and the authentication server 320 holds a verification key (public key) corresponding to the VNF with the digital signature. If the operator authenticated by the system instructs to activate or change the VNF stored in the VNF database 330 from the operator terminal 210, the operation management apparatus 350 sends a VNF activation or change instruction to the control apparatus 310. The VNF activation or change instruction is added with an identifier (for example, ID: 123, ID: abc, or the like) for identifying the VNF.

The identifier for identifying the VNF is desirably converted, in the operator terminal 210 or the operation management apparatus 350, from a function name (for example, firewall or the like) input or selected by the operator. That is, the operator inputs or selects, from the operator terminal 210, a name from which the operator can readily grasp the function, such as a firewall, load balancer, or DPI (Deep Packet Inspection). Then, in the operator terminal 210 or the operation management apparatus 350, the input or selected name is desirably converted into an identifier (for example, ID: 123, ID: abc, or the like) for identifying the VNF.

Upon receiving the VNF activation or change instruction, the control apparatus 310 searches for the target VNF with the digital signature from the VNF database 330, and reads out the corresponding verification key (public key) from the authentication server 320. The control apparatus 310 then authenticates the digital signature. Note that in this example embodiment, the control apparatus 310 performs calculation for authentication of the digital signature. However, the authentication server 320 may perform all processes related to authentication, and return the result to the control apparatus 310.

If authentication of the digital signature is OK, that is, the digital signature is accepted, the control apparatus 310 implements VNF activation or change by instructing the controller 342 of the physical server 341 to set the VNF found from the VNF database 330. Note that the route of the activated or changed VNF in the controller 342 may be input by the operator from the operator terminal 210 or automatically set by the operation management apparatus 350 or the control apparatus 310.

On the other hand, if authentication of the digital signature is not OK, that is, the digital signature is rejected, the control apparatus 310 terminates the VNF activation or change processing, and the operator terminal 210 notifies the operator of a VNF activation or change error.

(Service Chain Examples)

Examples of the service chain of the virtual network service 340 will be described below with reference to FIGS. 3B to 3D. Note that the service chain is not limited to examples of FIGS. 3B to 3D, and a combination of components of FIGS. 3B to 3D may be used.

FIG. 3B is a view showing service chains of the virtual network service 340 according to this example embodiment. Referring to FIG. 3B, in the one physical server 341, VNFs are executed by VMs. Note that examples of VNFs providable by the physical server 341 are MME (Mobility Management Entity), different GW-A and GW-B, DPI, different FW-A and FW-B, and LB. FIG. 3B shows two different service chains (a solid line and a broken line). These service chains may be services for individual users or carriers.

In the service chain indicated by the solid line, based on VNF information and path control information set in the controller 342 by the control apparatus 310, GW-B, DPI, and FW-B are sequentially executed by the VMs managed by the controller 342 for a packet transferred from the physical switch 343 to the physical server 341. A packet as an execution result is returned from the physical server 341 to the physical switch 343, thereby providing the virtual network service 340.

In the service chain indicated by the broken line, based on the VNF information and path control information set in the controller 342 by the control apparatus 310, MME, GW-A, and FW-A are sequentially executed by the VMs managed by the controller 342 for a packet transferred from the physical switch 343 to the physical server 341. A packet as an execution result is returned from the physical server 341 to the physical switch 343, thereby providing the virtual network service 340.

In this example embodiment, if authentication by the control apparatus 310 is valid, the control apparatus 310 sends a VNF activation or change instruction to the controller 342, and makes settings.

FIG. 3C is a view showing other service chains of the virtual network service 340 according to this example embodiment. Referring to FIG. 3C, in a plurality of physical servers 341-1 and 341-2, VNFs are executed by VMs. Note that examples of VNFs providable by the physical server 341-1 are MME, different GW-A and GW-B, and DPI. Examples of VNFs providable by the physical server 341-2 are different FW-A and FW-B and LB. FIG. 3C shows two different service chains (a solid line and a broken line). These service chains may be services for individual users or carriers.

In the service chain indicated by the solid line, based on VNF information and path control information set in a controller 342-1 by the control apparatus 310, GW-B and DPI are sequentially executed by the VMs managed by the controller 342-1 for a packet transferred from the physical switch 343 to the physical server 341-1. A packet as an execution result is returned from the physical server 341-1 to the physical switch 343. Next, based on VNF information and path control information set in a controller 342-2 by the control apparatus 310, FW-B is executed by the VM managed by the controller 342-2 for a packet transferred from the physical switch 343 to the physical server 341-2. A packet as an execution result is returned from the physical server 341-2 to the physical switch 343, thereby providing the virtual network service 340.

In the service chain indicated by the broken line, based on the VNF information and path control information set in the controller 342-1 by the control apparatus 310, MME and GW-A are sequentially executed by the VMs managed by the controller 342-1 for a packet transferred from the physical switch 343 to the physical server 341-1. A packet as an execution result is returned from the physical server 341-2 to the physical switch 343. Based on the VNF information and path control information set in the controller 342-2 by the control apparatus 310, FW-A is executed by the VM managed by the controller 342-2 for a packet transferred from the physical switch 343 to the physical server 341-2. A packet as an execution result is returned from the physical server 341-2 to the physical switch 343, thereby providing the virtual network service 340.

In this example embodiment, if authentication by the control apparatus 310 is valid, the control apparatus 310 sends a VNF activation or change instruction to the controllers 342-1 and 342-2, and makes settings.

FIG. 3D is a view showing still other service chains of the virtual network service 340 according to this example embodiment. Referring to FIG. 3D, in each of a plurality of physical servers 341-3 to 341-6, each VNF is executed by a VM. Note that an example of a VNF providable by the physical server 341-3 is MME, an example of a VNF providable by the physical server 341-4 is GW, an example of a VNF providable by the physical server 341-5 is DPI, and an example of a VNF providable by the physical server 341-6 is FW. FIG. 3D shows two different service chains (a solid line and a broken line). These service chains may be services for individual users or carriers.

In the service chain indicated by the solid line, GW set in a controller 342-4 by the control apparatus 310 is executed by the VM managed by the controller 342-4 for a packet transferred from the physical switch 343 to the physical server 341-4. A packet as an execution result is returned from the physical server 341-4 to the physical switch 343. Next, DPI set in a controller 342-5 by the control apparatus 310 is executed by the VM managed by the controller 342-5 for a packet transferred from the physical switch 343 to the physical server 341-5. A packet as an execution result is returned from the physical server 341-5 to the physical switch 343. Then, FW set in a controller 342-6 by the control apparatus 310 is executed by the VM managed by the controller 342-6 for a packet transferred from the physical switch 343 to the physical server 341-6. A packet as an execution result is returned from the physical server 341-6 to the physical switch 343, thereby providing the virtual network service 340.

In the service chain indicated by the broken line, MME set in a controller 342-3 by the control apparatus 310 is executed by the VM managed by the controller 342-3 for a packet transferred from the physical switch 343 to the physical server 341-3. A packet as an execution result is returned from the physical server 341-3 to the physical switch 343. Next, GW set in a controller 342-4 by the control apparatus 310 is executed by the VM managed by the controller 342-4 for a packet transferred from the physical switch 343 to the physical server 341-4. A packet as an execution result is returned from the physical server 341-4 to the physical switch 343. Then, FW set in a controller 342-6 by the control apparatus 310 is executed by the VM managed by the controller 342-6 for a packet transferred from the physical switch 343 to the physical server 341-6. A packet as an execution result is returned from the physical server 341-6 to the physical switch 343, thereby providing the virtual network service 340.

In this example embodiment, if authentication by the control apparatus 310 is valid, the control apparatus 310 sends a VNF activation or change instruction to the controllers 342-3 to 342-6, and makes settings.

(Operation Procedure)

Figure 4A:
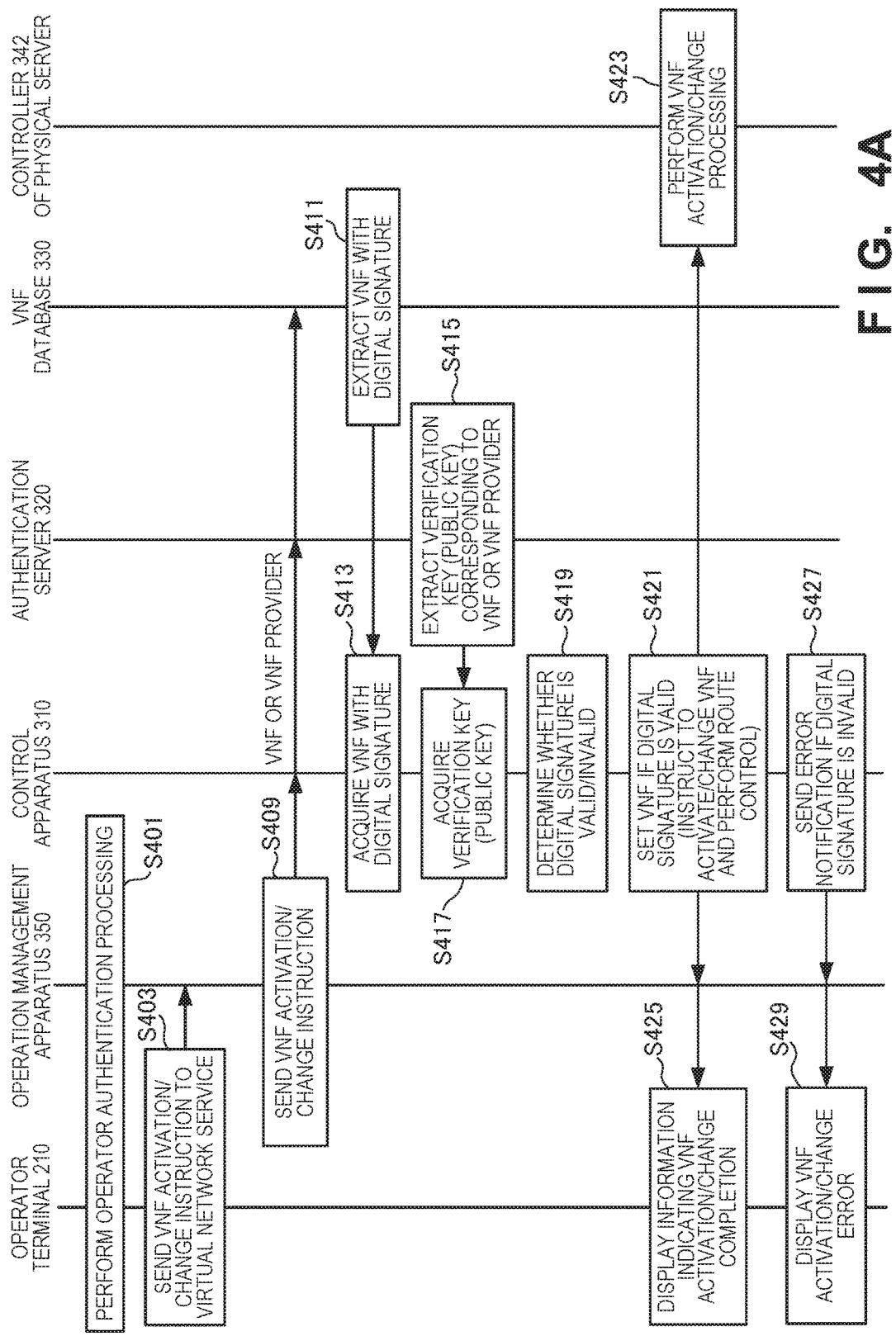
FIG. 4A is a sequence chart showing an operation procedure of the virtual network system according to the second example embodiment of the present invention.

FIG. 4A is a sequence chart showing the operation procedure of the virtual network system 200 according to this example embodiment. In the sequence of FIG. 4A, the control apparatus 310 generates a digital signature, and determines validity/invalidity.

In step S401, operator authentication processing is performed between the operator terminal 210 and the operation management apparatus 350. If operator authentication is OK, the operator terminal 210 instructs, in step S403, the operation management apparatus 350 to activate or change a desired VNF of a target virtual network service.

In step S409, the operation management apparatus 350 instructs the control apparatus 310 to activate or change the target VNF. If the operator performs route setting, this VNF activation or change instruction may include networking information indicating the route of the VNF. The instruction to activate or change the target VNF is also transmitted from the control apparatus 310 to the authentication server 320 and the VNF database 330.

In step S411, the VNF database 330 extracts VNF data with a digital signature of the target VNF, and transmits it to the control apparatus 310. In step S413, the control apparatus 310 acquires the VNF data with the digital signature. In step S415, the authentication server 320 extracts a verification key (public key) corresponding to the target VNF or a VNF provider (when one provider provides one VNF), and transmits it to the control apparatus 310. In step S417, the control apparatus 310 acquires the verification key (public keys). Then, in step S419, using the acquired VNF data with the digital signature and the acquired verification key (public key), the control apparatus 310 determines whether the digital signature is valid or invalid.

If it is determined that the digital signature of the VNF data with the digital signature is valid, the control apparatus 310 sets, in step S421, the acquired VNF in the controller 342 of the physical server 341, and notifies the operator terminal 210 of activation or change completion of the VNF. In step S423, the controller 342 of the physical server 341 executes activation or change processing of the set VNF. In step S425, the operator terminal 210 displays, on the screen, information indicating that the activation or change processing of the VNF by the operator is complete, thereby notifying the operator of it. On the other hand, if it is determined that the digital signature of the VNF data with the digital signature is invalid, the control apparatus 310 notifies, in step S427, the operator terminal 210 of an error by determining that the acquired VNF may be a VNF that has been unauthorizedly registered, altered, or erroneously registered, and terminating the activation or change processing. In step S429, the operator terminal 210 displays a VNF activation or change error on the screen, thereby notifying the operator of it.

FIG. 4B is a sequence chart showing another operation procedure of the virtual network system 200 according to this example embodiment. In the sequence of FIG. 4B, the authentication server 320 generates a digital signature and determines validity/invalidity. Note that in FIG. 4B, the same step numbers as those in FIG. 4A denote the same steps and a description thereof will be omitted.

If a VNF activation or change instruction is received, the control apparatus 310 requests, in step S451, the authentication server 320 to determine whether the VNF is valid or invalid. In step S453, the authentication server 320 acquires a VNF with a digital signature from the VNF database 330. In step S455, the authentication server 320 extracts a verification key (public key) corresponding to the VNF or a VNF provider. In step S457, the authentication server 320 determines, using the verification key, whether the VNF with the digital signature is valid or invalid, and returns the determination result to the control apparatus 310.

In step S459, the control apparatus 310 acquires the VNF validity/invalidity determination result. If the VNF is valid, the control apparatus 310 executes step S421; otherwise, the control apparatus 310 executes step S427.

<<Functional Arrangement of Control Apparatus>>

FIG. 5A is a block diagram showing the functional arrangement of the control apparatus 310 according to this example embodiment.

The control apparatus 310 includes an interface 511, a route manager 512, a VNF manager 513, an activation/change controller 514, and a management database 515. Note that the management database 515 may be provided outside the control apparatus 310.

The interface 511 communicates with other components forming the virtual network system 200. In this example embodiment, the interface 511 is connected to the authentication server 320 to communicate the verification key (public key), and communicates with the VNF database 330 to communicate the VNF with the digital signature. Furthermore, the interface 511 receives a VNF activation or change instruction including VNF information from the operator terminal 210 via the operation management apparatus 350. The interface 511 is connected to the controller 342 of the physical server 341 to transmit VNF control information and path information. The interface 511 is also connected to the physical switch 343 to transmit route control information.

The route manager 512 performs route control for the controller 342 of the physical server 341 via the interface 511. For example, if the digital signature authentication result is valid, the route manager 512 instructs the controller 342 of the physical server 341 to perform route setting corresponding to the acquired VNF. For example, Neutron or the like that controls a virtual network via a virtual hypervisor in OpenStack is used as the route manager 512. Note that the route manager 512 may instruct the physical switch 343 outside the physical server 341 to perform route setting, in accordance with route management information. With reference to VNF management information by the operation management apparatus 350, the VNF manager 513 performs VM control for the controller 342 of the physical server 341 via the interface 511. For example, if the digital signature authentication result is valid, the VNF manager 513 instructs the controller 342 of the physical server 341 to set a VM corresponding to the acquired VNF. Setting of the VM includes, for example, activation, change, and deletion of the VM. For example, NOVA Compute or the like that controls the operation of the virtual machine (VM) via the virtual hypervisor in OpenStack is used as the VNF manager 513.

In response to the VNF activation or change instruction, the activation/change controller 514 controls activation or change of the VNF based on the result of determining, by authentication, whether the VNF is valid or invalid. The management database 515 stores information for managing the controller 342 of the physical server 341 and the physical switch 343 by the route manager 512 and the VNF manager 513.

<<Controller of Physical Server>>

FIG. 5B is a block diagram showing the functional arrangement of the controller 342 that controls the physical server 341 according to this example embodiment.

The controller 342 includes an interface 521, a path controller 522, and a VM controller 523.

The interface 521 communicates with other components forming the virtual network system 200. In this example embodiment, the interface 521 is connected to the control apparatus 310 to receive VNF control information and path control information. The interface 521 is also connected to the physical switch 343 to transmit/receive packet information. In addition, the interface 521 receives an authenticated VNF from the VNF database 330.

Based on the path control information received from the control apparatus 310, the path controller 522 controls paths in which VMs execute VNFs. Based on the VNF control information received from the control apparatus 310, the VM controller 523 controls the VNFs and the VMs that execute the VNFs.

Note that a VNF to be activated or changed may be directly installed from the VNF database 330 or installed via the control apparatus 310.

(Management Database)

FIG. 5C is a view showing the structure of the management database 515 according to this example embodiment. The management database 515 is used by the route manager 512 and the VNF manager 513 to manage the controller 342 of the physical server 341 and the physical switch 343. Note that the structure of the management database 515 is not limited to that shown in FIG. 5C.

The management database 515 includes a management table 530 for managing the controller 342 of the physical server 341, and a management table 540 for managing the physical switch 343.

The management table 530 stores an identification condition 531 for identifying a virtual network service, and VNF control information and path control information 532 corresponding to the identification condition 531. The identification condition 531 includes, for example, a carrier ID for identifying a carrier, and a packet header for identifying a packet. The VNF control information and path control information 532 include VNFs and their path order (route).

The management table 540 stores an identification condition 541 for identifying a virtual network service, and route control information 542 corresponding to the identification condition 541. The identification condition 541 includes, for example, a carrier ID for identifying a carrier, and a packet header for identifying a packet. The route control information 542 includes a physical server and its route.

<<Functional Arrangement of Operation Management Apparatus>>

Figure 6A:
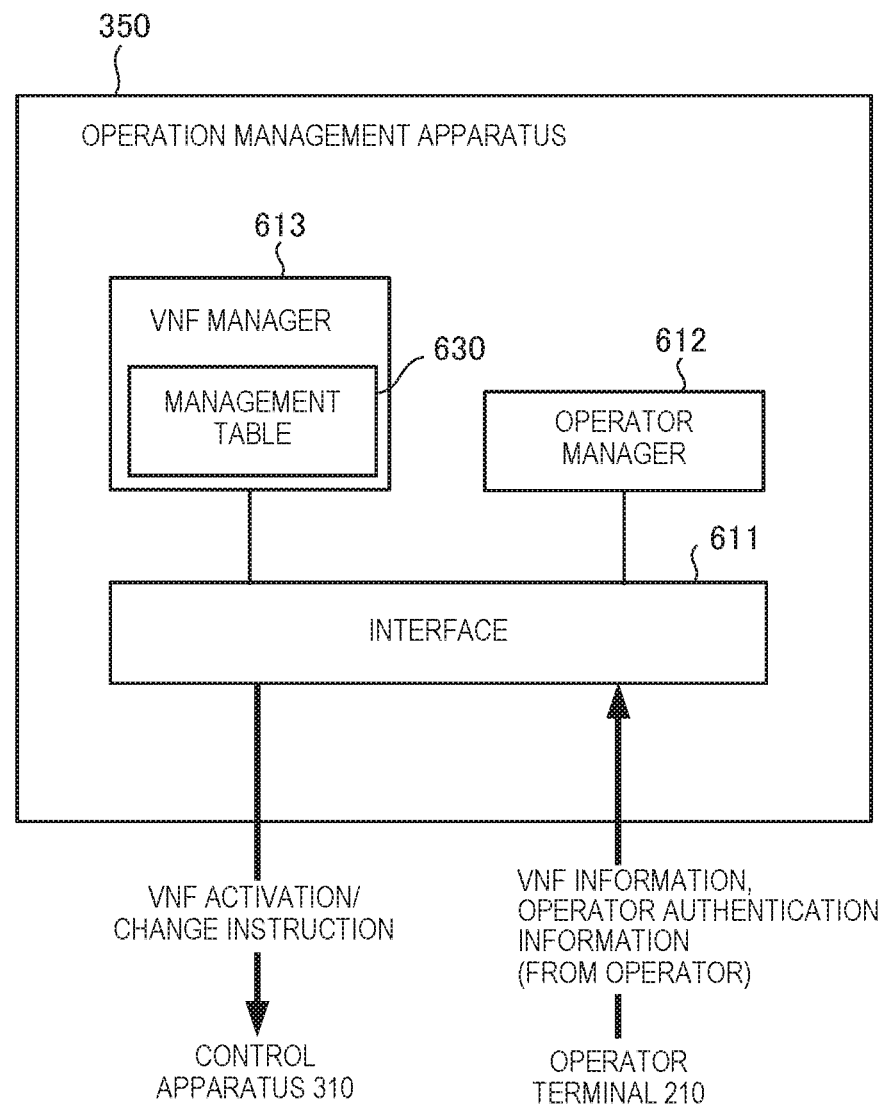
FIG. 6A is a block diagram showing the functional arrangement of an operation management apparatus according to the second example embodiment of the present invention.

FIG. 6A is a block diagram showing the functional arrangement of the operation management apparatus 350 according to this example embodiment.

The operation management apparatus 350 includes an interface 611, an operator manager 612, and a VNF manager 613.

The interface 611 communicates with other components forming the virtual network system 200. In this example embodiment, the interface 611 is connected to the operator terminal 210 to receive a VNF activation or change instruction input by the operator, VNF information, and operator authentication information, and to transmit the VNF activation or change result to the operator terminal 210. The interface 611 is connected to the control apparatus 310 to transmit a VNF activation or change request and receive a VNF activation or change result corresponding to a digital signature authentication result from the control apparatus 310.

The operator manager 612 registers an operator, and performs authentication processing of approving access by the operator from the operator terminal 210. The VNF manager 613 includes a management table 630 for managing VNFs, and manages the current VNF registration state based on VNF information from the operator terminal 210, VNF control information of VNF activation/change by the control apparatus 310, or the like.

(Management Table)

Figure 6B:
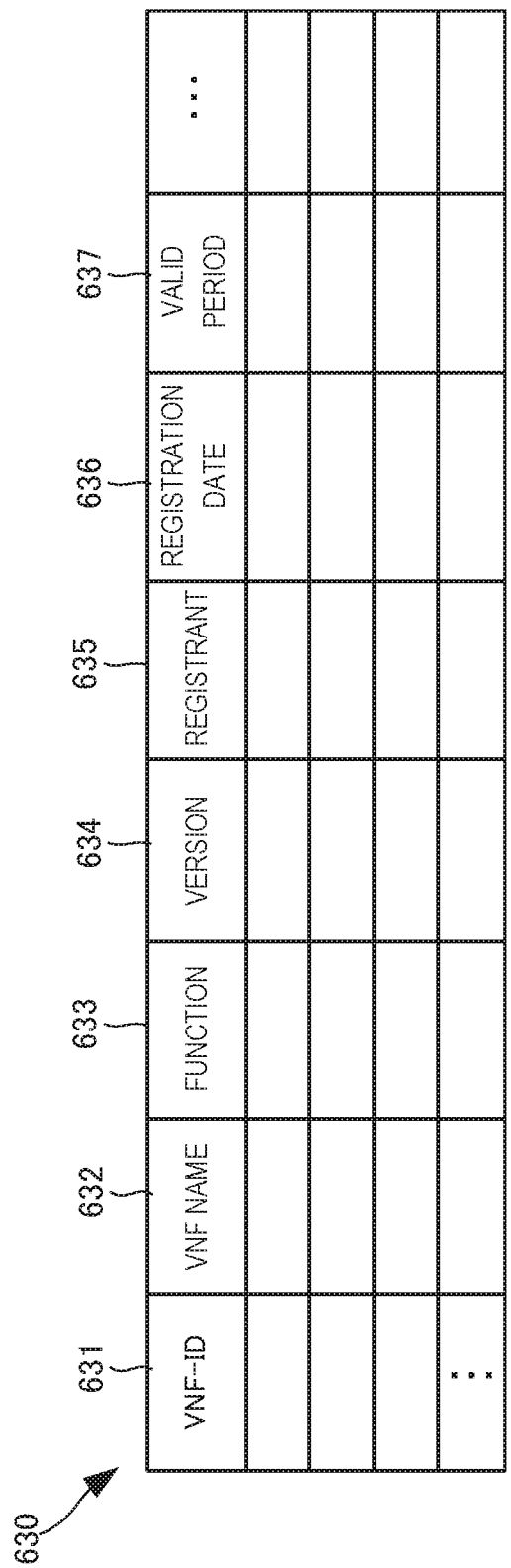
FIG. 6B is a table showing the structure of a management table according to the second example embodiment of the present invention.

FIG. 6B is a table showing the structure of the management table 630 according to this example embodiment. The management table 630 is used for an operation associated with a VNF from the operator terminal 210. Note that the structure of the management table 630 is not limited to that shown in FIG. 6B.

The management table 630 stores a VNF name 632, a VNF function 633, a version 634, a registrant 635, a registration date 636, a valid period 637, and the like in association with a VNF-ID 631 as a VNF identifier.

<<Authentication Data and VNF Data>>

Various structures of the authentication data and the VNF data held in the VNF database according to this example embodiment will be described below with reference to FIGS. 7A to 7G. However, the structures of the authentication data and VNF data are not limited to them. To prevent a virtual network function from being unauthorizedly registered, altered, or erroneously registered, it is possible to add other information to the provider information of the virtual network function. Note that authentication may be performed by combining FIGS. 7A to 7G. Note that a digital signature as authentication data of this example embodiment may be calculated from the VNF data or calculated by adding search data to the VNF data to improve the confidentiality.

(Authentication by VNF)

Figure 7A:
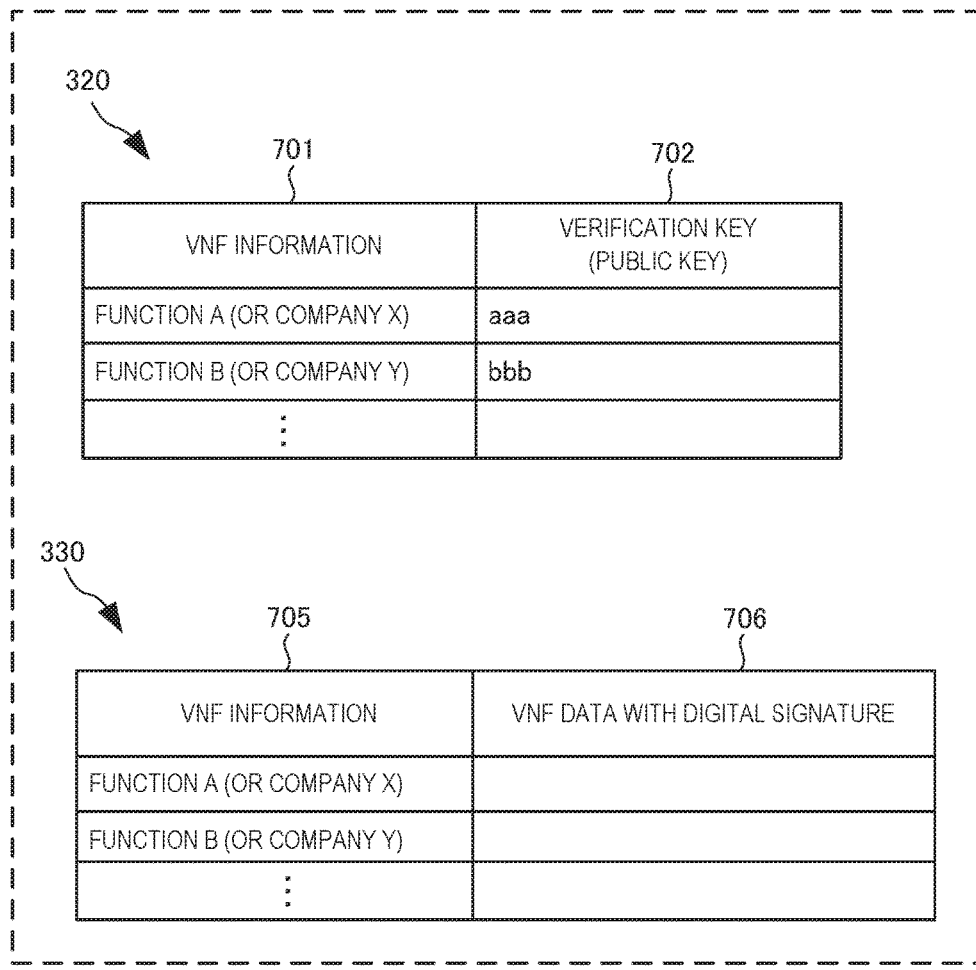
FIG. 7A is a view showing the structures of authentication data and VNF data according to the second example embodiment of the present invention.

FIG. 7A is a view showing the structures of the authentication data and VNF data according to this example embodiment. FIG. 7A shows the structure of the authentication data held in the authentication server 320 and that of the VNF data stored in the VNF database 330 when provision of one function is simply contracted for one VNF provider (third party).

The authentication server 320 stores a verification key (public key) 702 in association with VNF information 701. Note that the VNF information 701 may be function information (function A or function B in FIG. 7A) input by the operator or provider information (company X or company Y in FIG. 7A) input by a VNF provider.

The VNF database 330 stores VNF data 706 with a digital signature in association with VNF information 705. Note that the VNF information 705 may be function information (function A or function B in FIG. 7A) input by the operator or provider information (company X or company Y in FIG. 7A) input by a VNF provider.

In FIG. 7A, a digital signature is generated in association with the provided function or the VNF provider, and verified.

(Authentication by VNF and Provider)

Figure 7B:
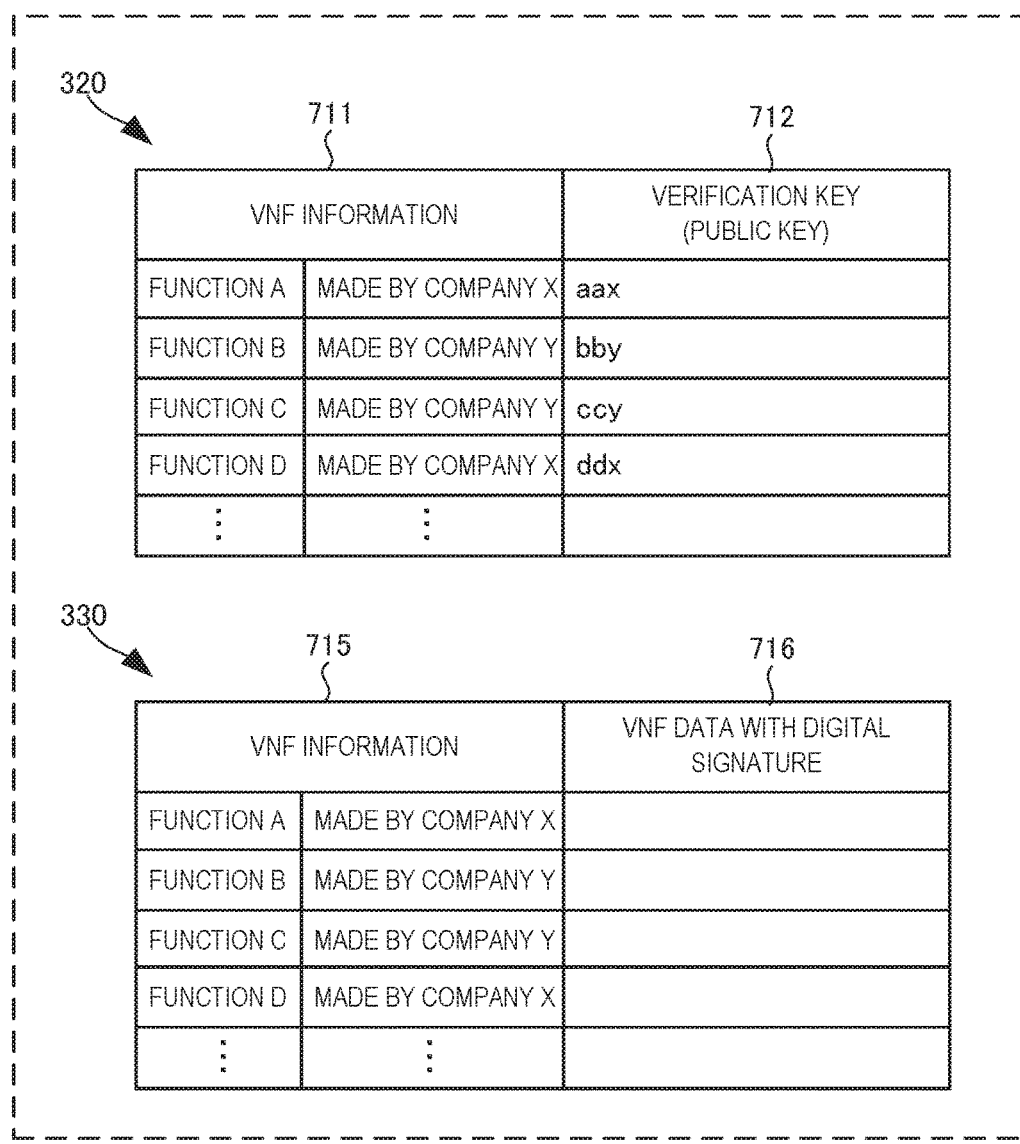
FIG. 7B is a view showing other structures of the authentication data and VNF data according to the second example embodiment of the present invention.

FIG. 7B is a view showing other structures of the authentication data and VNF data according to this example embodiment. FIG. 7B shows the structure of the authentication data held in the authentication server 320 and that of the VNF data stored in the VNF database 330 when provision of a plurality of functions to one VNF provider (third party) is contracted.

The authentication server 320 stores a verification key (public key) 712 in association with VNF information 711. Note that the VNF information 711 includes function information (function A or function B) and VNF provider information (company X or company Y).

The VNF database 330 stores a VNF 716 with a digital signature in association with VNF information 715. Note that the VNF information 715 includes function information and VNF provider information.

In FIG. 7B, a digital signature is generated in association with each pair of a provided function and a VNF provider, and verified.

(Authentication when Plural Providers Provide Same VNF)

Figure 7C:
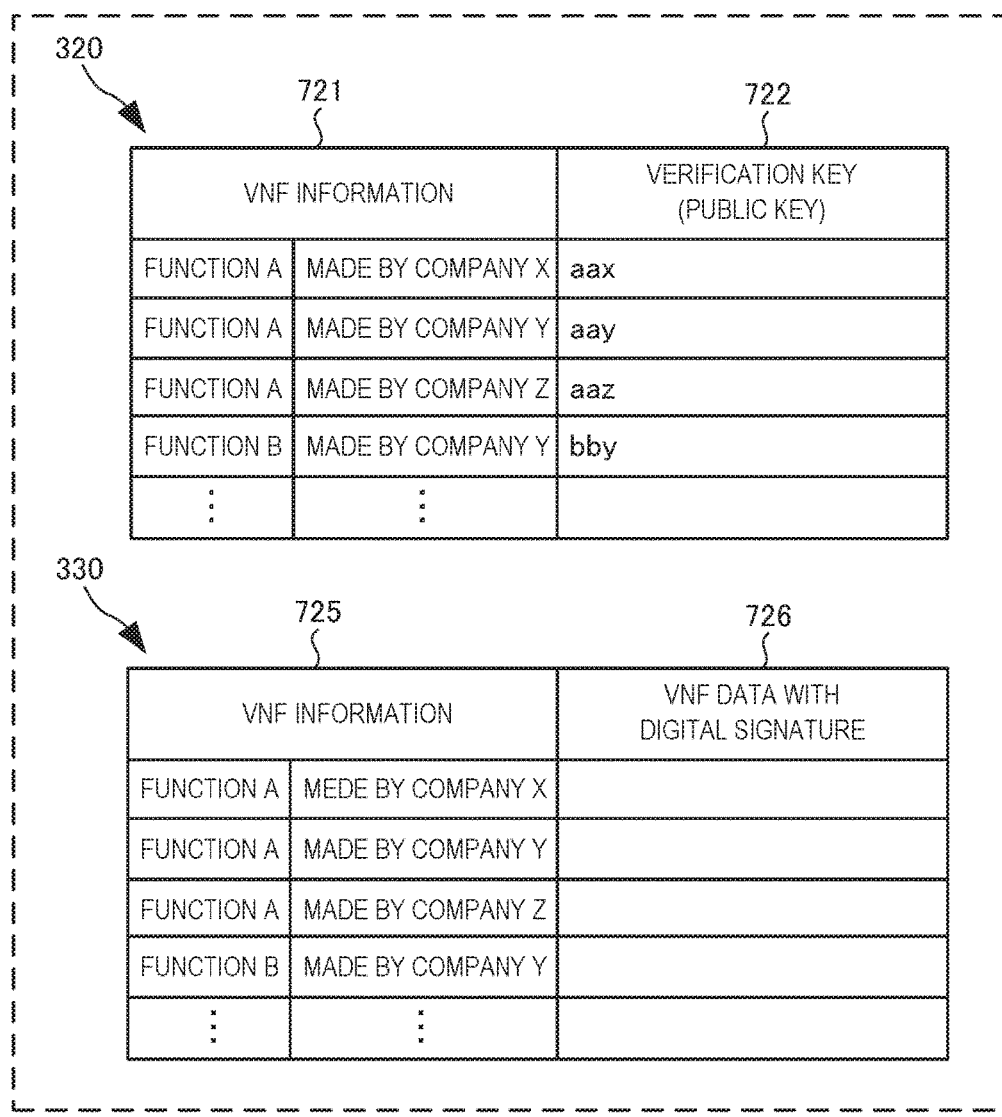
FIG. 7C is a view showing still other structures of the authentication data and VNF data according to the second example embodiment of the present invention.

FIG. 7C is a view showing still other structures of the authentication data and VNF data according to this example embodiment. FIG. 7C shows the structure of the authentication data held in the authentication server 320 and that of the VNF data stored in the VNF database 330 when function provision by a plurality of VNF providers (third parties) for one function is contracted.

The authentication server 320 stores a verification key (public key) 722 in association with VNF information 721. Note that the VNF information 721 includes function information and VNF provider information, and a plurality of VNF providers (companies X to Z) may provide one function (function A).

The VNF database 330 stores a VNF 726 with a digital signature in association with VNF information 725. Note that the VNF information 725 includes function information and VNF provider information, and a plurality of VNF providers may provide one function.

In FIG. 7C, a digital signature is generated in association with one provided function and a plurality of VNF providers, and verified.

(Authentication in Consideration of Operator Who Instructs Activation or Change)

Figure 7D:
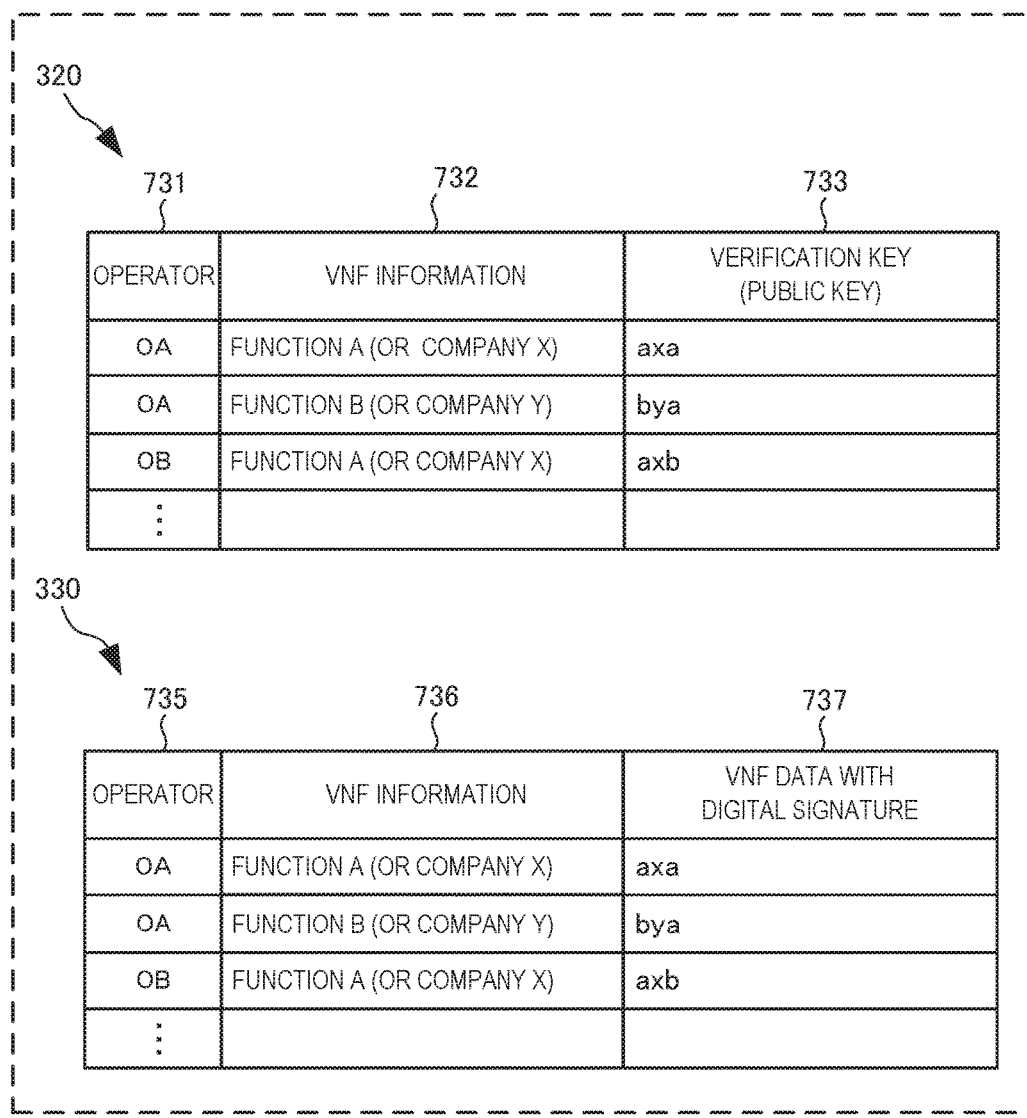
FIG. 7D is a view showing still other structures of the authentication data and VNF data according to the second example embodiment of the present invention.

FIG. 7D is a view showing still other structures of the authentication data and VNF data according to this example embodiment. FIG. 7D shows the structure of the authentication data held in the authentication server 320 and that of the VNF data stored in the VNF database 330 when an operator who instructs to activate or change a VNF is considered.

The authentication server 320 stores a verification key (public key) 733 in association with an operator 731 and VNF information (function or company) 732.

The VNF database 330 stores a VNF 737 with a digital signature in association with an operator 735 and VNF information 736.

In FIG. 7D, a digital signature is generated in consideration of an operator who instructs to activate or change a VNF, and verified.

(Authentication in Consideration of Version of VNF)

Figure 7E:
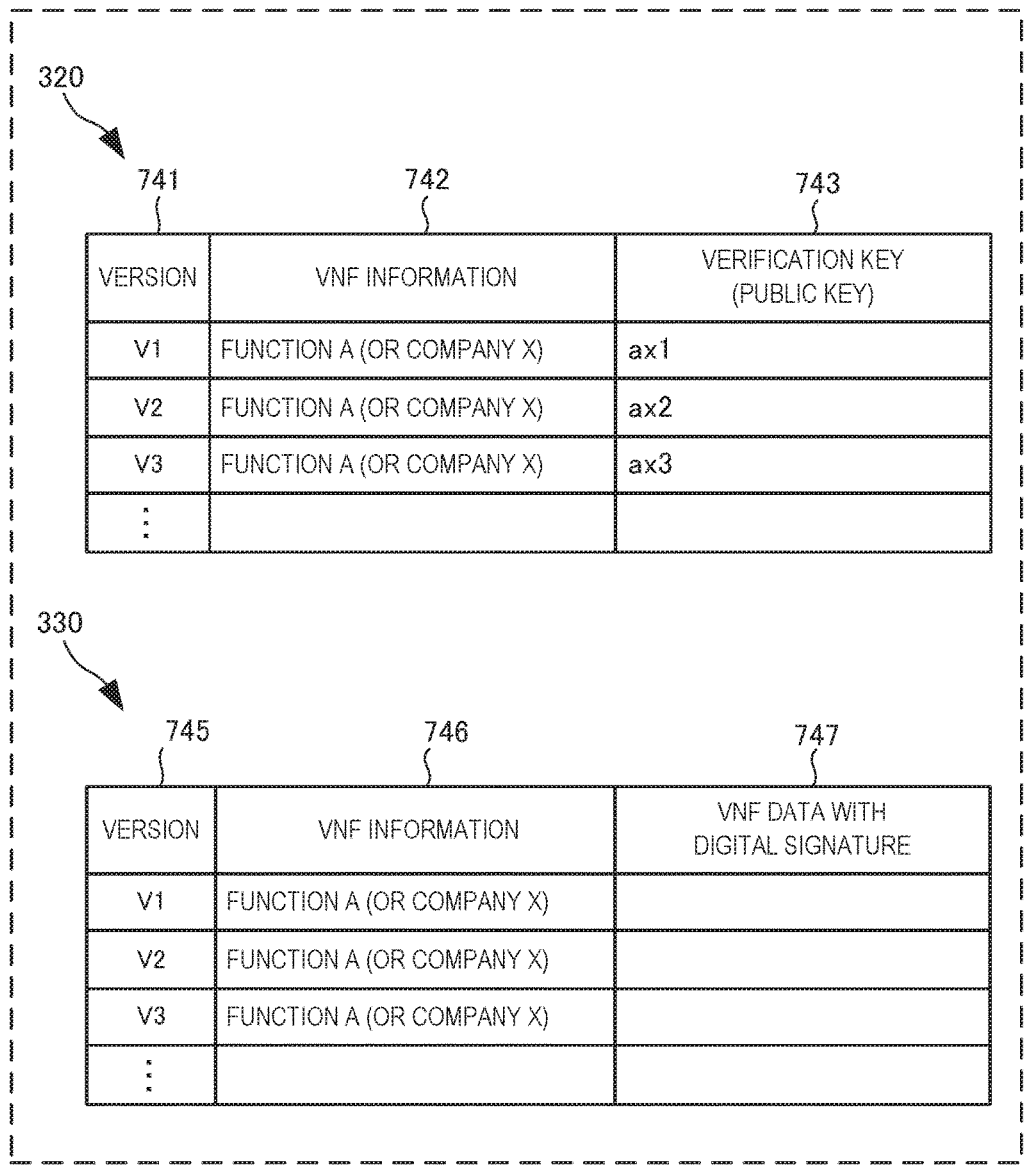
FIG. 7E is a view showing still other structures of the authentication data and VNF data according to the second example embodiment of the present invention.

FIG. 7E is a view showing still other structures of the authentication data and VNF data according to this example embodiment. FIG. 7E shows the structure of the authentication data held in the authentication server 320 and that of the VNF data stored in the VNF database 330 when a difference in version of the same VNF is considered.

The authentication server 320 stores a verification key (public key) 743 in association with a version 741 and VNF information (function or company) 742.

The VNF database 330 stores a VNF 747 with a digital signature in association with a version 745 and VNF information 746.

In FIG. 7E, a digital signature is generated in consideration of a difference in version of the same VNF, and verified.

(Authentication Protected by Random Identifier)

FIG. 7F is a view showing still other structure of the authentication data according to this example embodiment. In FIGS. 7A to 7E, each VNF and the verification key (public key) are directly associated with each other in the authentication data of the authentication server 320. To the contrary, in FIG. 7F, each VNF and a verification key (public key) are indirectly associated with each other by a random identifier to improve the confidentiality. Note that a method of improving the confidentiality of the verification key (public key) is not limited to this.

The authentication server 320 stores a random identifier 752 in association with VNF information (function and company) 751. The authentication server 320 stores a verification key (public key) 762 in association with a random identifier 761. Note that the random identification may be used for authentication by the operator or VNF provider.

(Authentication by Encryption and Decryption)

Figure 7G:
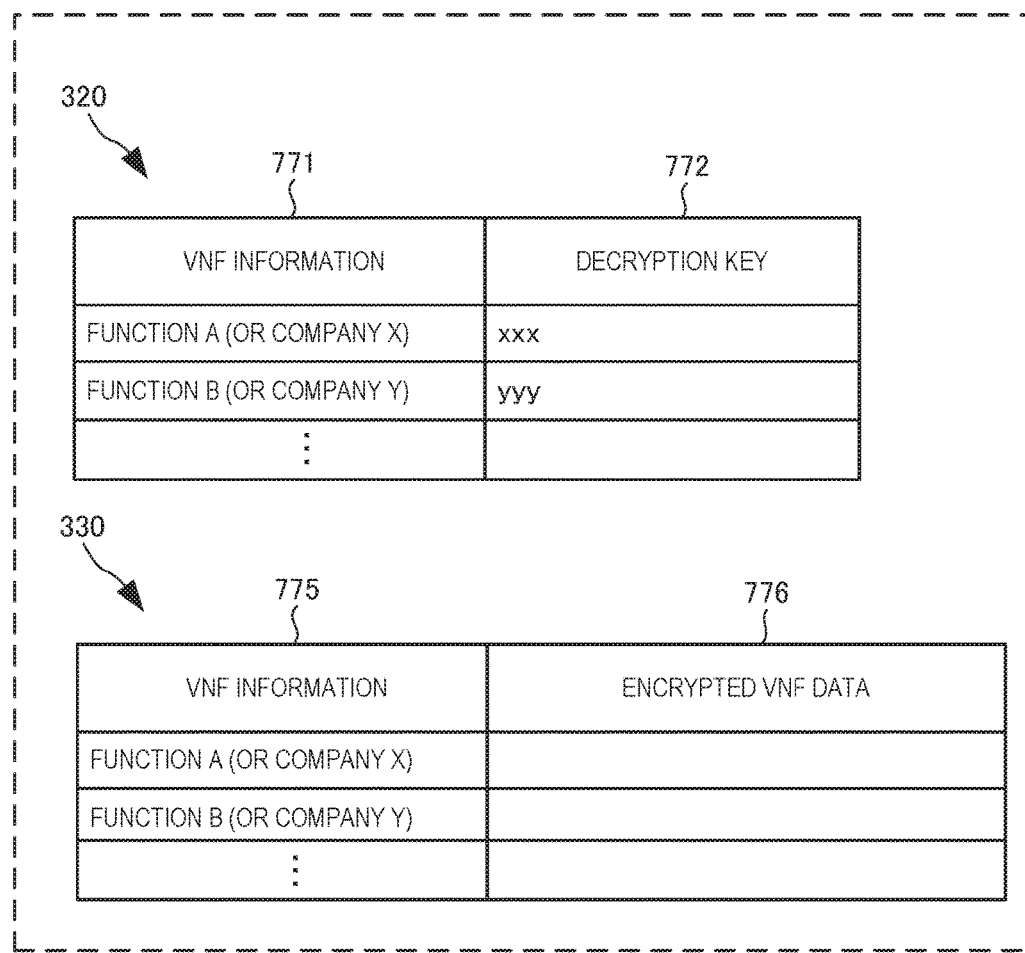
FIG. 7G is a view showing still other structures of the authentication data and VNF data according to the second example embodiment of the present invention.

FIG. 7G is a view showing still other structures of the authentication data and VNF data according to this example embodiment. FIG. 7G shows the structure of the authentication data that is held in the authentication server 320 and is used in an authentication method different from a digital signature.

The authentication server 320 stores a decryption key 772 in association with VNF information (function or company) 771. The VNF database 330 stores an encrypted VNF 776 in association with VNF information 775.

In FIG. 7G, encryption corresponding to VNF information is performed, and then decryption is performed.

<<Procedure of VNF Activation/Change Processing of Control Apparatus>>

Figure 8A:
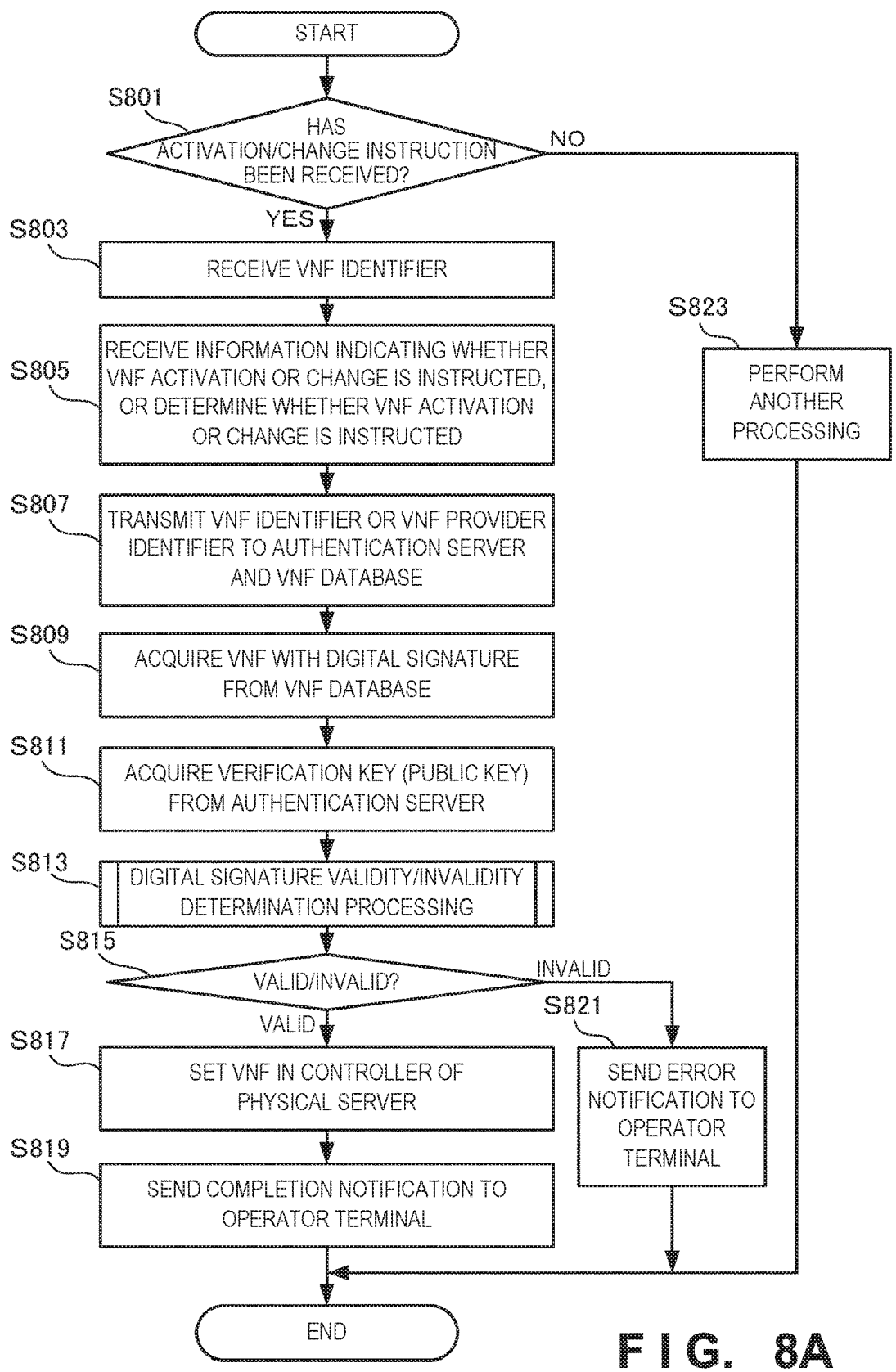
FIG. 8A is a flowchart illustrating the procedure of the VNF activation/change processing of the control apparatus according to the second example embodiment of the present invention.

FIG. 8A is a flowchart illustrating the procedure of VNF activation/change processing as the virtual network control of the control apparatus 310 according to this example embodiment.

In step S801, the control apparatus 310 determines whether a VNF activation or change instruction has been received from the operator terminal 210. If it is determined that the VNF activation or change instruction has been received, the control apparatus 310 receives, in step S803, a VNF identifier corresponding to function information input from the operator terminal 210. Note that in FIG. 7A described above, the function information may be received as VNF provider information. Next, in step S805, the control apparatus 310 receives information indicating whether the operator instruction is a VNF activation instruction or a VNF change instruction. If the information is received, the control apparatus 310 receives the selection input of the operator indicating VNF activation or change, or a determination result based on a target virtual network service and a target VNF in the operation management apparatus 350. In step S805, based on the target virtual network service and the target VNF, the control apparatus 310 may determine whether the operator instruction is a VNF activation instruction or a VNF change instruction. In the processing of determining whether the operator instruction is a VNF activation instruction or a VNF change instruction, whether a new VNF is to be activated or the VNF is to be changed (replaced) is determined with reference to a VNF currently operating as the target virtual network service, its route, and the like.

In step S807, the control apparatus 310 requests the following data transmission by transmitting the VNF identifier or VNF provider identifier to the authentication server 320 and the VNF database 330. In response to the transmission of the VNF identifier or VNF provider identifier, in step S809, the control apparatus 310 acquires a VNF with a digital signature associated with the VNF identifier or VNF provider identifier from the VNF database 330. In response to the transmission of the VNF identifier or VNF provider identifier, in step S811, the control apparatus 310 acquires a verification key (public key) associated with the VNF identifier or VNF provider identifier from the authentication server 320. In step S813, based on the acquired VNF with the digital signature and the verification key (public key), the control apparatus 310 executes processing of determining whether the digital signature is valid or invalid.

In step S815, the control apparatus 310 braches the processing based on the result of determining whether the digital signature is valid or invalid. If the digital signature is valid, the control apparatus 310 sets, in step S817, the VNF acquired from the VNF database 330 in the controller 342 of the target physical server 341. In step S819, the control apparatus 310 sends, to the operator terminal 210, a completion notification of activation or change of the target VNF in the target virtual network service. On the other hand, if the digital signature is invalid, in step S821 the control apparatus 310 discards the VNF acquired from the VNF database 330 by determining that the VNF may have been unauthorizedly registered, altered, or erroneously registered, and then sends, to the operator terminal 210, an error notification of activation or change of the VNF.

Note that if it is determined that neither a VNF activation instruction nor a VNF change instruction has been received from the operator terminal 210, the control apparatus 310 performs, in step S823, processing other than the VNF activation or change processing. The other processing includes VNF registration or update processing (to be described later), and path control and route control without the VNF activation or change processing.

(Validity/Invalidity Determination Processing)

FIG. 8B is a flowchart illustrating the procedure of the digital signature validity/invalidity determination processing (step S813) according to this example embodiment. Note that FIG. 8B shows validity/invalidity determination processing for an example of the digital signature. Another digital signal may be equally applied.

In step S831, the control apparatus 310 calculates a hash value based on the VNF data of the VNF with the digital signature acquired from the VNF database 330. In step S833, the control apparatus 310 decrypts the digital signature of the VNF with the digital signature using the verification key (public key) acquired from the authentication server 320. In step S835, the control apparatus 310 determines whether the hash value based on the VNF data is equal to the decrypted value of the digital signature.

If the hash value based on the VNF data is equal to the decrypted value of the digital signature, the control apparatus 310 turns on the valid flag of the digital signature in step S837; otherwise, the control apparatus 310 turns on the invalid flag of the digital signature in step S839.

Note that in this example embodiment, the control apparatus 310 executes the digital signature validity/invalidity determination processing. However, in consideration of the confidentially, it is desirable to entrust the digital signature validity/invalidity determination processing to the authentication server 320.

According to this example embodiment, even if an operator is to create a virtual network system including a virtual network function produced by a third party, the virtual network function is protected by the digital signature of provider information, and thus it is possible to prevent unauthorized registration, alteration, or occurrence of erroneous registration.

Third Example Embodiment

A virtual network system according to the third example embodiment of the present invention will be described next. The virtual network system according to this example embodiment is different from that according to the above-described second example embodiment in that when a third party registers or updates a virtual network function, processing of generating and registering a virtual network function with a digital signature and a verification key (public key) is included. The remaining components and operations are the same as those in the second example embodiment. Hence, the same reference numerals denote the same components and operations, and a detailed description thereof will be omitted. That is, authentication processing using a digital signature in an activation or change instruction of the virtual network function by the operator is the same as in the second example embodiment, and a description thereof will be omitted in this example embodiment.

<<Virtual Network System>>

The virtual network system according to this example embodiment will be described in detail below with reference to FIGS. 9A to 11B. Note that in this example embodiment, only registration or update of a virtual network function will be described. Thus, in the virtual network system and a control apparatus, components associated with activation or change of a virtual network function are omitted.

(Outline of Registration Operation)

Figure 9A:
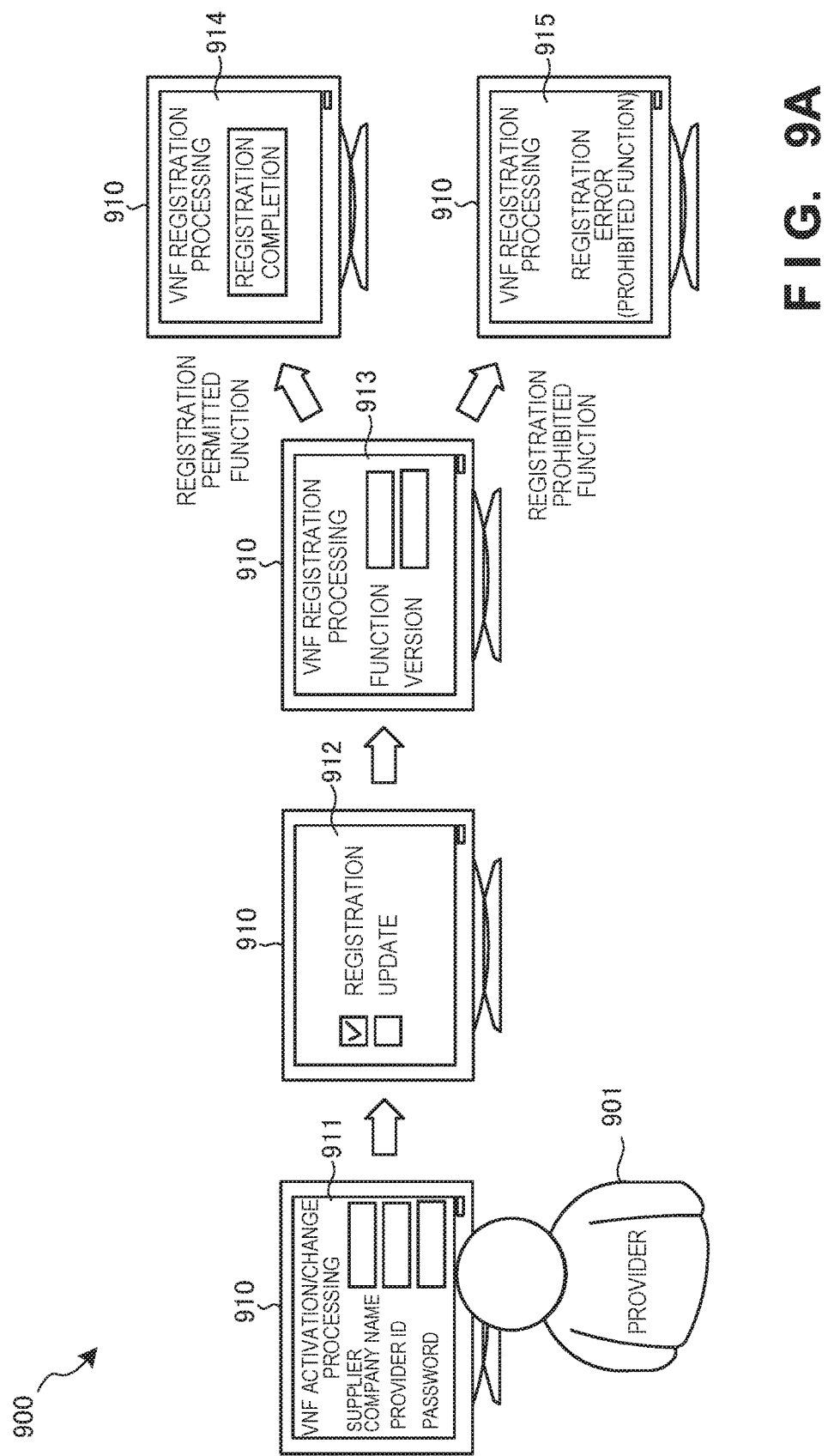
FIG. 9A is a view showing an outline of the operation of a virtual network system according to the third example embodiment of the present invention.

FIG. 9A is a view showing an outline of the operation of a virtual network system 900 according to this example embodiment. FIG. 9A shows display examples of a third party terminal 910 operated by a VNF provider (third party) 901 who instructs to register or update a virtual network function during the operation according to this example embodiment.

A display screen 911 is a screen for authenticating whether the VNF provider 901 has authority to register or update a VNF. The VNF provider 901 is authenticated by inputting a supplier company name, a provider ID, and a password.

If the VNF provider 901 is authenticated, he/she instructs to register a VNF on a display screen 912. Note that whether to register or update a VNF may be selected based on a VNF storage state of a VNF database 330, which complicates the condition. Thus, in this example embodiment, assume that the VNF provider 901 inputs the selection.

Next, the VNF provider 901 inputs, from a display screen 913, a function (VNF) to be registered, and version information as an option. According to this example embodiment, authentication information indicating whether the target VNF may be registered, that is, authentication information for preventing the target VNF from being unauthorizedly registered, altered, or erroneously registered is generated and registered. In this example embodiment, a digital signature that authenticates the VNF based on provider information is used as the authentication information. A digital signature is generated using a signature key (private key) based on VNF information and provider information, a VNF with the digital signature is stored in the VNF database, and a verification key (public key) generated accordingly is saved in an authentication server.

If the VNF with the digital signature and the verification key (public key) are normally held, information indicating the VNF registration completion is displayed on a display screen 914 of the third party terminal 910. On the other hand, if the VNF with the digital signature and the verification key (public key) are not normally held, a VNF registration error (for example, a reason as the factor of the error such as VNF registration that is not permitted for the VNF provider) is displayed on a display screen 915 of the third party terminal 910.

(Outline of Update Operation)

Figure 9B:
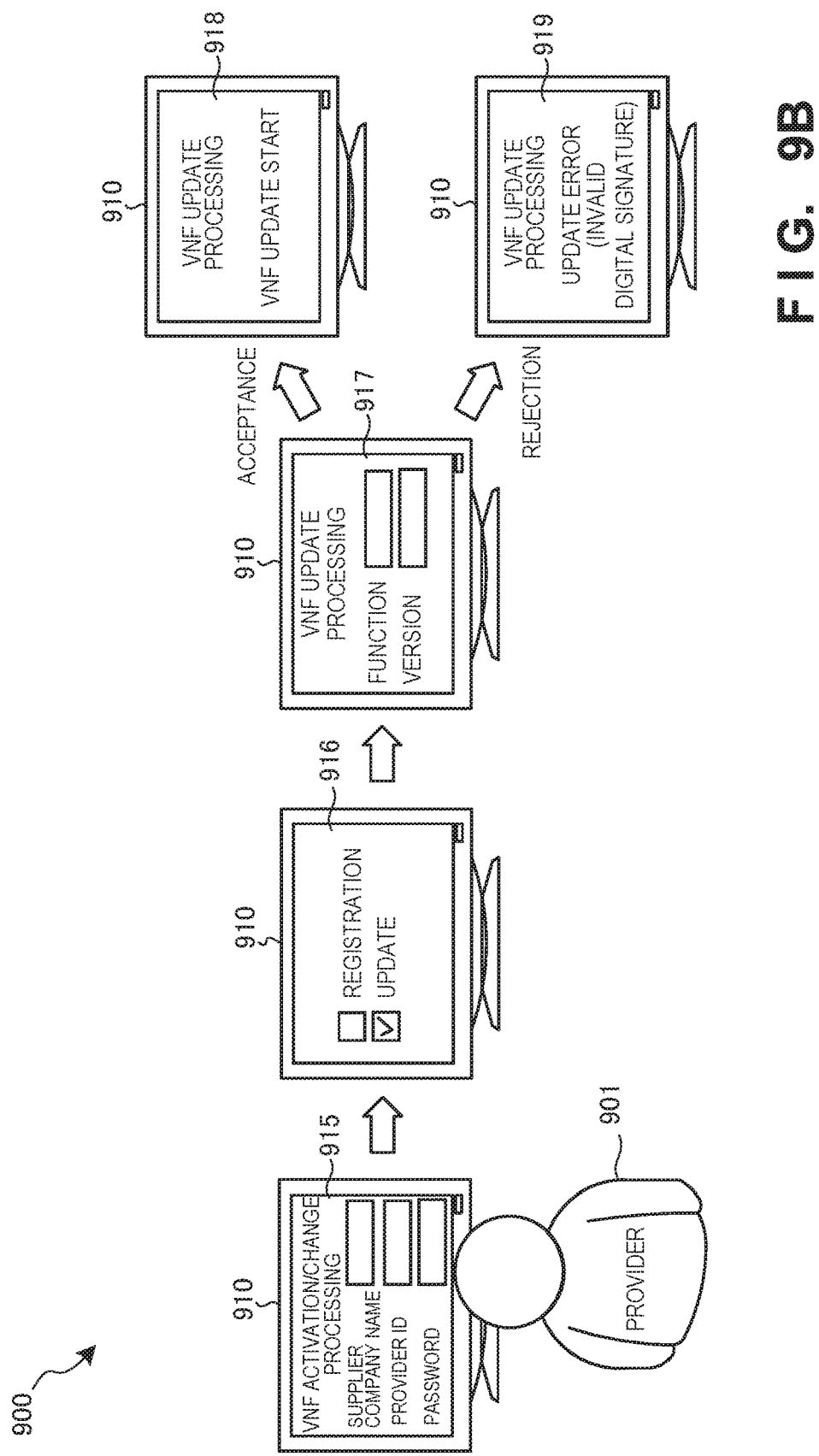
FIG. 9B is a view showing an outline of the operation of the virtual network system according to the third example embodiment of the present invention.

FIG. 9B is a view showing an outline of the operation of the virtual network system 900 according to this example embodiment. FIG. 9B shows display examples of the third party terminal 910 operated by the VNF provider (third party) 901 who instructs to register or update a virtual network function during the operation according to this example embodiment.

Similarly to FIG. 9A, the display screen 915 is a screen for authenticating whether the VNF provider 901 has authority to register or update a VNF. The VNF provider 901 is authenticated by inputting a supplier company name, a provider ID, and a password. If the VNF provider 901 is authenticated, he/she instructs to update a VNF on a display screen 916.

Next, the VNF provider 901 inputs, from a display screen 917, a function (VNF) to be updated, and version information as an option. According to this example embodiment, whether the VNF to be updated may be read out and updated, that is, whether the VNF to be updated is not a VNF that has been unauthorizedly registered, altered, or erroneously registered is authenticated based on authentication information. In this example embodiment, a digital signature that authenticates the VNF based on provider information is used as the authentication information. A pre-registered target VNF with a digital signature is read out from the VNF database, and the digital signature is authenticated using a corresponding verification key (public key) saved in the authentication server. Note that if the VNF is updated by adding a new version without reading out the existing VNF, the same procedure as the registration processing procedure shown in FIG. 9A is performed.

If the identity of the provider is accepted in authentication of the digital signature, the VNF read out from the VNF database is read out as a VNF to be updated, and information indicating the VNF update start is displayed on a display screen 918 of the third party terminal 910. On the other hand, if the identity of the provided is rejected in authentication of the digital signature, the VNF read out from the VNF database may have been unauthorizedly registered, altered, or erroneously registered. As a result, the VNF update processing is terminated, and information indicating that an update error has occurred and its factor is the invalid digital signature is displayed on a display screen 919 of the third party terminal 910.

Note that the VNF obtained by reading out and updating the existing VNF is added with a new digital signature, and the VNF with the digital signature is stored. Storage of the VNF with the new digital signature may be implemented by overwriting the old VNF or additionally storing the VNF as a new version. The processing of generating a new digital signature of the VNF and storing the VNF with the digital signature is the same as the VNF registration processing shown in FIG. 9A, and an illustration and description thereof will be omitted.

(System Arrangement)

Figure 10:
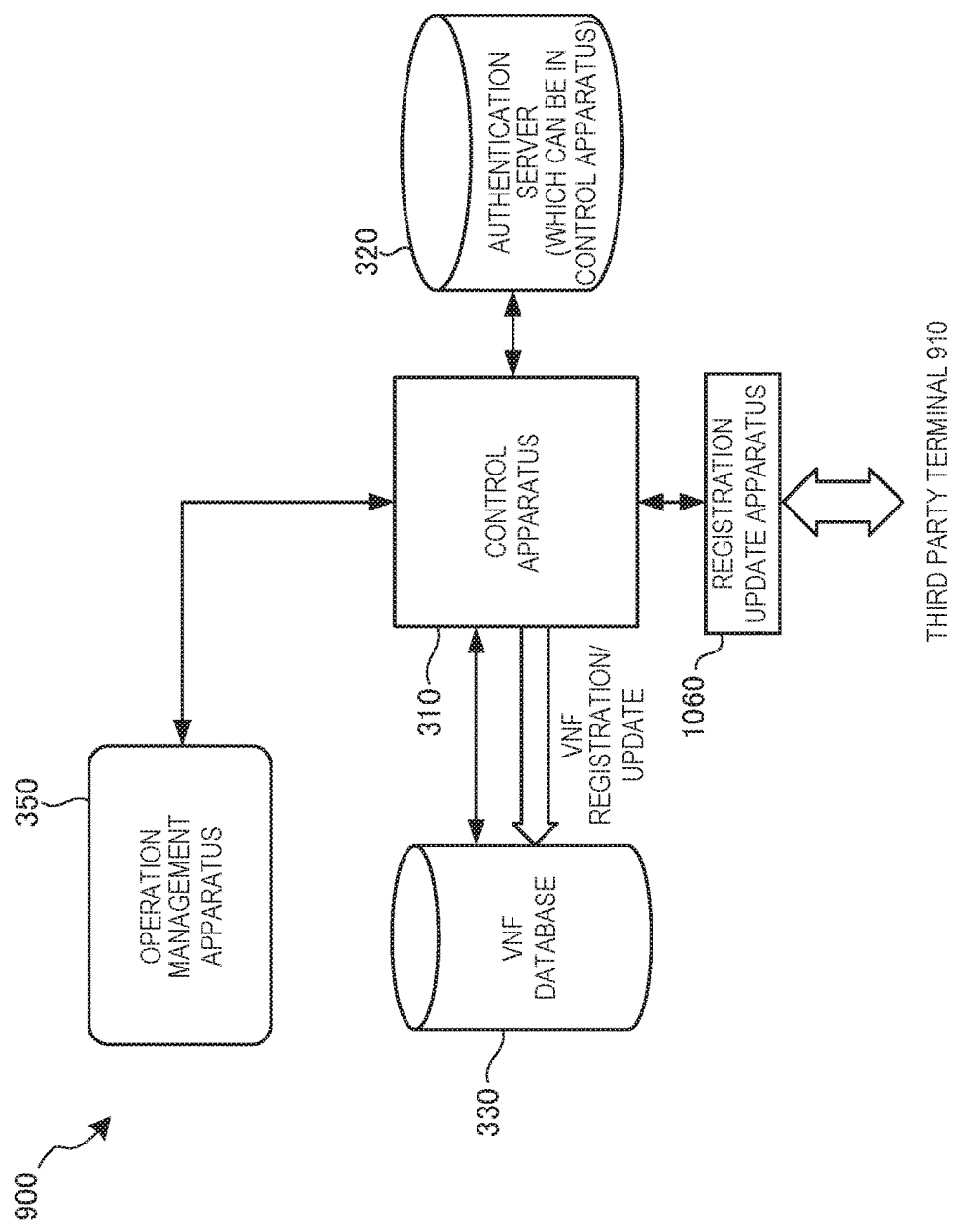
FIG. 10 is a block diagram showing the arrangement of the virtual network system according to the third example embodiment of the present invention.

FIG. 10 is a block diagram showing the arrangement of the virtual network system 900 according to this example embodiment. Note that in FIG. 10, the same reference numerals as those in FIG. 3A denote the same functional components, and a description of the same processing will be omitted. In the virtual network system 900, an arrangement related to VNF registration or update is shown but no arrangement related to VNF activation or change in FIG. 3A is shown.

In the virtual network system 900, a control apparatus 310 controls generation of a VNF with a digital signature in VNF registration of this example embodiment or authentication for VNF update, and update of the VNF based on the result. An authentication server 320 acquires authentication information generated for authentication in VNF registration of this example embodiment. The authentication server 320 also holds authentication information for authentication in VNF update. Note that the authentication server 320 may be provided in the control apparatus 310. A VNF database 330 stores the VNF with the digital signature to be searchable by provider information, a VNF identifier, or the like. A search key is not limited to the provider information or VNF identifier, as shown in FIGS. 7A to 7G, and is variously selected to prevent the VNF from being unauthorizedly registered, altered, or erroneously registered.

A registration update apparatus 1060 is connected to the third party terminal 910, and transmits a VNF registration or update instruction to the control apparatus 310.

Referring to FIG. 10, if the authenticated third party terminal 910 requests to register a VNF, a pair of a signature key (private key) and a verification key (public key) is generated by a predetermined algorithm using a pseudo random number based on VNF provider information. A digital signature is generated using the signature key (private key), and a VNF with the digital signature is stored in the VNF database 330 to be searchable by the function or provider. The corresponding verification key (public key) is saved in the authentication server 320 to be searchable by the function or provider.

On the other hand, if the authenticated third party terminal 910 requests to update a VNF, authentication which has been performed to activate or change the VNF is executed using the digital signature for detecting unauthorized registration, alteration, or erroneous registration. This authentication processing is the same as that performed to activate or change the VNF and a description thereof will be omitted. If the result of authentication using the digital signature is valid, the VNF in the VNF database 330 is read out, the third party terminal 910 sends an update instruction, and then processing of registering the updated VNF added with the digital signature in the VNF database 330 is performed again.

On the other hand, if authentication of the digital signature is not OK, that is, the digital signature is rejected, the VNF update processing is terminated, and the third party terminal 910 notifies the provider of a VNF update error via the registration update apparatus 1060.

(Registration Operation Procedure)

FIG. 11A is a sequence chart showing the registration operation procedure of the virtual network system 900 according to this example embodiment. FIG. 11A corresponds to FIG. 4A.

In step S1111, VNF provider authentication processing is performed between the third party terminal 910 and the registration update apparatus 1060. If VNF provider authentication is OK, the third party terminal 910 instructs, in step S1113, the registration update apparatus 1060 to register a VNF.

In step S1115, the registration update apparatus 1060 determines whether the VNF to be registered is a VNF that may be registered by the VNF provider. If it is determined that the VNF may be registered by the VNF provider, the registration update apparatus 1060 transmits, in step S1117, the VNF to be registered and provider information to the control apparatus 310, and requests to register the VNF. The control apparatus 310 also transmits the VNF registration request to the authentication server 320. On the other hand, if it is determined that the VNF may not be registered by the VNF provider, the registration update apparatus 1060 sends, in step S1119, an error notification to the third party terminal 910. In step S1121, the third party terminal 910 notifies the provider of the error by displaying information indicating that registration is impossible.

Upon receiving the VNF registration request, the authentication server 320 transmits, in step S1123, a digital signature generation algorithm (or application program) to the control apparatus 310. Note that if the algorithm is determined in advance or the authentication server 320 generates a digital signature, it is not necessary to transmit the algorithm in step S1123.

In step S1125, the control apparatus 310 generates a pair of a signature key (private key) and a verification key (public key) based on the provider information in accordance with the received algorithm. In step S1127, the control apparatus 310 transmits the generated verification key (public key) to the authentication server 320. In step S1129, the authentication server 320 holds the received verification key (public key) to be searchable by the provider information (or function information).

In step S1131, the control apparatus 310 generates a digital signature based on the VNF to be registered, the provider information, and the signature key (private key). In step S1133, the control apparatus 310 instructs the VNF database 330 to store the VNF with the generated digital signature. In step S1135, the VNF database 330 accumulates the VNF with the digital signature to be searchable by the VNF provider (or function information).

In step S1137, the control apparatus 310 notifies the third party terminal 910 of VNF registration completion. In step S1139, the third party terminal 910 displays information indicating the VNF registration completion.

Figure 11B:
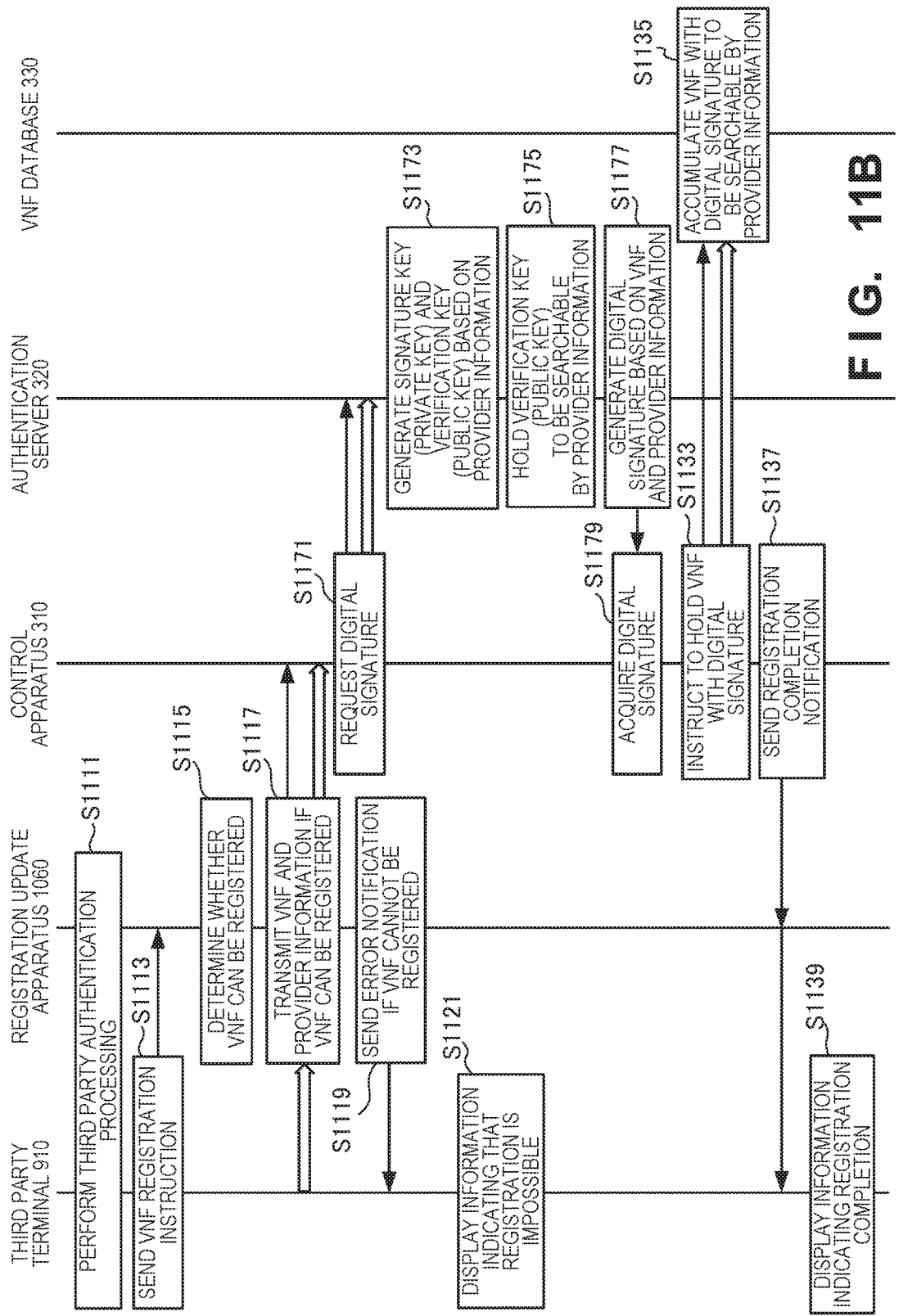
FIG. 11B is a sequence chart showing another registration operation procedure of the virtual network system according to the third example embodiment of the present invention.

FIG. 11B is a sequence chart showing another registration operation procedure of the virtual network system 900 according to this example embodiment. FIG. 11B corresponds to FIG. 4B. Note that in FIG. 11B, the same step numbers as those in FIG. 11A denote the same steps and a description thereof will be omitted.

If a VNF registration instruction is received, the control apparatus 310 requests, in step S1171, from the authentication server 320, the digital signature of the VNF to be registered. In step S1173, the authentication server 320 generates a signature key (private key) and a verification key (public key) based on provider information. In step S1175, the authentication server 320 holds the verification key (public key) to be searchable by the provider information. In step S1177, the authentication server 320 generates a digital signature based on the VNF and the provider information.

In step S1179, the control apparatus 310 acquires the digital signature of the VNF from the authentication server 320.

(Update Operation Procedure)

Figure 11C:
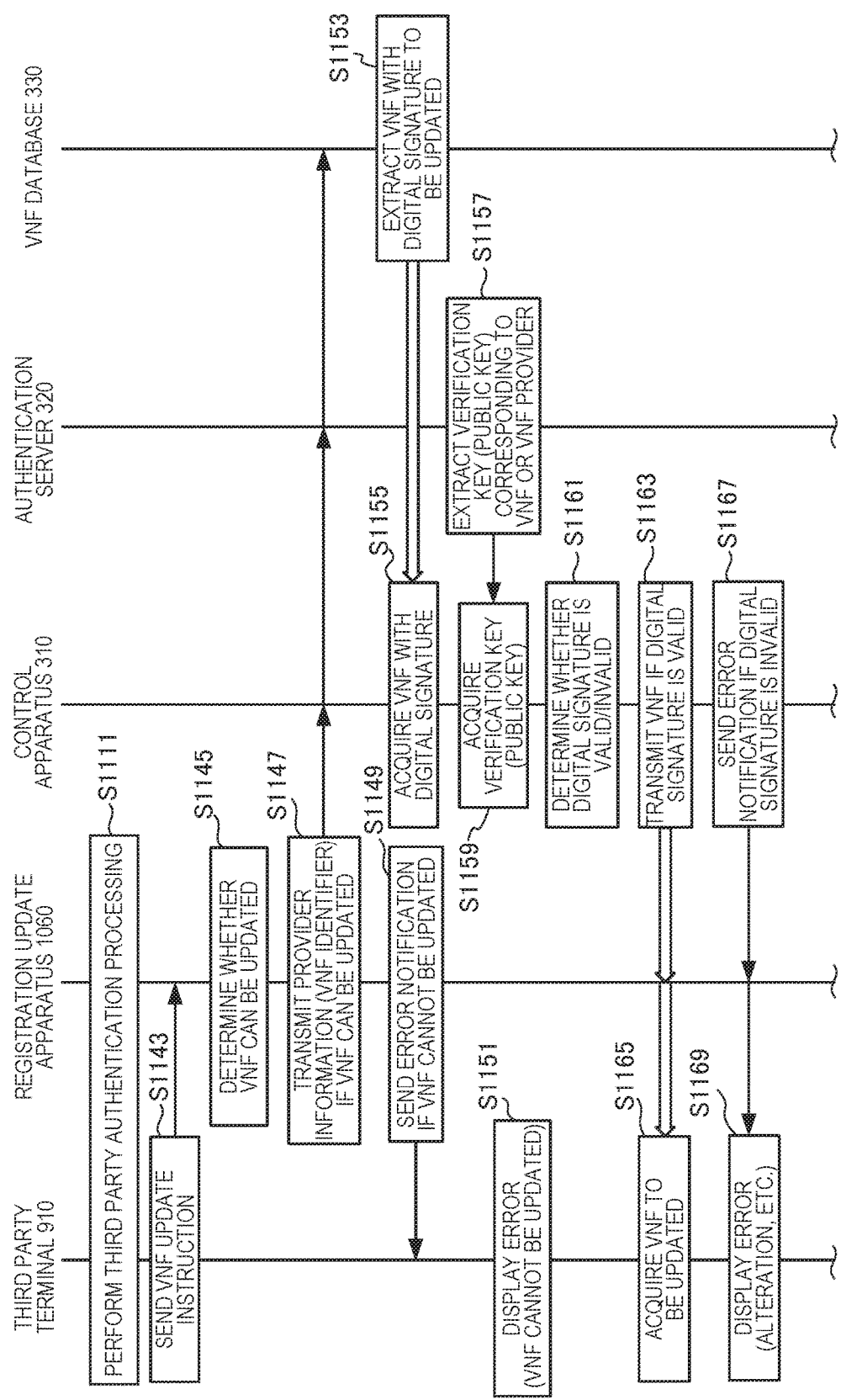
FIG. 11C is a sequence chart showing an update operation procedure of the virtual network system according to the third example embodiment of the present invention.

FIG. 11C is a sequence chart showing the update operation procedure of the virtual network system 900 according to this example embodiment. Note that the same step numbers as those in FIG. 11A denote the same steps and a description thereof will be omitted. Note that the following update operation procedure corresponds to the activation/change operation procedure shown in FIG. 4A, and an illustration and description of a procedure corresponding to FIG. 4B will be omitted.

If third party authentication is OK, the third party terminal 910 instructs, in step S1143, the registration update apparatus 1060 to update a VNF.

In step S1145, the registration update apparatus 1060 determines whether the VNF can be updated by the authenticated VNF provider (third party). If the VNF can be updated, the registration update apparatus 1060 transmits, in step S1147, the provider information of the VNF provider or a VNF identifier to the control apparatus 310, and requests to acquire the VNF to be updated. The request to acquire the VNF to be updated is also transmitted to the authentication server 320 and the VNF database 330. On the other hand, if the VNF cannot be updated by the VNF provider, the registration update apparatus 1060 sends, in step S1149, to the third party terminal 910, an error notification indicating that update is impossible. In step S1151, the third party terminal 910 displays an error indicating that the VNF cannot be updated.

In step S1153, the VNF database 330 extracts VNF data with a digital signature of the target VNF, and transmits it to the control apparatus 310. In step S1155, the control apparatus 310 acquires the VNF data with the digital signature. In step S1157, the authentication server 320 extracts a verification key (public key) corresponding to the target VNF or the VNF provider (when one provider provides one VNF), and transmits it to the control apparatus 310. In step S1159, the control apparatus 310 acquires the verification key (public key). In step S1161, using the acquired VNF data with the digital signature and the acquired verification key (public key), the control apparatus 310 determines whether the digital signature is valid or invalid.

If it is determined that the digital signature of the VNF data with the digital signature is valid, the control apparatus 310 transmits, in step S1163, the acquired VNF to the third party terminal 910 as the VNF to be updated. In step S1165, the third party terminal 910 acquires the VNF to be updated. Note that the VNF to be updated may be updated by the third party terminal 910 or updated by the control apparatus 310 based on an instruction of the third party terminal 910. On the other hand, if it is determined that the digital signature of the VNF data with the digital signature is invalid, the control apparatus 310 notifies, in step S1167, the third party terminal 910 of an error by determining that the acquired VNF may have been unauthorizedly registered, altered, or erroneously registered, and terminating the acquisition of the VNF. In step S1169, the third party terminal 910 displays, on the screen, an acquisition error of the VNF that may have been unauthorizedly registered, altered, or erroneously registered, thereby notifying the VNF provider of the error.

Registration of the updated VNF is the same as the registration operation shown in FIG. 11A, and an illustration and description thereof will be omitted.

<<Functional Arrangement of Control Apparatus>>

Figure 12:
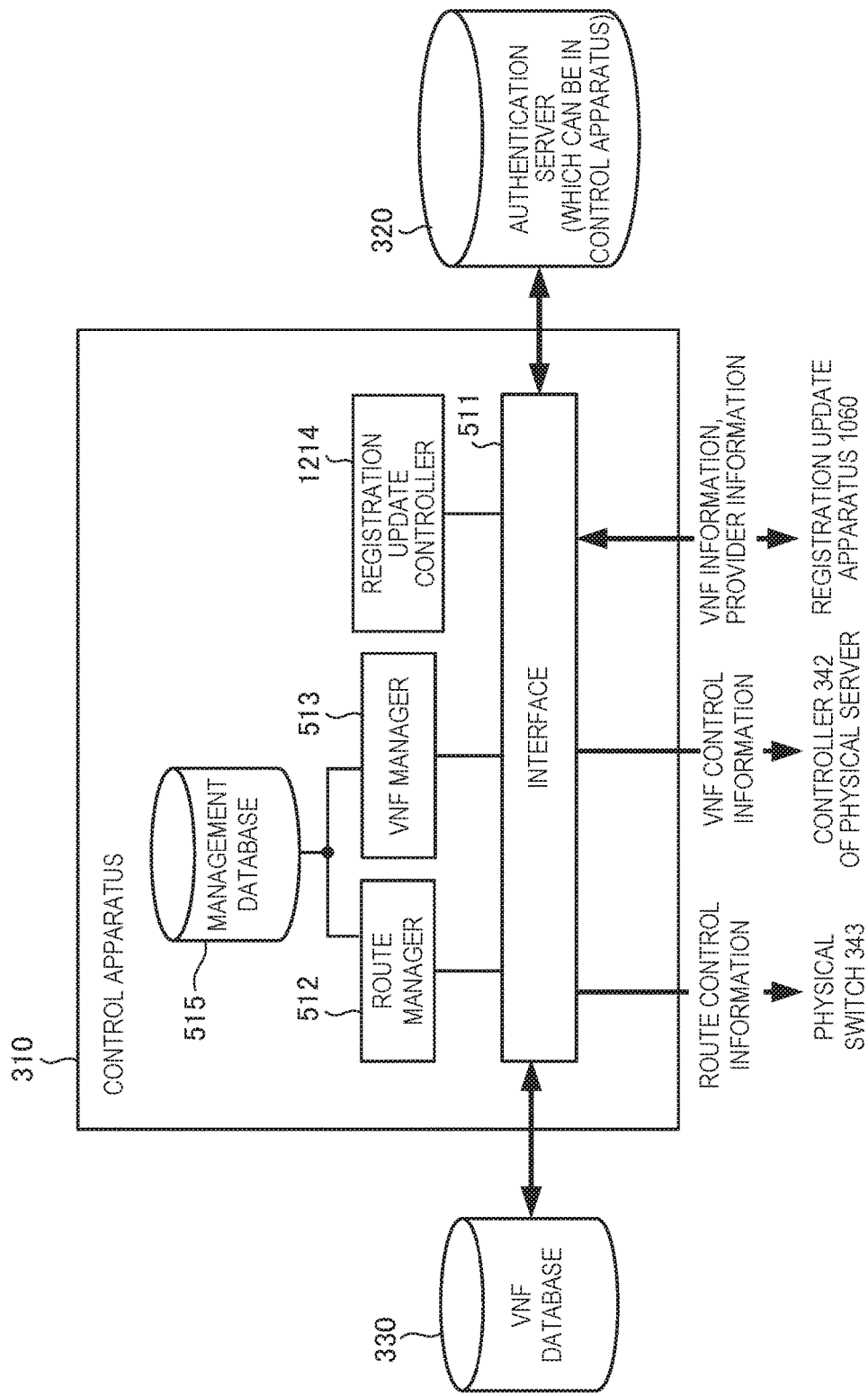
FIG. 12 is a block diagram showing the functional arrangement of a control apparatus according to the third example embodiment of the present invention.

FIG. 12 is a block diagram showing the functional arrangement of the control apparatus 310 according to this example embodiment. Note that in FIG. 12, the same reference numerals as those in FIG. 5A denote the same functional components and a description thereof will be omitted.

The control apparatus 310 further includes a registration update controller 1214. An interface 511 is connected to the registration update controller 1214 and the registration update apparatus 1060. The registration update controller 1214 controls registration processing and update processing of a VNF based on a VNF registration or update instruction received from the third party terminal 910 via the registration update apparatus 1060. In addition, the interface 511 notifies the third party terminal 910 of the processing result of the registration processing and update processing of the VNF via the registration update apparatus 1060.

<<Functional Arrangement of Registration Update Apparatus>>

Figure 13A:
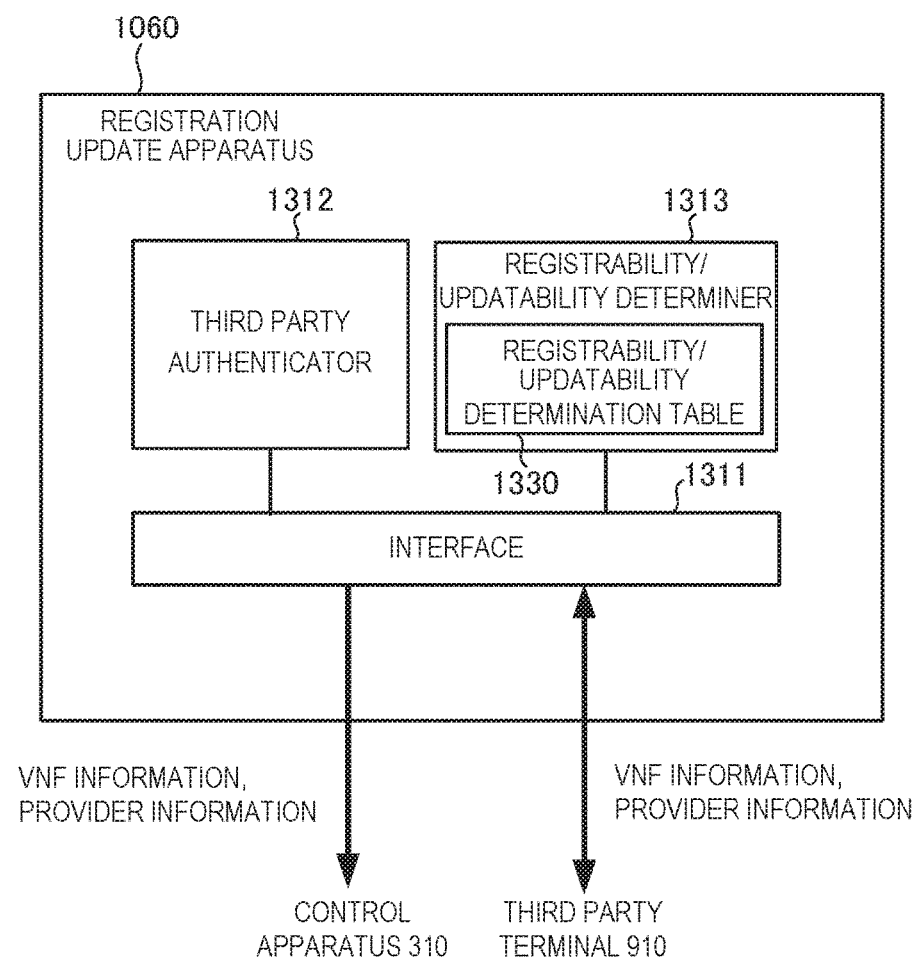
FIG. 13A is a block diagram showing the functional arrangement of a registration update apparatus according to the third example embodiment of the present invention.

FIG. 13A is a block diagram showing the functional arrangement of the registration update apparatus 1060 according to this example embodiment.

The registration update apparatus 1060 includes an interface 1311, a third party authenticator 1312, and a registrability/updatability determiner 1313.

The interface 1311 communicates with other components forming the virtual network system 900. In this example embodiment, the interface 1311 is connected to the third party terminal 910 to receive a VNF registration or update instruction input by a VNF provider, VNF information, and provider information, and to transmit a VNF registration or update result to the third party terminal 910. Furthermore, the interface 1311 is connected to the control apparatus 310 to transmit, to the control apparatus 310, the VNF information and provider information received from the third party terminal 910 in this example embodiment.

The third party authenticator 1312 authenticates the third party terminal 910 and the VNF provider who operates the virtual network system 900 using the third party terminal 910. The registrability/updatability determiner 1313 includes a registrability/updatability determination table 1330, and determines whether the VNF provider is permitted to operate the VNF that is set as a registration or update target by the VNF provider.

(Registrability/Updatability Determination Table)

FIG. 13B is a table showing the structure of the registrability/updatability determination table 1330 according to this example embodiment. The registrability/updatability determination table 1330 is used to determine whether the VNF provider is permitted to operate the VNF that is set as a registration or update target by the VNF provider.

The registrability/updatability determination table 1330 stores a VNF (in FIG. 13B, a registrable/updatable function) 1332 for which an operation is permitted, in association with provider information (third party) 1331.

<<Procedure of VNF Registration/Update Processing of Control Apparatus>>

Figure 14A:
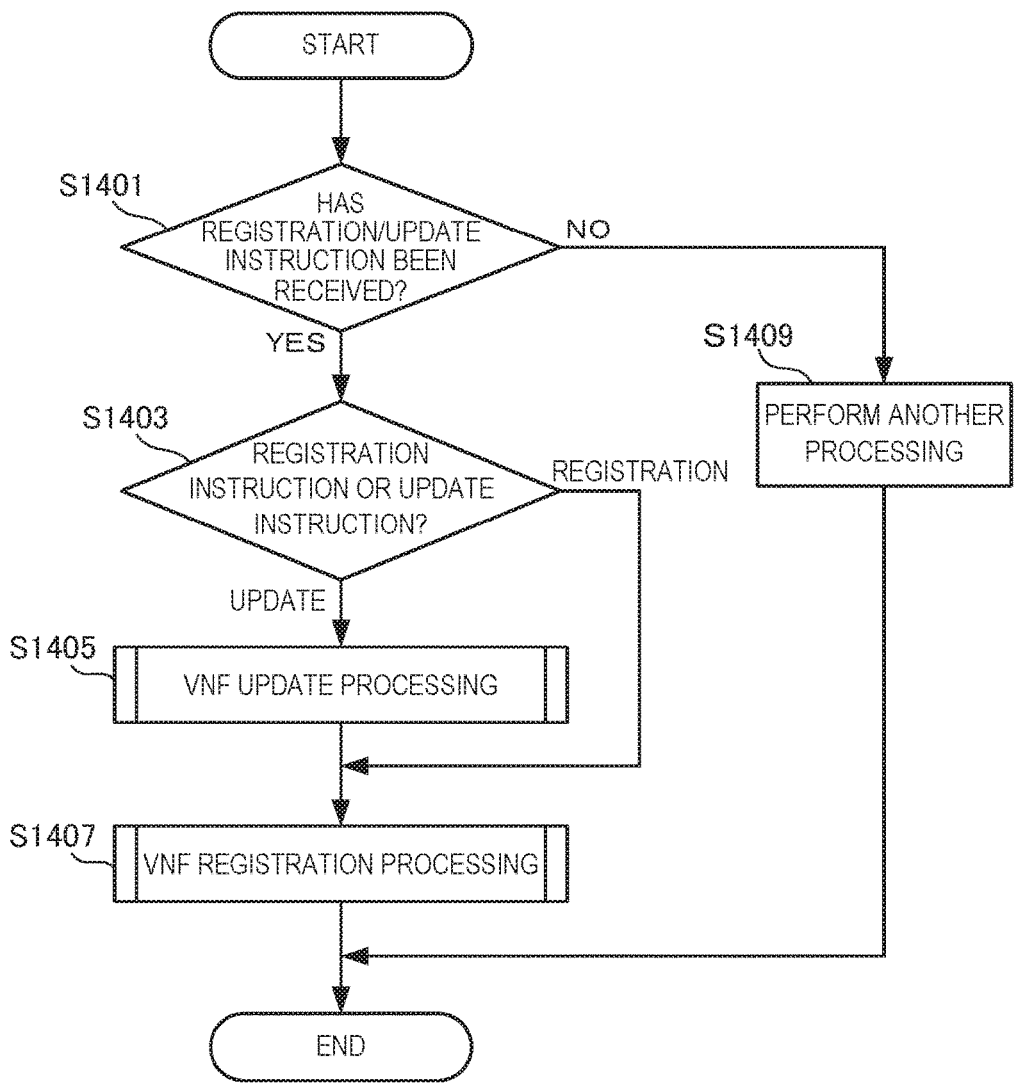
FIG. 14A is a flowchart illustrating the procedure of the VNF registration/update processing of the control apparatus according to the third example embodiment of the present invention.

FIG. 14A is a flowchart illustrating the procedure of the VNF registration/update processing of the control apparatus 310 according to this example embodiment.

In step S1401, the control apparatus 310 determines whether a VNF registration or update instruction has been received. If it is determined that a VNF registration or update instruction has been received, the control apparatus 310 determines in step S1403 whether the instruction is a registration instruction or an update instruction. If the instruction is an update instruction, the control apparatus 310 executes VNF update processing in step S1405. After the update processing, the control apparatus 310 executes VNF registration processing in step S1407. On the other hand, if the instruction is registration instruction, the control apparatus 310 executes the VNF registration processing in step S1407. If the instruction is neither a VNF registration instruction nor a VNF update instruction, the control apparatus 310 performs processing other than the VNF registration processing and VNF update processing in step S1409. The other processing includes the above-described VNF activation or change processing, and path control and route control without the VNF activation or change processing.

(VNF Update Processing)

Figure 14B:
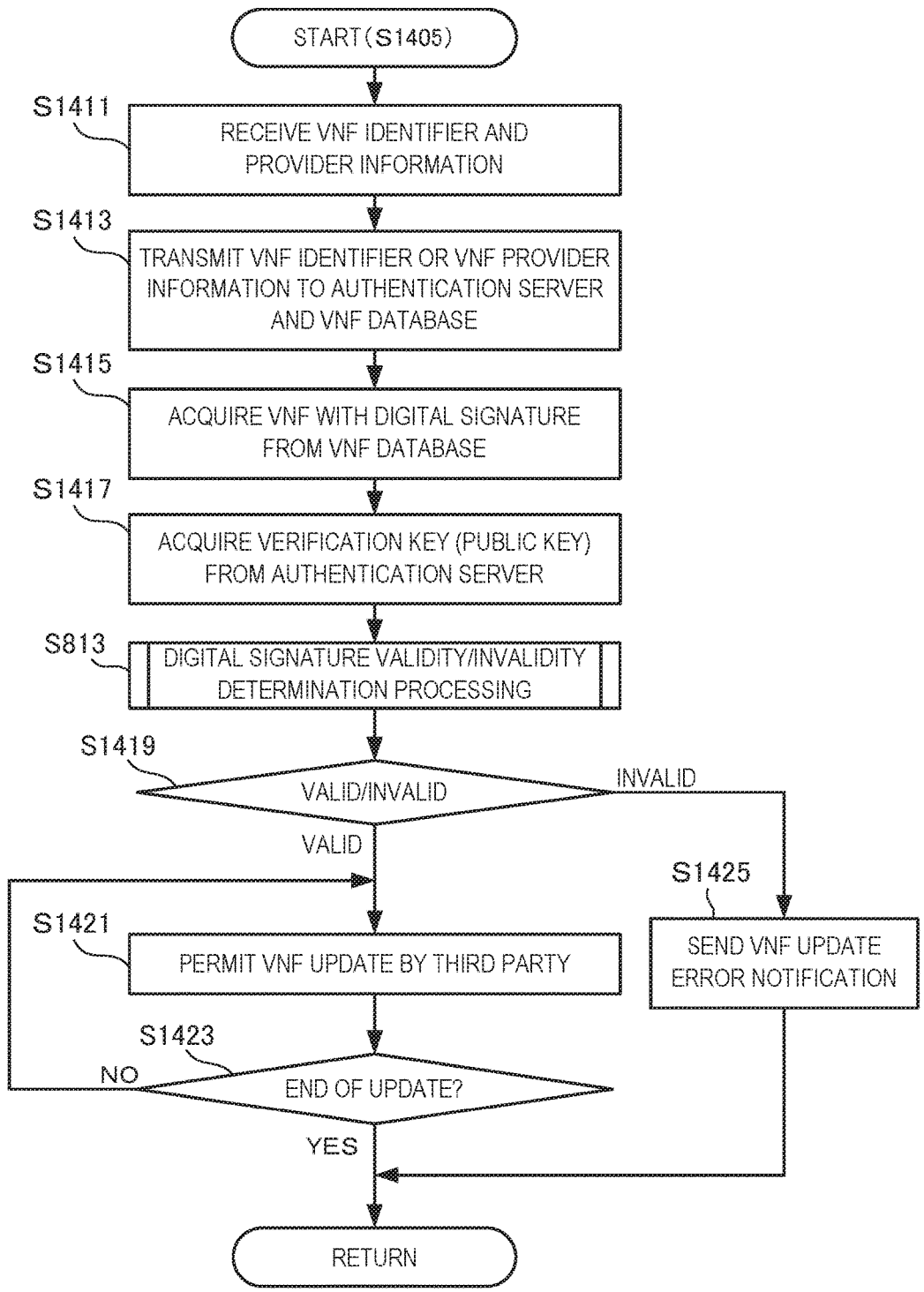
FIG. 14B is a flowchart illustrating the procedure of VNF update processing according to the third example embodiment of the present invention.

FIG. 14B is a flowchart illustrating the procedure of the VNF update processing (step S1405) according to this example embodiment.

In step S1411, the control apparatus 310 receives the identifier of the VNF to be registered and the provider information from the registration update apparatus 1060. In step S1413, the control apparatus 310 transmits the identifier of the VNF to be registered and the provider information to the authentication server 320 and the VNF database 330. In step S1415, the control apparatus 310 acquires the VNF with the digital signature from the VNF database 330. In step S1417, the control apparatus 310 acquires the corresponding verification key (public key) from the authentication server 320. In step S813, based on the acquired VNF with the digital signature and the acquired verification key (public key), the control apparatus 310 executes processing of determining whether the digital signature is valid or invalid. Note that the same algorithm as in FIG. 8B is performed in step S813.

In step S1419, the control apparatus 310 branches the processing based on a result of determining whether the digital signature is valid or invalid. If the digital signature is valid, the control apparatus 310 permits, in step S1421, update of the VNF acquired from the VNF database 330. In step S1423, the control apparatus 310 waits until the VNF update processing by the VNF provider ends. If the VNF update processing ends, the process returns. On the other hand, if the digital signature is invalid, the control apparatus 310 notifies, in step S1425, the third party terminal 910 of a VNF update error, and the process returns.

(VNF Registration Processing)

Figure 14C:
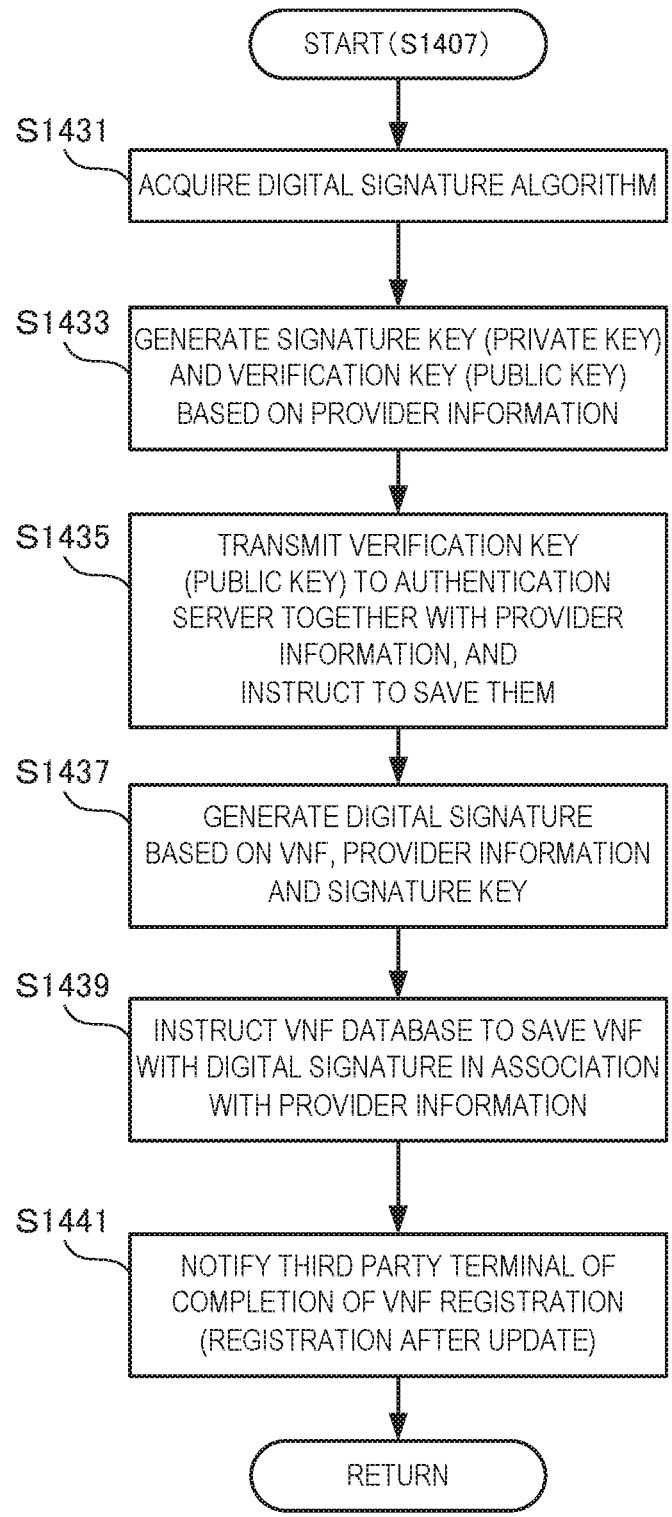
FIG. 14C is a flowchart illustrating the procedure of VNF registration processing according to the third example embodiment of the present invention.

FIG. 14C is a flowchart illustrating the procedure of the VNF registration processing (step S1407) according to this example embodiment.

In step S1431, the control apparatus 310 acquires the digital signature generation algorithm from the authentication server 320. In step S1433, the control apparatus 310 generates a pair of a signature key (private key) and a verification key (public key) based on the provider information. In step S1435, the control apparatus 310 transmits the generated verification key (public key) to the authentication server 320 together with the provider information, and instructs to save the verification key (public key) to be searchable by the provider information (or function).

In step S1437, the control apparatus 310 generates a digital signature based on the VNF to be registered, the provider information, and the signature key (private key). In step S1439, the control apparatus 310 instructs the VNF database 330 to save the VNF with the generated digital signature to be searchable by the provider information (or function).

In step S1441, the control apparatus 310 notifies the third party terminal 910 of registration completion for the VNF registration processing, and notifies the third party terminal 910 of update completion for the VNF update processing.

According to this example embodiment, even if an operator is to create a virtual network system including a virtual network function produced by a third party, the virtual network function is protected by the digital signature of provider information, and thus it is possible to prevent unauthorized registration, alteration, or occurrence of erroneous registration.

Fourth Example Embodiment

A virtual network system according to the fourth example embodiment of the present invention will be described next. The virtual network system according to this example embodiment is different from those according to the above-described second and third example embodiments in that a virtual network function is prevented from being unauthorizedly registered, altered, or erroneously registered in a virtual network system that integrates and manages a plurality of virtual network systems. The remaining components and operations are the same as those in the second and third example embodiments. Hence, the same reference numerals denote the same components and operations, and a detailed description thereof will be omitted.

<<Virtual Network System>>

The virtual network system according to this example embodiment will be described in detail below with reference to FIGS. 15 and 16. Note that functional elements in each virtual network system, for example, the components and operations of a control apparatus and the like are the same as those in the second or third example embodiment.

(System Arrangement)

Figure 15:
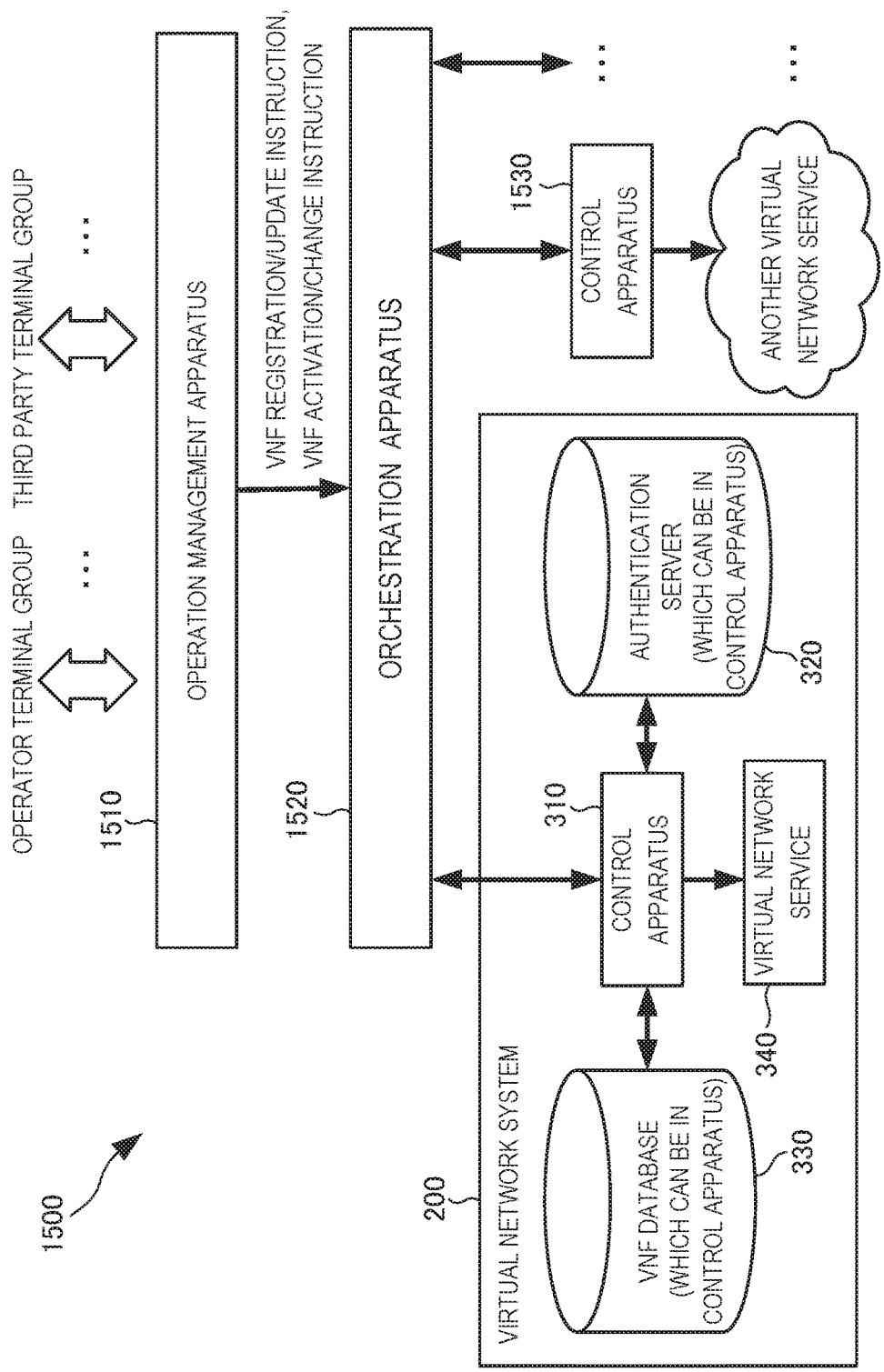
FIG. 15 is a block diagram showing the arrangement of a virtual network system according to the fourth example embodiment of the present invention.

FIG. 15 is a block diagram showing the arrangement of a virtual network system 1500 according to this example embodiment. Note that in FIG. 15, the same reference numerals as those in FIG. 3A denote the same functional components and a description thereof will be omitted.

The virtual network system 1500 includes a plurality of virtual network systems each corresponding to the virtual network system 200 shown in FIG. 3A or different network systems. For example, another virtual network system controlled by a control apparatus 1530 is shown. An orchestration apparatus 1520 that is connected to the plurality of virtual network systems or the different virtual network systems and integrally controls them is included. The orchestration apparatus 1520 receives a VNF registration/update instruction or VNF activation/change instruction via an operation management apparatus 1510 to which an operator terminal group and third party terminal group are connected, and integrally manages the plurality of virtual network systems or the different virtual network systems. Each of the plurality of network systems controlled by the orchestration apparatus 1520 is, for example, a carrier network, a data center, a transport network, or the like, and may be a network that virtually implements the network.

In the virtual network system 1500 of FIG. 15, each virtual network system has the same arrangement as that of the virtual network system 200 of FIG. 3A, and is configured to control a VNF registration/update instruction or VNF activation/change instruction, and perform VNF management and route management.

(Operation Procedure)

Figure 16:
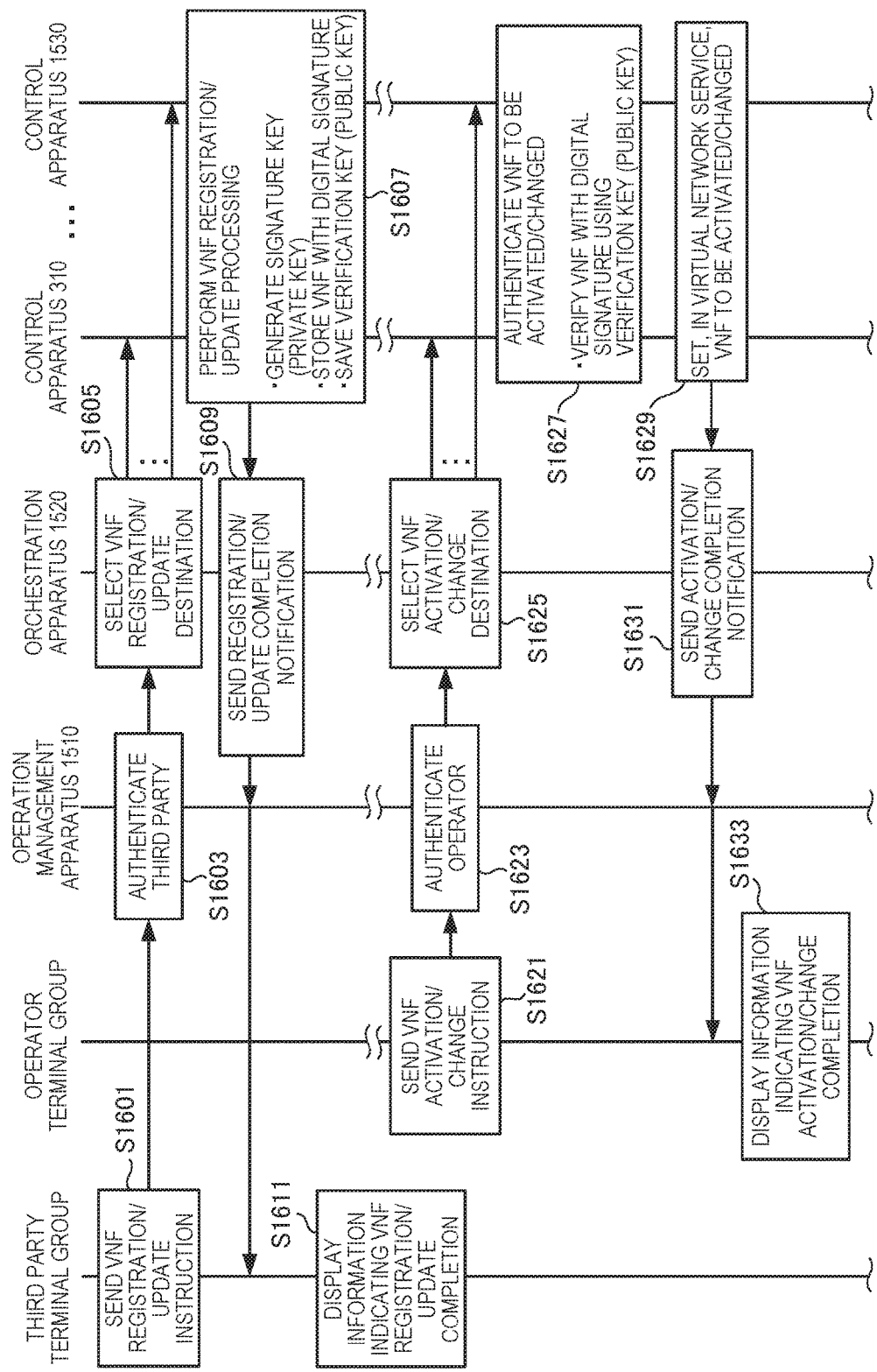
FIG. 16 is a sequence chart showing the operation procedure of the virtual network system according to the fourth example embodiment of the present invention.

FIG. 16 is a sequence chart showing the operation procedure of the virtual network system 1500 according to this example embodiment.

If, in step S1601, the third party terminal group sends a VNF registration or update instruction, the operation management apparatus 1510 authenticates a VNF provider (third party) in step S1603. If authentication is OK, the orchestration apparatus 1520 selects, in step S1605, a virtual network system as a VNF registration destination or that as a VNF update destination based on the VNF registration or update instruction. Then, the orchestration apparatus 1520 transmits the VNF registration or update instruction to a corresponding one of the control apparatuses 310, . . . , and 1530 that respectively control the virtual network systems.

Upon receiving the VNF registration or update instruction, the corresponding one of the control apparatuses 310, . . . , and 1530 executes, in step S1607, the following processing of this example embodiment as VNF registration or update processing. The first processing is generation of a signature key (private key) and a verification key (public key). The second processing is generation of a digital signature using the signature key (private key) and storage of a VNF with the digital signature. Third processing is saving of the generated verification key (public key). Upon completion of the VNF registration or update processing in the virtual network system, the corresponding one of the control apparatuses 310, . . . , and 1530 notifies the orchestration apparatus 1520 of it. In step S1609, the orchestration apparatus 1520 notifies, via the operation management apparatus 1510, the third party terminal, that has requested to perform the VNF registration or update processing, of completion of the VNF registration or update processing. Upon receiving the notification, the third party terminal displays information indicating the VNF registration or update completion in step S1611. Note that an error case is not shown.

If, in step S1621, the operator terminal group sends a VNF activation or change instruction, the operation management apparatus 1510 authenticates an operator in step S1623. If authentication is OK, the orchestration apparatus 1520 selects, in step S1625, a virtual network system as a VNF activation destination or that as a VNF change destination based on the VNF activation or change instruction. Then, the orchestration apparatus 1520 transmits the VNF activation or change instruction to a corresponding one of the control apparatuses 310, . . . , and 1530 that respectively control the virtual network systems.

Upon receiving the VNF activation or change instruction, the corresponding one of the control apparatuses 310, . . . , and 1530 executes, in step S1627, the following processing of this example embodiment as VNF activation or change processing. That is, the VNF with the digital signature is verified using the verification key (public key). In step S1629, the corresponding one of the control apparatuses 310, . . . , and 1530 sets, in the virtual network system, the VNF to be activated or changed. Upon completion of the VNF activation or change processing in the virtual network system, the corresponding one of the control apparatuses 310, . . . , and 1530 notifies the orchestration apparatus 1520 of it. In step S1631, the orchestration apparatus 1520 notifies, via the operation management apparatus 1510, the operator terminal, that has requested to perform the VNF activation or change processing, of completion of the VNF activation or change processing. In step S1633, the operator terminal displays information indicating the VNF activation or change completion. Note that an error case is not shown.

<<Functional Arrangement of Integration Control Apparatus>>

Figure 17:
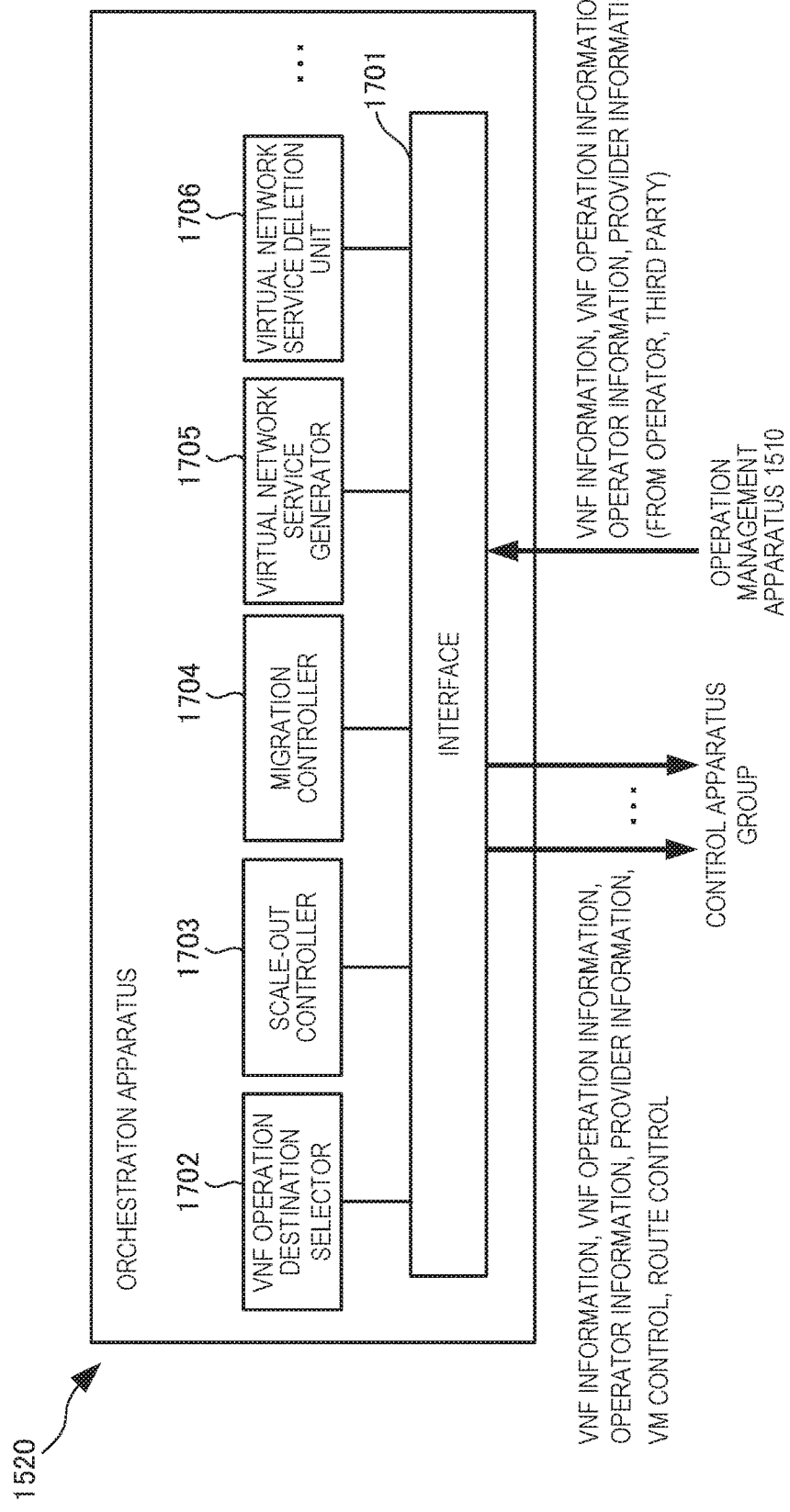
FIG. 17 is a block diagram showing the functional arrangement of an orchestration apparatus according to the fourth example embodiment of the present invention.

FIG. 17 is a block diagram showing the functional arrangement of the orchestration apparatus 1520 according to this example embodiment.

The orchestration apparatus 1520 includes an interface 1701 and respective function processors. The orchestration apparatus 1520 includes, as the function processor, a VNF operation destination selector 1702 that selects a virtual network system to process a VNF instructed to be registered/updated or activated/changed. Furthermore, the orchestration apparatus 1520 includes a scale-out controller 1703 that processes scale-out causing the activation or change of the VNF, and a migration controller 1704 that processes migration. The orchestration apparatus 1520 also includes a virtual network service generator 1705 that generates a new virtual network service, and a virtual network service deletion unit 1706 that deletes an existing virtual network service. The function processors shown in FIG. 17 are merely examples, and another function controller for performing integration processing of the virtual network system 1500 may be connected.

The interface 1701 receives, via the operation management apparatus 1510, VNF information, VNF operation information, operator information, provider information, and the like added to an instruction from the operator terminal group or third party terminal group, and transmits a processing result to the operator terminal group or third party terminal group. Furthermore, the interface 1701 transmits, to the control apparatus group, the VNF information, VNF operation information, operator information, provider information, and the like for operating the virtual network service or VNF, and receives a processing result from the control apparatus group.

(Integration Control Table)

FIG. 18 is a table showing the structure of an integration control table 1800 according to this example embodiment. The integration control table 1800 is used by the orchestration apparatus 1520 to integrally manage the virtual network system 1500. Note that the contents of the integration control table 1800 are not limited to those shown in FIG. 18. The integration control table 1800 can be extended in accordance with the processing contents of the orchestration apparatus 1520.

The integration control table 1800 stores, in association with a virtual network service ID 1801, a control apparatus ID 1802 that controls the virtual network service, a VNF 1803 currently used in the virtual network service, a connectable VNF 1804, and a replaceable VNF 1805. The integration control table 1800 also stores a connectable (or replaceable) route position 1806 and an unconnectable VNF 1807.

<<Processing Procedure of Integration Control Apparatus>>

Figure 19:
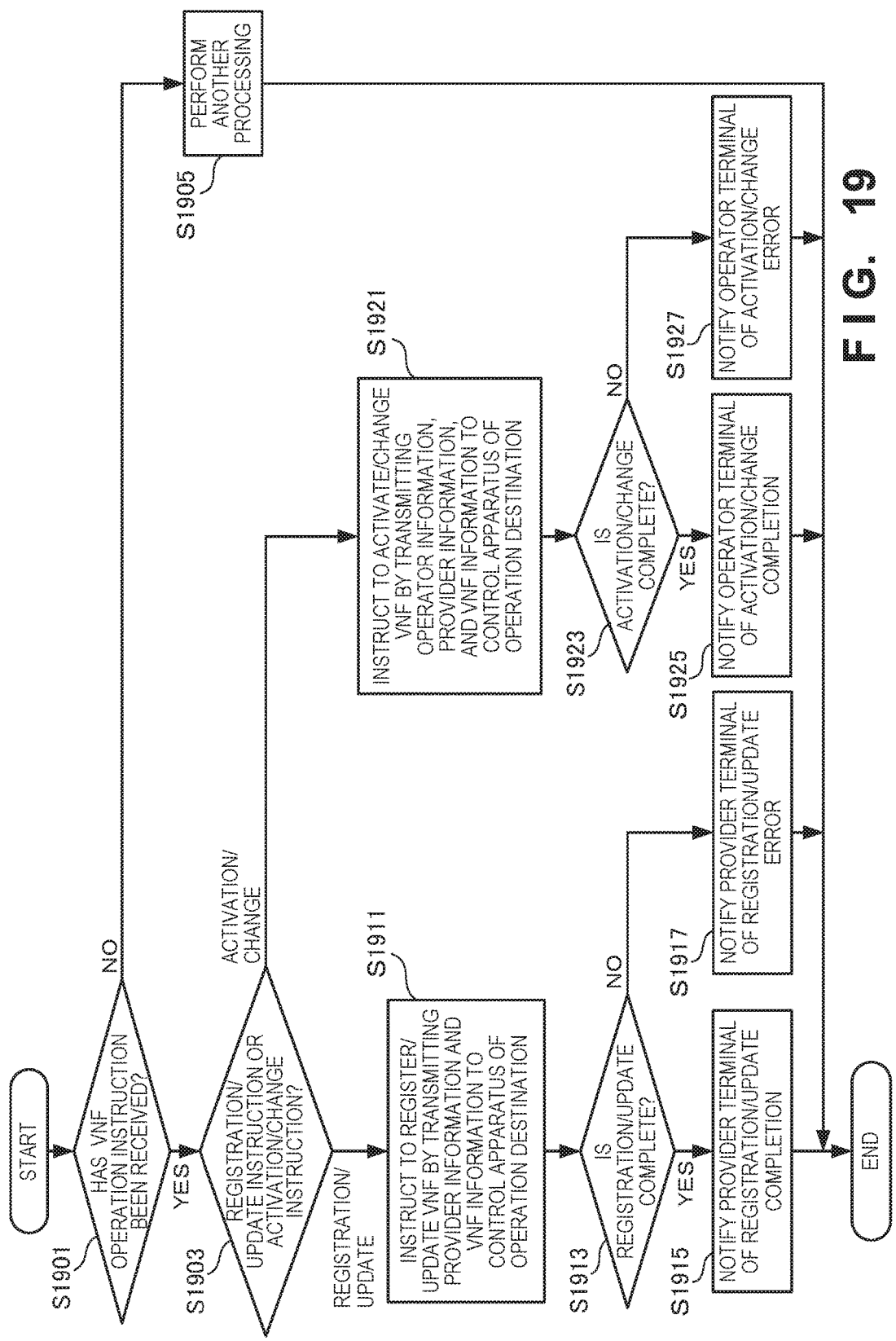
FIG. 19 is a flowchart illustrating the processing procedure of the orchestration apparatus according to the fourth example embodiment of the present invention.

FIG. 19 is a flowchart illustrating the processing procedure of the orchestration apparatus 1520 according to this example embodiment.

In step S1901, the orchestration apparatus 1520 determines whether a VNF operation instruction has been received. If it is determined that a VNF operation instruction has been received, the orchestration apparatus 1520 determines in step S1903 whether the operation instruction is a VNF registration/update or activation/change instruction.

If the operation instruction is a VNF registration/update instruction, the orchestration apparatus 1520 instructs, in step S1911, to register or update a VNF by transmitting provider information and VNF information to the control apparatus of the operation destination. In step S1913, the orchestration apparatus 1520 determines whether the VNF registration or update processing is normally complete. If it is determined that the VNF registration or update processing is normally complete, the orchestration apparatus 1520 notifies, in step S1915, the provider terminal (third party terminal) that the VNF registration or update processing is normally complete. If it is determined that the VNF registration or update processing is not normally complete, the orchestration apparatus 1520 notifies, in step S1917, the provider terminal (third party terminal) that a VNF registration or update error has occurred.

On the other hand, if the operation instruction is a VNF activation/change instruction, the orchestration apparatus 1520 instructs, in step S1921, to activate or change a VNF by transmitting operator information, provider information, and VNF information to the control apparatus of the operation destination. The orchestration apparatus 1520 determines in step S1923 whether the VNF activation or change processing is normally complete. If it is determined that the VNF activation or change processing is normally complete, the orchestration apparatus 1520 notifies, in step S1925, the operator terminal that the VNF activation or change processing is normally complete. If it is determined that the VNF activation or change processing is not normally complete, the orchestration apparatus 1520 notifies, in step S1927, the operator terminal of a VNF activation or change error.

According to this example embodiment, in the virtual network system that implements orchestration, even if an operator is to provide a virtual network service based on a virtual network function produced by a third party, it is possible to prevent unauthorized registration, alteration, or occurrence of erroneous registration in each virtual network service.

Fifth Example Embodiment

A virtual network system according to the fifth example embodiment of the present invention will be described next. The virtual network system according to this example embodiment is different from that according to the fourth example embodiment in that an orchestration apparatus authenticates all virtual network functions, instead of authenticating a virtual network function by each control apparatus. The remaining components and operations are the same as those in the second to fourth example embodiments. Hence, the same reference numerals denote the same components and operations, and a detailed description thereof will be omitted.

<<Virtual Network System>>

Figure 20:
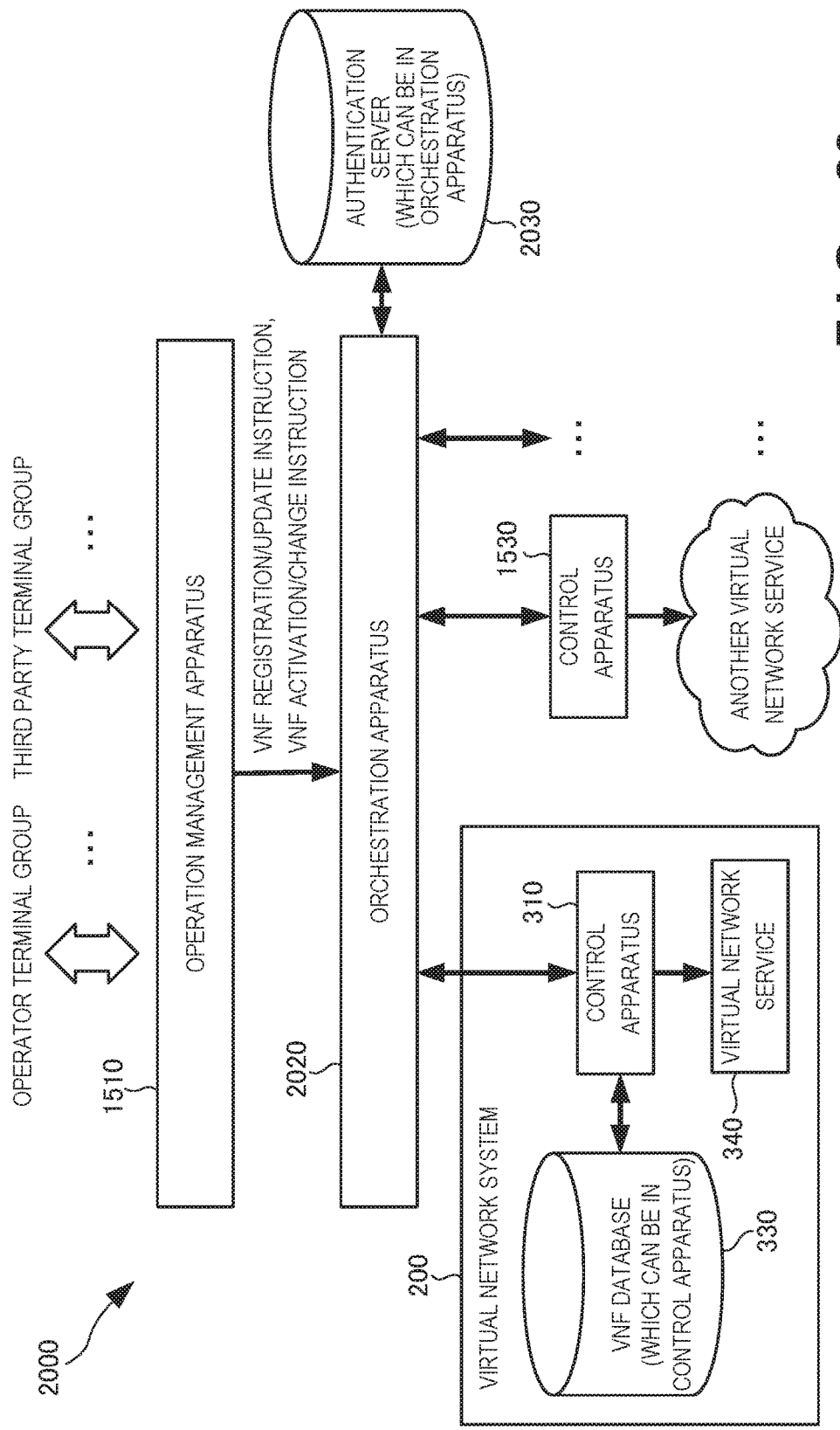
FIG. 20 is a block diagram showing the arrangement of a virtual network system according to the fifth example embodiment of the present invention.

FIG. 20 is a block diagram showing the arrangement of a virtual network system 2000 according to this example embodiment. Note that in FIG. 20, the same reference numerals as those in FIG. 15 denote the same functional components and a description thereof will be omitted.

In the virtual network system 2000, an orchestration apparatus 2020 includes an authentication server 2030, and authenticates the operations of the VNFs of all the virtual network services of the virtual network system 2000. Therefore, each virtual network system 2010 of the virtual network system 2000 includes no authentication server.

<<Functional Arrangement of Integration Control Apparatus>>

FIG. 21 is a block diagram showing the functional arrangement of the orchestration apparatus 2020 according to this example embodiment. In FIG. 21, the same reference numerals as those in FIG. 17 denote the same functional components and a description thereof will be omitted.

The orchestration apparatus 2020 includes a digital signature generation verifier 2106 that generates a digital signature for authenticating a VNF to be operated and verifies the digital signature. The authentication server 2030 is connected via an interface 1701. Note that the authentication server 2030 may be provided in the orchestration apparatus 2020.

Note that the structure of the authentication server 2030 is obtained by adding only information for selecting a target virtual network system or service, and can be assumed from the authentication server 320 shown in FIGS. 7A to 7G, and a detailed illustration and description thereof will be omitted.

<<Another Virtual Network System>>

Figure 22:
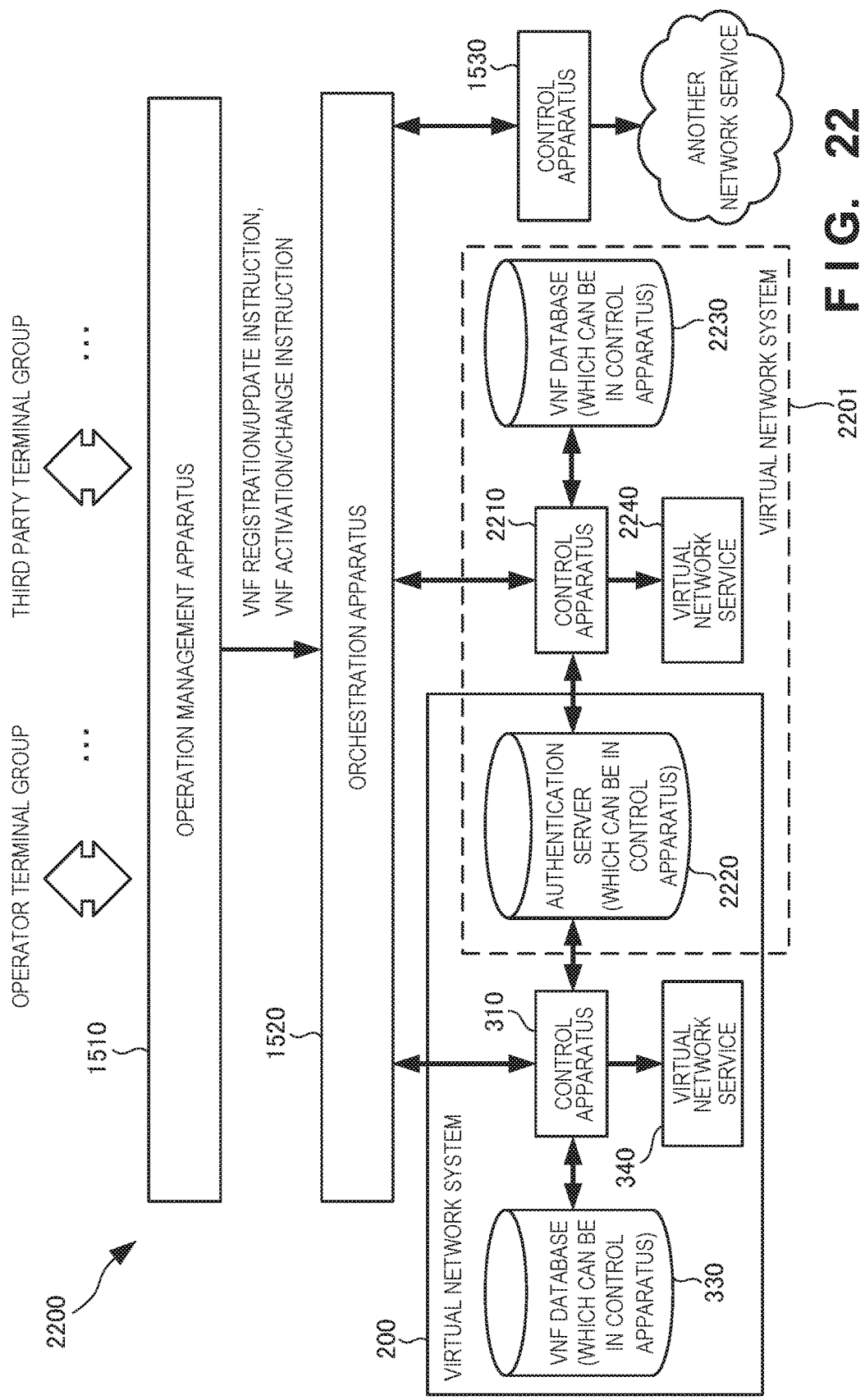
FIG. 22 is a block diagram showing another arrangement of the virtual network system according to the fifth example embodiment of the present invention.

FIG. 22 is a block diagram showing the arrangement of a virtual network system 2200 according to this example embodiment. FIG. 22 shows an arrangement in which a plurality of virtual network systems 200 and 2201 share an authentication server 2220. Note that an arrangement in which the plurality of virtual network systems 200 and 2201 share a VNF database may be adopted. In FIG. 22, the same reference numerals as those in FIG. 15 denote the same functional components and a description thereof will be omitted.

The virtual network system 2201 includes a control apparatus 2210, a VNF database 2230, and a virtual network service 2240, and shares the authentication server 2220 with the virtual network system 200.

Note that the structure of the shared authentication server 2220 is obtained by adding only information for selecting a target virtual network system or service, and can be assumed from the authentication server 320 shown in FIGS. 7A to 7G, and a detailed illustration and description thereof will be omitted.

According to this example embodiment, in the virtual network system that implements orchestration, even if an operator is to provide a virtual network service based on a virtual network function produced by a third party, it is possible to prevent unauthorized registration, alteration, or occurrence of erroneous registration by a small number of components.

Sixth Example Embodiment

A virtual network system according to the sixth example embodiment of the present invention will be described next. The virtual network system according to this example embodiment is different from those according to the above-described second to fifth example embodiments in that special management is performed for virtual network functions. The remaining components and operations are the same as those in the second to fifth example embodiments. Hence, the same reference numerals denote the same components and operations, and a detailed description thereof will be omitted.

(Valid Period of Virtual Network Function)

Figure 23:
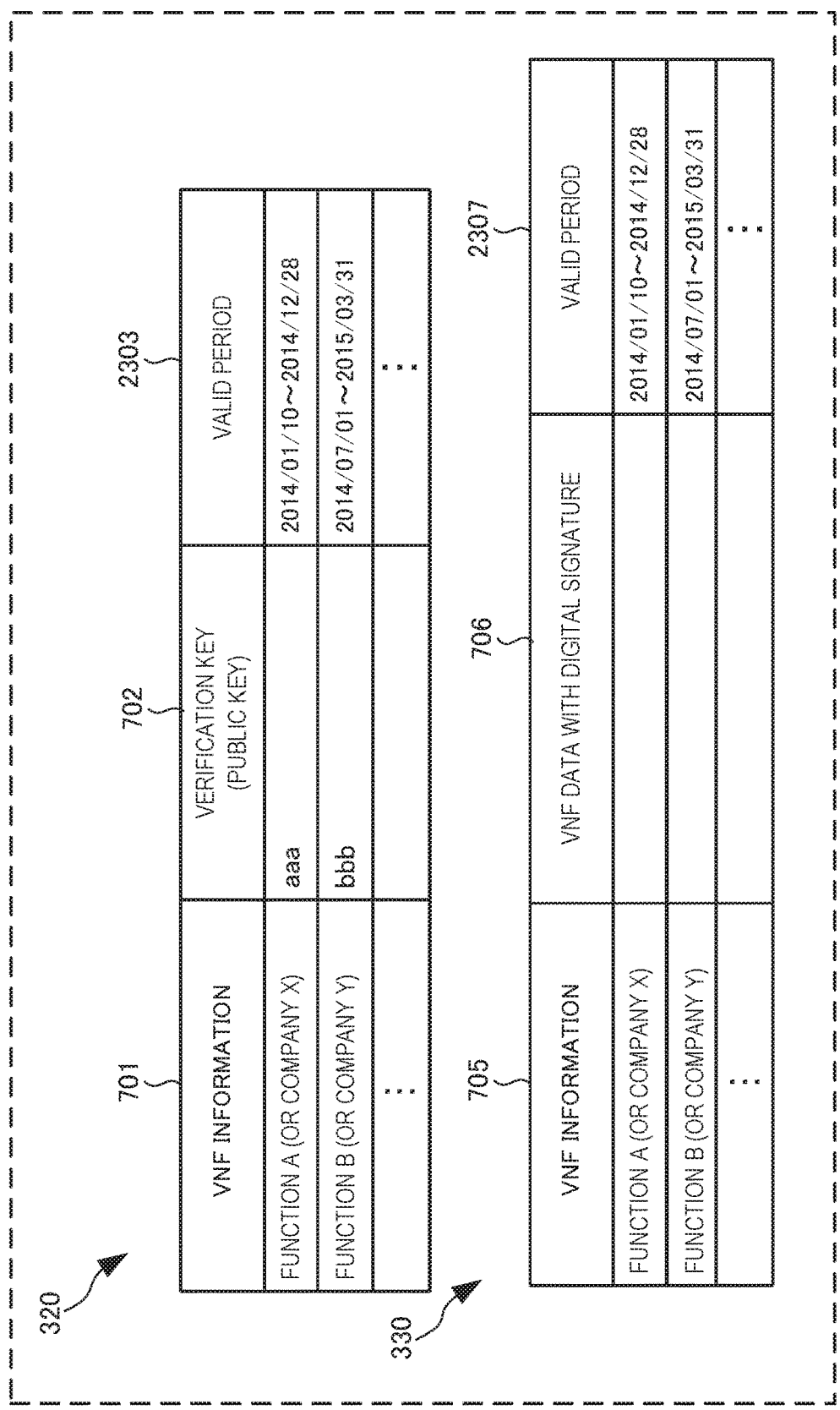
FIG. 23 is a view showing a case in which the valid period of a virtual network function is set according to the sixth example embodiment of the present invention.

FIG. 23 is a view showing a case in which the valid period of a virtual network function is set according to this example embodiment. In FIG. 23, the same reference numerals as those in FIG. 7A denote the same components and a description thereof will be omitted.

In an authentication server 320, a valid period 2303 of a verification key (public key) 702 is set. In a VNF database 330, a valid period 2307 of VNF data 706 with a digital signature is set.

If the valid periods end, the verification key (public key) 702 and the VNF data 706 with the digital signature are deleted or disabled. A VNF provider is notified of the end of the valid periods, and a new VNF is registered.

(Compatibility of Virtual Network Functions)

Figure 24:
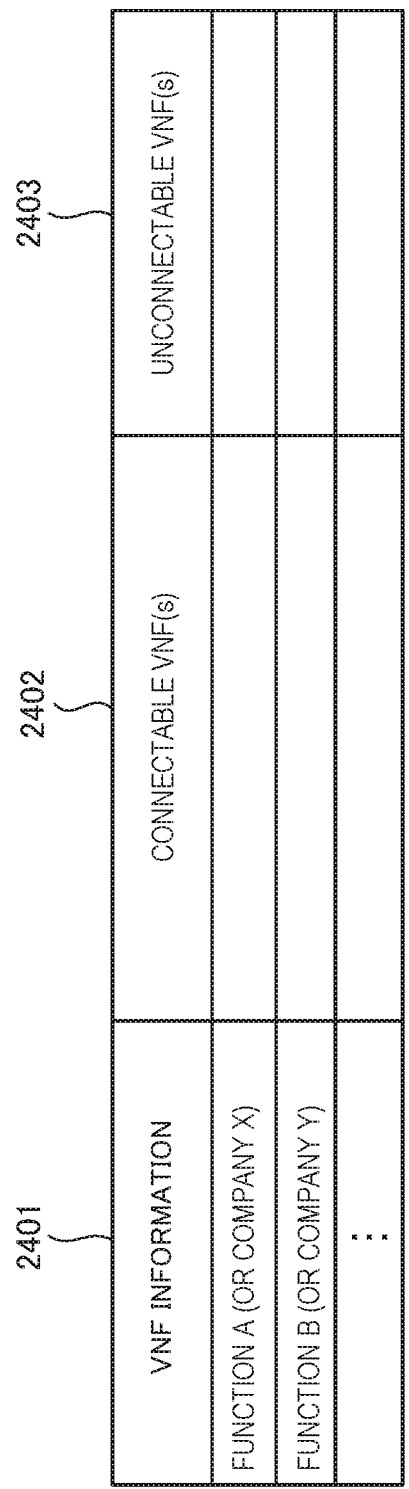
FIG. 24 is a table showing a case in which the compatibility of virtual network functions is considered according to the sixth example embodiment of the present invention.

FIG. 24 is a table showing a case in which the compatibility of virtual network functions is considered according to this example embodiment.

For each VNF information (function or company) 2401, a VNF (or VNFs) 2402 connectable to the VNF identified by the VNF information 2401 and a VNF (or VNFs) 2403 unconnectable to the VNF are stored. By using this table, it is possible to prevent unauthorized registration, alteration, or occurrence of erroneous registration by a digital signature, and also prevent an erroneous operation of a virtual network service based on whether the VNF is connectable.

According to this example embodiment, if the valid periods end, the virtual network function is updated and the authentication information is also updated, and an incompatible virtual network function is originally disabled. Thus, it is possible to prevent unauthorized registration, alteration, or erroneous registration from being encountered.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when a control program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

This application claims the benefit of Japanese Patent Application No. 2015-019797, filed on Feb. 3, 2015, which is hereby incorporated by reference in its entirety.

The invention claimed is:

1. A virtual network system comprising:
an authentication server configured to store authentication information corresponding to a provider of a virtual network function which executes a network function in a carrier network, the virtual network function being included in a virtual network service provided in the carrier network; and
a control apparatus configured to:
receive an instruction which represents activation or change of the virtual network function;
acquire whether or not the instructed virtual network function has been validly registered or updated, based on the authentication information; and
perform the activation or the change of the instructed virtual network function in response to a status that the instructed virtual network function corresponds to the authentication information.

2. The virtual network system according to claim 1, further comprising a registration apparatus configured to register the virtual network function and the authentication information,
wherein the authentication server is configured to store the registered authentication information.

3. The virtual network system according to claim 1, wherein the authentication information includes a digital signature.

4. The virtual network system according to claim 3, wherein the control apparatus is further configured to decrypt the digital signature by a verification key held in correspondence with the virtual network function or the provider of the virtual network function.

5. The virtual network system according to claim 3, wherein the control apparatus is further configured to decrypt the digital signature by a verification key held in correspondence with the virtual network function and the provider of the virtual network function.

6. The virtual network system according to claim 5, wherein the control apparatus is further configured to decrypt the digital signature by a verification key held in correspondence with a combination of the virtual network function, the provider and an operator who has input activation or change of the virtual network function.

7. The virtual network system according to claim 5, wherein the control apparatus is further configured to decrypt the digital signature by a verification key held in correspondence with a combination of the virtual network function, the provider and a version of the virtual network function.

8. The virtual network system according to claim 4, wherein the control apparatus is further configured to decrypt the digital signature by a verification key held in correspondence with a combination of the virtual network function and an operator who has input activation or change of the virtual network function, or a combination of the provider and the operator.

9. The virtual network system according to claim 4, wherein the control apparatus is further configured to decrypt the digital signature by a verification key held in correspondence with a combination of the virtual network function and a version of the virtual network function, or a combination of the provider and the version.

10. The virtual network system according to claim 1, wherein the control apparatus is further configured to authenticate, by a decryption key corresponding to encryption, that the virtual network function has been validly registered or updated.

11. The virtual network system according to claim 2, wherein the registration apparatus is configured to register a digital signature as the authentication information.

12. The virtual network system according to claim 11, wherein the registration apparatus is configured to register the digital signature generated by a signature key corresponding to the virtual network function or the provider of the virtual network function.

13. The virtual network system according to claim 11, wherein the registration apparatus is configured to register the digital signature generated by a signature key corresponding to the virtual network function and the provider of the virtual network function.

14. The virtual network system according to claim 13, wherein the registration apparatus is configured to register the digital signature generated by a signature key corresponding to a combination of the virtual network function, the provider and a version of the virtual network function.

15. The virtual network system according to claim 12, wherein the registration apparatus is configured to register the digital signature generated by a signature key corresponding to a combination of the virtual network function and a version of the virtual network function, or a combination of the provider and the version.

16. The virtual network system according to claim 12, wherein the control apparatus is further configured to identify the virtual network function based on the virtual network service.

17. The virtual network system according to claim 12, further comprising a physical server including a virtual machine which performs the virtual network function,
wherein the control apparatus is configured to control the virtual machine.

18. The virtual network system according to claim 1, wherein the control apparatus is further configured to authenticate that the instructed virtual network function has been validity registered or updated, based on the authentication information.

19. The virtual network system according to claim 1, wherein the authentication server is further configured to authenticate that the instructed virtual network function has been validity registered or updated, based on the authentication information.

20. A control apparatus comprising:
a memory configured to store program instructions; and
a processor configured to execute the program instructions to:
receive an instruction which represents activation or change of a virtual network function which executes a network function in a carrier network, the virtual network function being included in a virtual network service provided in the carrier network;
acquire whether or not the instructed virtual network function has been validly registered or updated, based on authentication information stored in an authentication server corresponding to a provider of the virtual network function; and
perform the activation or the change of the instructed virtual network function in response to a status that the instructed virtual network function corresponds to the authentication information.

21. The control apparatus according to claim 20, wherein the processor is configured to execute further instructions to identify the virtual network function based on the virtual network service.

22. A communication method comprising:
receiving an instruction which represents activation or change of a virtual network function which executes a network function in a carrier network, the virtual network function being included in a virtual network service provided in the carrier network;
acquiring whether or not the instructed virtual network function has been validly registered or updated, based on authentication information stored in an authentication server corresponding to a provider of the virtual network function; and
performing the activation or the change of the instructed virtual network function in response to a status that the instructed virtual network function corresponds to the authentication information.

23. The communication method according to claim 22, further comprising identifying the virtual network function based on the virtual network service.

* * * * *

UNITED STATES PATENT AND TRADEMARK OFFICE
CERTIFICATE OF CORRECTION

| | |
|---|---|
| PATENT NO. | : 10,505,742 B2 |
| APPLICATION NO. | : 15/548128 |
| DATED | : December 10, 2019 |
| INVENTOR(S) | : Shintaro Nakano, Hideo Hasegawa and Satoru Ishii |

It is certified that error appears in the above-identified patent and that said Letters Patent is hereby corrected as shown below:

In the Specification

Column 1, Title, Line 3; After "PROGRAM", insert:
--¶CROSS REFERENCE TO RELATED APPLICATIONS
This application is a National Stage of International Application No. PCT/JP2016/050969 filed Jan. 14, 2016, claiming priority based on Japanese Patent Application No. 2015-019797, filed Feb. 3, 2015, the contents of all of which are incorporated herein by reference in their entirety.--

Signed and Sealed this
First Day of December, 2020

Andrei Iancu
*Director of the United States Patent and Trademark Office*